(12) United States Patent
Nishioka et al.

(10) Patent No.: US 6,833,966 B2
(45) Date of Patent: Dec. 21, 2004

(54) OPTICAL SYSTEM, AND OPTICAL APPARATUS

(75) Inventors: Kimihiko Nishioka, Hachioji (JP); Eiji Yasuda, Hachioji (JP); Kentaro Sekiyama, Hachioji (JP); Tetsuo Nagata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/358,362

(22) Filed: Feb. 5, 2003

(65) Prior Publication Data

US 2003/0189766 A1 Oct. 9, 2003

(30) Foreign Application Priority Data

Feb. 5, 2002 (JP) ....................................... 2002-028569
Feb. 22, 2002 (JP) ....................................... 2002-045938

(51) Int. Cl.[7] ........................... G02B 17/00; G02B 7/185
(52) U.S. Cl. ....................................... 359/726; 359/846
(58) Field of Search ................................ 359/290, 291, 359/726, 846, 847

(56) References Cited

U.S. PATENT DOCUMENTS 6,147,789 A * 11/2000 Gelbart ....................... 359/231
6,738,199 B2 * 5/2004 Nishioka ..................... 359/726
6,747,813 B2 * 6/2004 Wakai et al. ................ 359/726
2004/0027684 A1 * 2/2004 Nishioka et al. ............ 359/676
2004/0109236 A1 * 6/2004 Nishioka ..................... 359/643

FOREIGN PATENT DOCUMENTS

JP    2000-298237    10/2000

* cited by examiner

Primary Examiner—David N. Spector
(74) Attorney, Agent, or Firm—Pillsbury Winthrop LLP

(57) ABSTRACT

The invention relates to an optical system or apparatus such as a lens system capable of focus control and a variable-focus lens, which has reduced power consumptions, ensures noiseless operation and fast response and contributes to cost reductions for the reason of simplified structure. Specifically, the invention provides an optical apparatus comprising an element 409 having variable optical properties and an image plane 612. To correct the optical apparatus for movement of the image-formation surface of an optical system 614 in association with a change in the element 409 having variable optical properties, the image plane 612 is placed in the range of movement of the image-formation surface in association with the change in the element having variable optical properties.

15 Claims, 43 Drawing Sheets

Trans                      Cis

602'

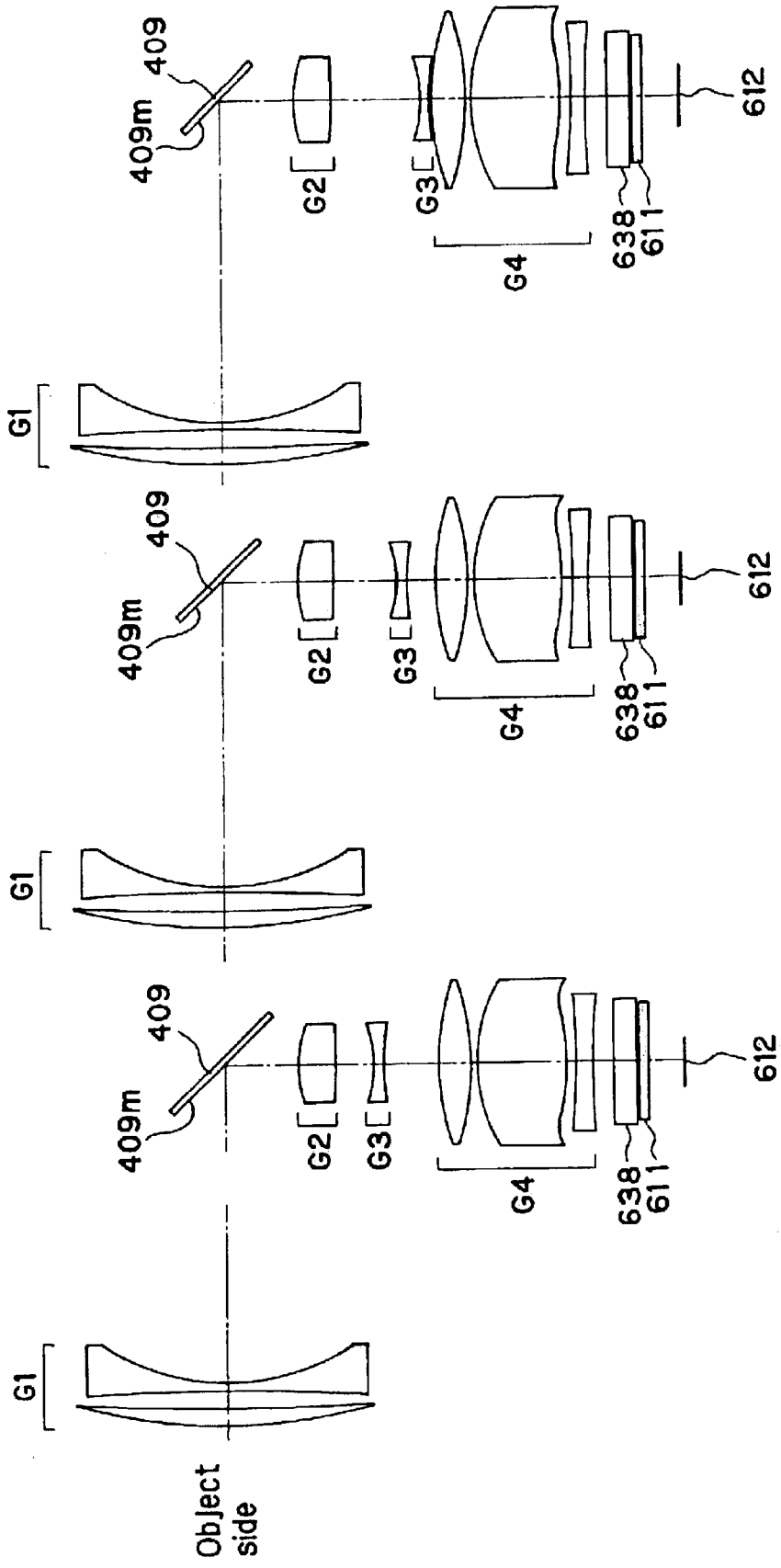

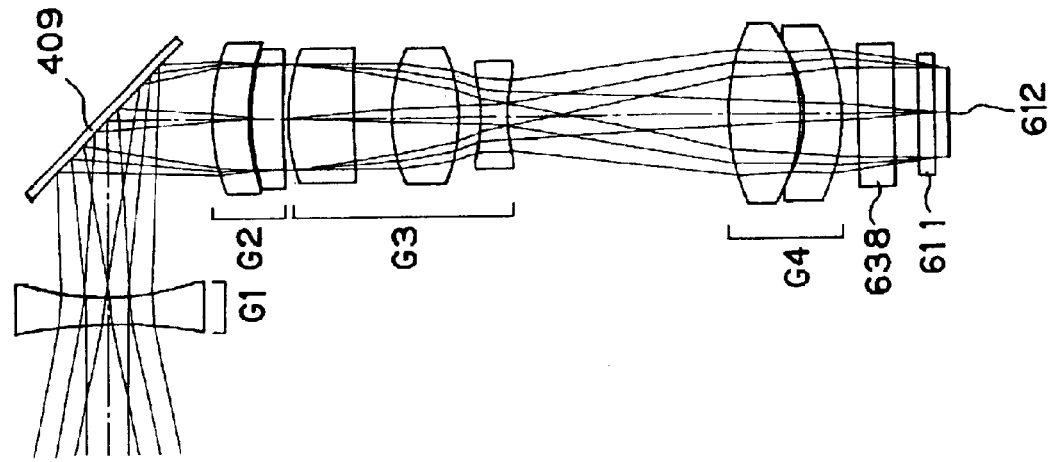
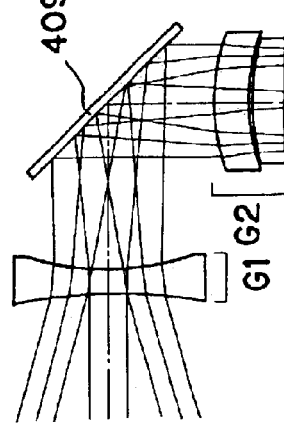
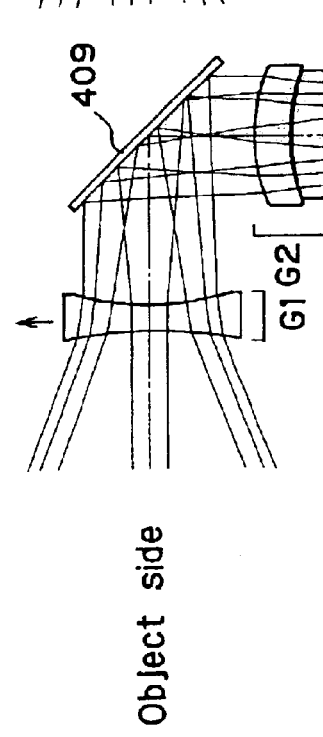

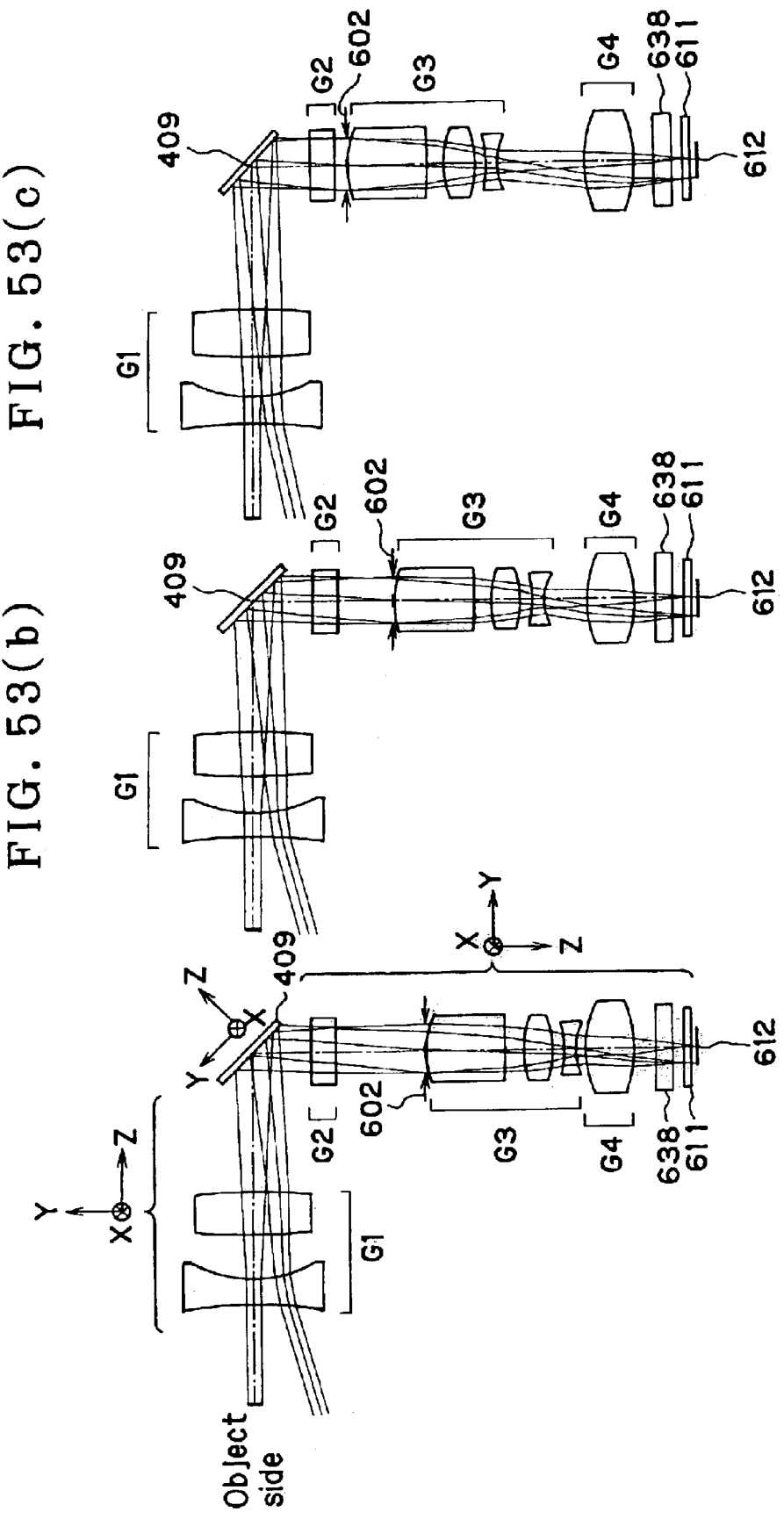

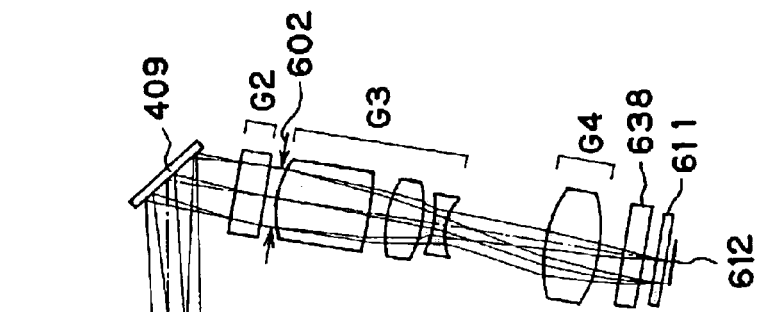
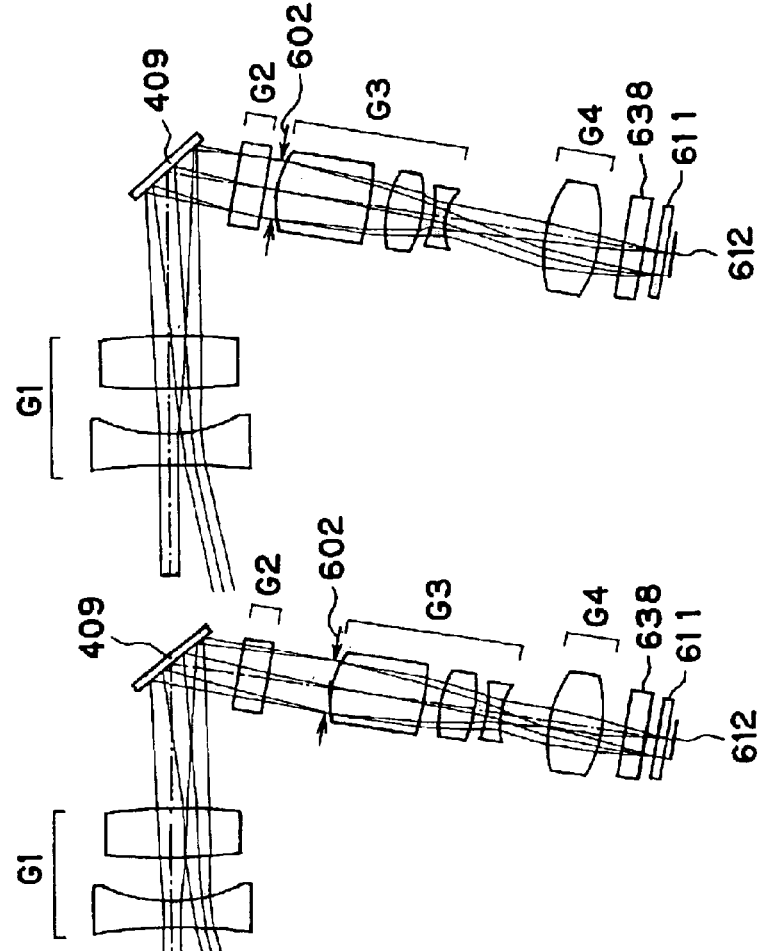
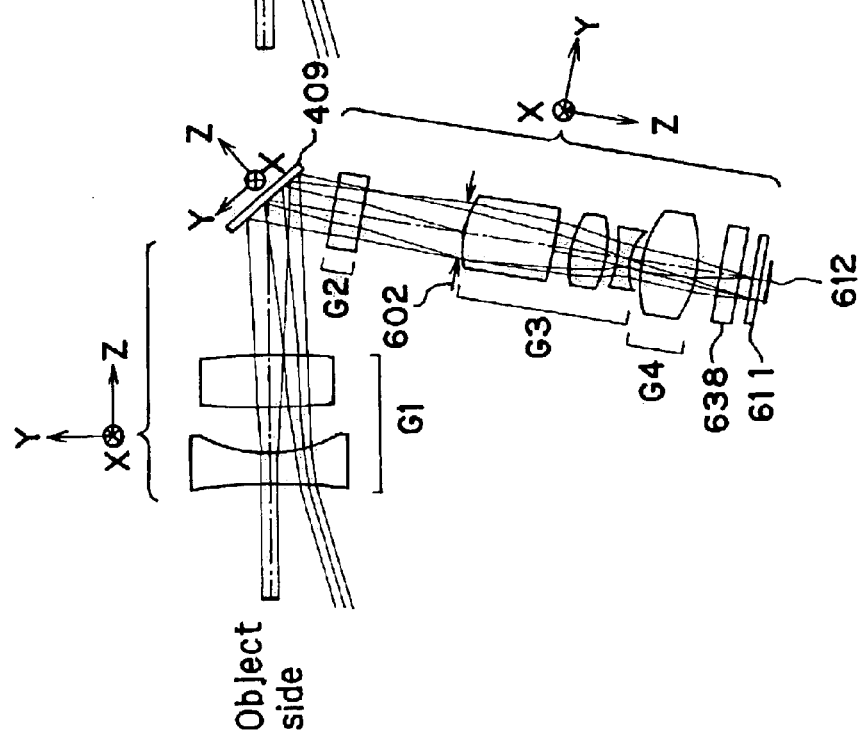

OPTICAL SYSTEM, AND OPTICAL APPARATUS

This application claims benefit of Japanese Application No. 2002-28569 filed in Japan on Feb. 5, 2002, and No. 2002-45938 filed in Japan on Feb. 22, 2002, the contents of which are incorporated by this reference.

BACKGROUND OF THE INVENTION

The present invention relates to an optical system and an optical apparatus, and more particularly to an optical system comprising a focus-controllable optical element having variable optical properties represented by a variable-shape mirror and optical apparatus comprising said optical system, e.g., video projectors, digital cameras, TV cameras, endoscopes and camera finders.

Referring to conventional lenses formed of polished glass materials, their focal length cannot be varied because they cannot transform by themselves. For this reason, mechanical structures become complicated, which are used to move said lenses or lens groups comprising the same in an axial direction for focusing and zooming.

Since motors, etc. are used to mechanically move some of the lens groups, there are problems such as increased power consumptions, noisy sounds, slow response speeds, and time-consuming movement of lens groups.

Even for photo taking or observations while camera shake is prevented, lens groups are mechanically moved with motors, solenoids, etc., resulting in problems such as increased power consumptions, cost rises due to complicated mechanical structures.

SUMMARY OF THE INVENTION

In view of such problems as discussed above, a primary object of the invention is to provide an optical system represented by a lens system comprising a variable-shape mirror having a reflecting surface capable of focusing or a lens system comprising a variable-focus lens, which has limited power consumptions, produces little or no noise and ensures fast response, simple mechanical structure and cost reductions, and optical apparatus comprising such an optical system.

The inventive optical system and apparatus provided to attain the aforesaid object are embodied as follows.

(1) An optical system, characterized by comprising a variable mirror and an aperture stop, wherein the aperture stop satisfies the following condition (601):

$$0 \leq |Sm/f| \leq 10 \tag{601}$$

where Sm is the distance between the reflecting surface of the variable mirror and the aperture stop as measured along the optical axis of the optical system and calculated on an air basis, and f is the focal length of the optical system except the variable mirror.

(2) An optical system, characterized by comprising a variable mirror and an aperture stop, and satisfying the following condition (599):

$$39° \leq \Phi \leq 60° \tag{599}$$

where $\Phi$ is the angle of incidence of the optical axis of the optical system on the variable mirror.

(3) An optical system, comprising, in order from its object side, an optical element group, a variable mirror or a variable-focus lens, a lens group or an air separation, a zooming group and an optical element group.

(4) An optical system, characterized by comprising a variable mirror and a zooming group having a zooming function, wherein the variable mirror has a focusing function and is located in front of the zooming group.

(5) An optical system having a variable mirror, characterized by a full-open aperture stop located at a position that complies with the following condition (601), wherein a diaphragm having a variable aperture is located at a position different from the position of said aperture stop:

$$0 \leq |Sm/f| \leq 10 \tag{601}$$

where Sm is the distance between the reflecting surface of the variable mirror and the aperture stop as measured along the optical axis of the optical system and calculated on an air basis, and f is the focal length of the optical system except the variable mirror.

(6) An optical system, comprising a variable mirror, and satisfying the following condition (613):

$$39° \leq \Phi \leq 55° \tag{613}$$

where $\Phi$ is the angle of incidence of the optical axis of the optical system on the variable mirror.

(7) An optical system, comprising a variable mirror and satisfying the following condition (616):

$$0.5 < M_1/f < 5 \tag{616}$$

where $M_1$ is the distance between the reflecting surface of the variable mirror and the entrance-side first surface of the optical system as measured along the optical axis of the optical system and calculated on an air basis, and f is the focal length of the optical system except the variable mirror.

(8) An optical apparatus comprising an optical system including an optical element having variable optical properties and an image plane, characterized in that to correct said optical system for movement of an image-formation surface in association with a change in the optical element having variable optical properties, the image plane is located in the range of a change in the movement of the image-formation surface in association with the change in the optical element having variable optical properties.

(9) An image pickup system comprising an optical element having variable optical properties and an image pickup device, characterized in that to compensate for a change in the tilt of an image-formation surface in association with a change in the optical element having variable optical properties, the image pickup device is decentered or tilted, thereby compensating for a decrease in image-formation performance in association with the change in the optical element having variable optical properties.

(10) An optical apparatus comprising an optical element having variable optical properties and a display device, characterized in that to compensate for a change in the tilt of an image-formation surface in association with a change in the optical element having variable optical properties, the display device is decentered or tilted, thereby compensating for a decrease in display performance in association with the change in the optical element having variable optical properties.

(11) An optical apparatus comprising an optical system including an optical element having variable optical properties and an image plane, characterized in that the image plane is spaced $\Delta M$ away from the end of the range of a change in the tilt of an image-formation surface in associa tion with a change in the optical element having variable optical properties, wherein ΔM satisfies the following condition (611):

$$|\Delta M| \geq D_f/20 \tag{611}$$

where ΔM is the maximum amount of displacement in an optical axis direction of the optical system of the image plane from the image-formation surface of the optical system, wherein said displacement is caused by a tilt of the image plane, and $D_f$ is the focal depth on one side of the optical system.

(12) An optical apparatus comprising an optical element having variable optical properties, an optical device and a fixed image plane, characterized in that to compensate for movement of an image-formation surface in association with a change in the optical element having variable optical properties, the optical device is decentered to tilt the image-formation surface, thereby setting the fixed image plane in the range of a change in the tilt of the image-formation surface in association with the change in the optical element having variable optical properties.

(13) An optical apparatus comprising an optical element having variable optical properties, an optical device and an image plane, characterized in that to compensate for movement of an image-formation surface in association with a change in the optical element having variable optical properties, the optical device is decentered to tilt the image-formation surface, thereby bringing the image plane close to the image-formation surface that moves in association with the change in the optical element having variable optical properties.

(14) An optical apparatus comprising an optical element having variable optical properties and an optical device, characterized in that to compensate for aberrational changes in association with a change in the optical element having variable optical properties, the optical device is decentered to produce aberrations, thereby compensating the optical apparatus for the aberrational changes in association with the change in the optical element having variable optical properties.

(15) An optical apparatus using one or more variable mirrors, characterized in that a shift decentration given by Δ is intentionally added to at least one optical surface, optical element or image pickup device in the vertical direction to the Z-axis of the optical apparatus with the proviso that the range represented by $0 \leq |\Delta|/f < 1$ is satisfied, wherein Δ is the amount of the shift decentration added in the vertical direction to the Z-axis, and f is the focal length of an optical system except the variable mirror.

(16) An optical apparatus using one or more variable mirrors, characterized in that a tilt decentration given by Q is intentionally added to at least one optical surface, optical element, image pickup device, display device or image plane with the axis of rotation defined by a straight line vertical to the Z-axis of the optical apparatus, provided that the range represented by $0 \leq |Q| < 15$ is satisfied, wherein Q is the amount of tilt decentration (in °) with the axis of rotation defined by the straight line vertical to the Z-axis.

(17) The optical system according to (1), characterized in that said variable mirror has an increased converging action at a near point and a decreased converging action at a far point.

(18) A camera, characterized in that when the optical axis thereof is bent on a long side thereof, the post-bending optical axis is located in a substantially lateral direction of the camera.

(19) A camera, characterized in that when the optical axis thereof is bent on a short side thereof, the post-bending optical axis is located in a substantially longitudinal direction of the camera.

(20) An optical system using at least one variable mirror, characterized in that a tilt decentration is intentionally added to at least one optical surface, optical element, image pickup device or image plane with the axis of rotation defined by a straight line vertical to the Z-axis of the optical system, provided that the range represented by the following condition (103) is satisfied:

$$0 \leq |\Psi| < 15 \tag{103}$$

where Ψ is the amount of the tilt decentration added in °.

(21) An optical system, characterized by comprising an invariable-shape mirror and an aperture stop, wherein the position of the aperture stop satisfies the following condition (601):

$$0 \leq |Sm/f| \leq 10 \tag{601}$$

where Sm is the distance between the reflecting surface of the mirror and the aperture stop as measured along the optical axis of the optical system and calculated on an air-basis, and f is the focal length of the optical system except the mirror.

(22) An optical system, characterized by comprising an invariable-shape mirror and an aperture stop and satisfying the following condition (599):

$$39° \leq \Phi \leq 60° \tag{599}$$

where Φ is the angle of incidence of the optical axis of the optical system on the mirror.

(23) An optical system, characterized by comprising an invariable-shape mirror and satisfying the following condition (616):

$$0.5 < M_1/f < 5 \tag{616}$$

where $M_1$ is the distance between the reflecting surface of the mirror and the entrance-side first surface of the optical system as measured along the optical axis of the optical system and calculated on an air basis, and f is the focal length of the optical system except the mirror.

Still other objects and advantages of the invention will in part be obvious and will in part be apparent from the specification.

The invention accordingly comprises the features of the construction, combinations of elements, and arrangement of parts which will be exemplified in the construction hereinafter set forth, and the scope of the invention will be indicated in the claims.

BRIEF DESCRIPTION OF THE DRAWINGS

FIG. 29 is illustrative of what state the variable-focus lens of FIG. 28 is transformed in.

FIGS. 51(a), 51(b) and 51(c) are Y-Z sectional views for Example 7 at the wide-angle end, in the standard state and at the telephoto end, respectively, upon focused at infinity.

FIGS. 52(a), 52(b) and 52(c) are Y-Z sectional views for Example 8 at the wide-angle end, in the standard state and at the telephoto end, respectively, upon focused at infinity.

FIGS. 53(a), 53(b) and 53(c) are Y-Z sectional views for Example 9 at the wide-angle end, in the standard state and at the telephoto end, respectively, upon focused at infinity.

FIGS. 54(a), 54(b) and 54(c) are Y-Z sectional views for Example 10 at the wide-angle end, in the standard state and at the telephoto end, respectively, upon focused at infinity.

DESCRIPTION OF THE PREFERRED EMBODIMENTS

Figure 1:
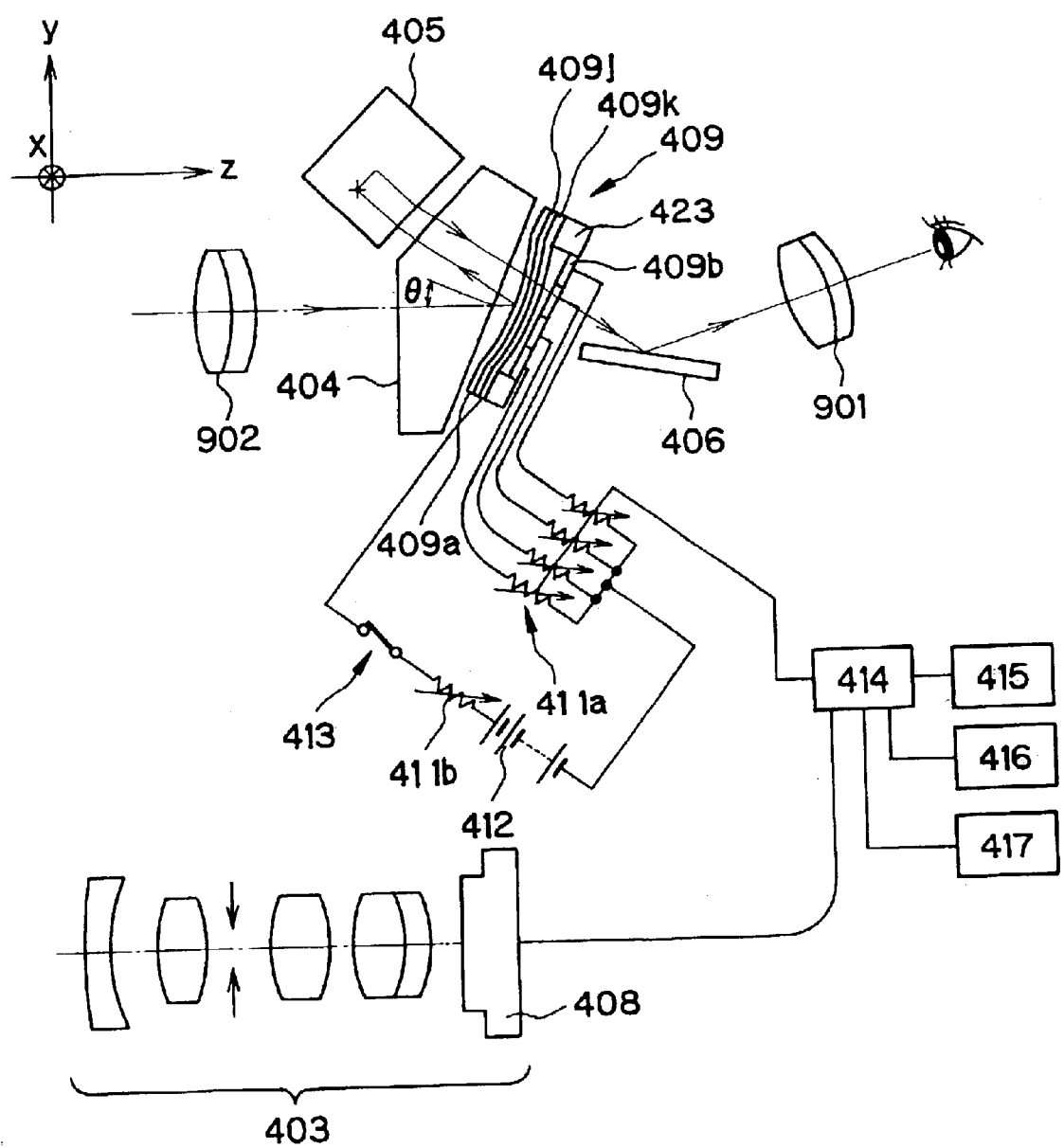
FIG. 1 is illustrative in schematic of one example wherein the variable mirror is used in a viewing optical system used with the Keplerian finder of a digital camera that is used as the optical apparatus of the invention.

Before the embodiments of the invention are given, the embodiments of the invention set forth hereinafter will first be enumerated as (1) to (99). Then, reference will be made to the embodiments of the optical system of the invention, the embodiments of the optical element having variable optical properties such as a variable mirror that is incorporated in optical apparatus using that optical system, and the embodiments of using that optical element having variable optical properties (a variable-shape mirror or a variable-focus lens). The embodiments illustrated to this end are the embodiments of the optical system and optical apparatus of the invention that will be understood by those skilled in the art. Embodiments 1 to 11 directed to the optical system and optical apparatus of the invention will be given on the basis of data on constitutional patterns, followed by said constitutional patterns.

Enumerated below are numerous specific embodiments of the invention.

(1) An optical system, characterized by comprising a variable mirror and a diaphragm, wherein the position of the diaphragm satisfies condition (601).

(2) An optical system, characterized by comprising a variable mirror and a diaphragm, and satisfying condition (599).

(3) An optical system, characterized by comprising a variable mirror and a diaphragm, and satisfying conditions (599) and (601).

(4) The optical system according to any one of (1) to (3) above, characterized by comprising a lens having a rotationally symmetric surface.

(5) The optical system according to any one of (1) to (3) above, characterized by comprising a convex lens and a concave lens, each having a rotationally symmetric surface.

(6) The optical system according to any one of (1) to (5) above, characterized by being a zoom optical system. For the zoom optical system, it is noted that conditions (599) and (601) are not necessarily satisfied under every condition. In other words, either condition (599) or (601) should be satisfied in at least one state.

(7) A zoom optical system, comprising, in order from its object side, an optical element group, a variable mirror or a variable-focus lens, a lens group or an air separation, a zooming group and an optical element group.

(8) The optical system according to (6) or (7) above, which comprises a moving optical element or a moving optical element group having convex power.

(9) The optical system according to (6) or (7) above, which comprises a moving optical element or a moving optical element group having concave power.

(10) The optical system according to (6) or (7) above, characterized in that an aperture stop is located in the rear of the variable mirror.

(10-1) A zoom optical system, characterized by comprising a variable mirror and a zooming group having a zooming function, wherein the variable mirror has a focusing function and is located in front of the zooming group.

(10-2) A zoom optical system, characterized by comprising a variable mirror and a moving optical element group, wherein the optical element group is a zooming group having a zooming function, and the variable mirror has a focusing function and a compensator function and is located in front of the zooming group.

(11) The optical system according to any one of (1) to (3) above, which comprises an optical element having a free-form surface.

(12) The optical system according to any one of (1) to (11), which comprises an optical element having a free-form surface and a diaphragm and further comprises a lens having a rotationally symmetric surface or a plane-parallel plate located before or after the variable mirror.

(13) The optical system according to any one of (1) to (12) above, which comprises at least two optical elements each having a free-form surface.

(14) The optical system according to any one of (1) to (12) above, which comprises one reflection type optical element having a free-form surface.

(15) The optical system according to any one of (1) to (14) above, wherein the diaphragm is located between the reflection type optical element having a free-form surface and the variable mirror.

(16) The optical system according to any one of (1) to (14) above, wherein the diaphragm is located in front of the reflection type optical element having a free-form surface and the variable mirror is located in front of the diaphragm.

(17) The optical system according to any one of (1) to (15) above, wherein the diaphragm is located between a plurality of free-form surface optical elements.

(18) The optical system according to any one of (1) to (17) above, wherein the variable mirror is located in opposition to the surface of the reflection type optical element having a free-form surface, located in the rear of the diaphragm.

(19) The optical system according to any one of (1) to (18) above, wherein the optical element having a free-form surface is a free-form surface prism.

(20) An optical system comprising a variable mirror, characterized by comprising a full-open diaphragm at a position that satisfies condition (601), wherein another diaphragm having an aperture of varying size is located at a position different from the position of said diaphragm.

(21) The optical system comprising a variable mirror according to any one of (1) to (11) above, characterized by comprising a full-open diaphragm at a position that satisfies condition (601), wherein another diaphragm having an aperture of varying size is located at a position different from the position of said diaphragm.

(22) An optical system comprising a variable mirror, wherein the angle of incidence of the optical axis of the optical system on the variable mirror satisfies conditions (613) to (615).

(23) An optical system, which comprises a variable mirror and a lens having a rotationally symmetric surface or a plane-parallel plate located before or after the variable mirror, and satisfies conditions (613) to (615).

(24) The optical system according to (23) above, which comprises only one variable mirror.

(25) The optical system according to (23) above, which comprises a lens having a rotationally symmetric surface and only one variable mirror.

(26) The optical system according to any one of (22) to (25) above, which comprises a free-form surface optical element.

(27) The optical system according to any one of (22) to (26) above, which is further dependent on any one of (1) to (21) above.

(28) An optical system, which comprises a variable mirror and satisfies condition (616) or (617).

(29) The optical system according to any one of (1) to (27) above, which comprises a variable mirror and satisfies condition (616) or (617).

(30) The optical system according to (29) above, which is a zoom optical system.

(31) The optical system according to (30) above, which is a zoom optical system comprising a moving lens or lens group.

(32) The optical system according to (31) above, wherein the moving lens or lens group has convex power.

(33) The optical system according to (31) above, wherein the moving lens or lens group has concave power.

(34) The optical system according to any one of (1) to (29) above, which further comprises an image pickup device.

(35) An optical apparatus comprising an element having variable optical properties and an image plane, characterized in that to correct an optical system for movement of an image-formation surface in association with a change in the element having variable optical properties, the image plane is placed in the range of a change in the movement of the image-formation surface in association with the change in the element having variable optical properties.

(36) An optical apparatus comprising a variable mirror and an image plane, characterized in that to correct an optical system for movement of an image-formation surface in association with a change in the variable mirror, the image plane is placed in the range of a change in the movement of the image-formation surface in association with the change in the variable mirror.

(37) An optical apparatus comprising a variable-focus lens and an image plane, characterized in that to correct movement of an image-formation surface in association with a change in the variable-focus lens, the image plane is placed in the range of a change in the movement of the image-formation surface in association with the change in the variable-focus lens.

(38) An image pickup apparatus comprising an optical element having variable optical properties and an image pickup device, characterized in that to compensate for a change in the tilt of an image-formation surface in association with a change in the optical element having variable optical properties, the image pickup device is decentered or tilted, thereby compensating for a decrease in image-formation performance in association with the change in the optical element having variable optical properties.

(39) An image pickup apparatus comprising a variable mirror and an image pickup device, characterized in that to correct movement of an image plane in association with a change in the variable mirror, the image pickup surface of the image pickup device is placed in the range of a change in the movement of the image plane in association with the change in the variable mirror.

(40) An image pickup apparatus comprising a variable-focus lens and an image pickup device, characterized in that to correct movement of an image plane in association with a change in the variable-focus lens, the image pickup surface of the image pickup device is placed in the range of a change in the movement of the image plane in association with the change in the variable-focus lens.

(41) An optical apparatus comprising an optical element having variable optical properties and a display device, characterized in that to compensate for a change in the tilt of an image-formation surface in association with a change in the optical element having variable optical properties, the display device is decentered, thereby compensating for a decrease in display performance in association with the change in the optical element having variable optical properties.

(42) A display apparatus comprising a variable mirror and a display device, characterized in that to correct movement of an image-formation surface in association with a change in the variable mirror, the display surface of the display device is placed in the range of a change in the movement of the image-formation surface in association with the change in the variable mirror.

(43) A display apparatus comprising a variable-focus lens and a display device, characterized in that to correct movement of an image-formation surface in association with a change in the variable-focus lens, the display surface of the display device is placed in the range of a change in the movement of the image-formation surface in association with the change in the variable-focus lens.

(44) An optical apparatus comprising an element having variable optical properties and an image plane, characterized in that the image plane is spaced $\Delta M$ away from the end of the range of a change in the tilt of an image-formation surface in association with a change in the element having variable optical properties, wherein $\Delta M$ satisfies condition (611) or (612).

(45) An image pickup apparatus comprising a variable mirror and an image pickup device, characterized in that an image-pickup surface is spaced $\Delta M$ away from the end of the range of a change in the tilt of an image-formation surface in association with a change in the variable mirror, wherein $\Delta M$ satisfies condition (611).

(46) A display apparatus comprising a variable mirror and a display device, characterized in that an image pickup surface is spaced $\Delta M$ away from the end of the range of a change in the tilt of an image-formation surface in association with a change in the variable mirror, wherein $\Delta M$ satisfies condition (611).

(47) The optical apparatus, display apparatus, and image pickup apparatus according to any one of (35) to (46) above, which satisfies condition (607) or (608).

(48) The optical apparatus, display apparatus, and image pickup apparatus according to any one of (35) to (46) above, which satisfies conditions (605) and (606).

(49) The optical apparatus, display apparatus, and image pickup apparatus according to any one of (35) to (46) above, which satisfies conditions (605) and (604).

(50) An optical apparatus comprising an optical element having variable optical properties, an optical device and a fixed image plane, characterized in that to compensate an optical system for movement of an image-formation surface in association with a change in the optical element having variable optical properties, the optical device is decentered to tilt the image-formation surface, thereby setting the fixed image plane in the range of a change in the tilt of the image-formation surface in association with the change in the optical element having variable optical properties.

(51) An optical apparatus comprising a variable mirror, an optical element and a fixed image plane, characterized in that to compensate an optical system for movement of an image-formation surface in association with a change in the variable mirror, the optical element is decentered to tilt the image-formation surface, thereby setting the fixed image plane in the range of a change in the movement of the image-formation surface in association with the change in the variable mirror.

(52) An optical apparatus comprising a variable-focus lens, an optical element and a fixed image plane, characterized in that to compensate an optical system for movement of an image-formation surface in association with a change in the variable-focus lens, the optical element is decentered to tilt the image-formation surface, thereby setting the fixed image plane in the range of a change in the movement of the image-formation surface in association with the change in the variable-focus lens.

(53) An image pickup apparatus comprising a variable mirror, an optical element and an image pickup device, characterized in that to compensate an optical system for movement of an image-formation surface in association with a change in the variable mirror, the optical element is decentered to tilt the image-formation surface, thereby setting an image pickup surface in the range of a change in the movement of the image-formation surface in association with the change in the variable mirror.

(54) A display apparatus comprising a variable mirror, an optical element and a display device, characterized in that to compensate an optical system for movement of an image-formation surface in association with a change in the variable mirror, the optical element is decentered to tilt the image-formation surface, thereby setting the display surface of the display device in the range of a change in the movement of the image-formation surface in association with the change in the variable mirror.

(55) The optical apparatus, and display apparatus according to any one of (50) to (54) above, which satisfies condition (607) or (608).

(56) The optical apparatus, and display apparatus according to any one of (50) to (54) above, which satisfies conditions (605) and (606).

(57) The optical apparatus, and display apparatus according to any one of (50) to (54) above, which satisfies conditions (605) and (604).

(58) An optical apparatus comprising an optical element having variable optical properties, an optical device and an image plane, characterized in that to compensate an optical system for movement of an image-formation surface in association with a change in the optical element having variable optical properties, the optical device is decentered to tilt the image-formation surface, thereby bringing the image plane close to the image-formation surface that moves in association with the change in the optical element having variable optical properties.

(59) An optical apparatus comprising a variable mirror, an optical element and an image plane, characterized in that to compensate an optical system for movement of an image-formation surface in association with a change in the variable mirror, the optical element is decentered to tilt the image-formation surface, thereby bringing the image plane close to the image-formation surface that moves upon the change in the variable mirror.

(60) An optical apparatus comprising a variable-focus lens, an optical element and an image plane, characterized in that to compensate an optical system for movement of an image-formation surface in association with a change in the variable-focus lens, the optical element is decentered to tilt the image-formation surface, thereby bringing the image plane close to the image-formation surface that moves upon the change in the variable-focus lens.

(61) An optical apparatus comprising a variable mirror, an optical element and an image pickup device, characterized in that to compensate an optical system for movement of an image-formation surface in association with a change in the variable mirror, the optical element is decentered to tilt the image-formation surface, thereby bringing an image plane close to the image-formation surface that moves upon the change in the variable mirror.

(62) An optical apparatus comprising a variable mirror, an optical element and a display device, characterized in that to compensate an optical system for movement of an image-formation surface in association with a change in the variable mirror, the optical element is decentered to tilt the image-formation surface, thereby bringing the display surface of the display device to the image-formation surface that moves upon the change in the variable mirror.

(63) The optical apparatus according to any one of (58) to (62) above, which satisfies condition (618) or (619).

(64) An optical apparatus comprising an optical element having variable optical properties and an optical device, characterized in that to compensate for a change in aberrations in association with a change in the optical element having variable optical properties, the optical device is decentered to produce aberrations, thereby compensating for the change in aberrations in association with the change in the optical element having variable optical properties.

(65) An optical apparatus comprising a variable mirror and an optical element, characterized in that to compensate for a change in aberrations in association with a change in the variable mirror, the optical element is decentered to produce aberrations, thereby compensating for the change in aberrations in association with the change in the variable mirror.

(66) An image pickup apparatus comprising a variable mirror, an optical element and an image pickup device, characterized in that to compensate for a change in aberrations in association with a change in the variable mirror, the optical element is decentered to produce aberrations, thereby compensating for the change in aberrations in association with the change in the variable mirror.

(67) An optical apparatus comprising a variable-focus lens and an optical element, characterized in that to compensate for a change in aberrations in association with a change in the variable-focus lens, the optical element is decentered to produce aberrations, thereby compensating for the change in aberrations in association with the change in the variable-focus lens.

(68) The optical apparatus, display apparatus, and image pickup apparatus according to any one of (50) to (67) above, characterized in that to change the amount of decentration of the optical element, the optical element is moved along an optical axis that is decentered with respect to another optical element.

(69) The optical apparatus, display apparatus, and image pickup apparatus according to any one of (50) to (68) above, characterized in that to change decentration aberrations occurring at the optical element in operative association with the optical element having variable optical properties, an optical element that is decentered with respect to a certain axis is moved along that axis.

(70) The optical apparatus, display apparatus, and image pickup apparatus according to any one of (50) to (68) above, characterized by further comprising a zoom optical system, wherein to change the amount of decentration of the optical element, the optical element moves along an optical axis that is decentered with respect to another optical element and the movement of the optical element has a zooming function.

(71) The optical apparatus, display apparatus, and image pickup apparatus according to any one of (50) to (70) above, characterized by further comprising a zoom optical system, wherein to change decentration aberrations occurring at the optical element in operative association with the change in the optical element having variable optical properties, the optical element that is decentered with respect to a certain axis moves along that axis, and the movement of said optical element has a zooming function.

(72) An optical apparatus using at least one variable mirror, characterized in that a shift decentration Δ is intentionally added to at least one lens or optical surface or optical device or image pickup device in a vertical direction to the Z axis thereof and in such a range as to meet $0 \leq |\Delta|/f < 1$.

(73) The optical apparatus, display apparatus, and image pickup apparatus according to any one of (50) to (70) above, which further comprises the arrangement according to (72) above.

(74) An optical apparatus using at least one variable mirror, characterized in that a tilt decentration C is intentionally added to at least one lens or optical surface or optical device or image pickup device or display device or image plane in such a range as to meet $0 \leq |C|/ < 15$ wherein the unit of C is °, with the axis of rotation defined by a straight line vertical to the Z-axis thereof.

(75) The optical apparatus, display apparatus, and image pickup apparatus according to any one of (50) to (70) above, which further comprises the arrangement according to (74) above.

(76) The optical apparatus, display apparatus, and image pickup apparatus according to any one of (64) to (71) above, characterized in that the decentered optical element has a rotationally symmetric surface.

(77) The optical apparatus, display apparatus, and image pickup apparatus according to any one of (64) to (71) above, characterized by further comprising an optical element having at least three rotationally symmetric optical surfaces that are decentered with respect to one another.

(78) The optical apparatus, display apparatus, and image pickup apparatus according to any one of (64) to (77) above, characterized by further comprising a fixed image plane, wherein the fixed image plane is tilted by C with respect to a plane orthogonal with respect to the optical axis incident on the image plane.

(79) The optical apparatus, display apparatus, and image pickup apparatus according to any one of (35) to (68) above, which further comprises the optical system according to any one of (1) to (29) above.

(80) The optical apparatus, display apparatus, and image pickup apparatus according to (79) above, characterized in that focusing is performed using a variable mirror.

(81) The optical apparatus, display apparatus, and image pickup apparatus according to (80) above, characterized in that upon focusing, at least one variable mirror turns to a free-form surface shape in at least a certain state.

(82) The optical apparatus, display apparatus, and image pickup apparatus according to (80) or (81) above, wherein focusing is performed while an object image is formed on the image pickup device with a change in the focal length of the variable mirror, so that the state where the high frequency component of the object image reaches a maximum is found out.

(83) The optical apparatus, display apparatus, and image pickup apparatus according to (80) above, characterized in that any one of the variable mirrors has an increased converging action at a near point and a decreased converging action at a far point.

(84) The optical apparatus, display apparatus, and image pickup apparatus according to (79) above, characterized in that zooming is carried out using a variable mirror.

(85) The optical apparatus, display apparatus, and image pickup apparatus according to (80) above, characterized in that upon zooming, at least one variable mirror turns to a free-form surface shape in at least a certain state.

(86) The optical apparatus, display apparatus, and image pickup apparatus according to (84) or (85) above, wherein focusing is performed while an object image is formed on the image pickup device with a change in the focal length of the variable mirror, so that the state where the high frequency component of the object image reaches a maximum is found out.

(87) The optical apparatus, display apparatus, and image pickup apparatus according to any one of (84) to (86) above, characterized in that any one of the variable mirrors has an increased converging action at a near point and a decreased converging action at a far point.

(88) The optical apparatus, display apparatus, and image pickup apparatus according to any one of (1) to (87), wherein the variable mirror used is driven in any one mode of electrostatic, electromagnetic, piezoelectric effect and fluid driving modes.

(89) The optical apparatus, display apparatus, and image pickup apparatus according to any one of (1) to (88) above, characterized in that the variable mirror is a variable-shape mirror having a variable-shape reflecting surface, wherein a transforming portion of the reflecting surface turns to a shape that is long in the entrance surface direction for an axial chief ray as viewed from the direction vertical to the reflecting surface.

(90) A camera, characterized in that when an optical axis is bent on a long side thereof, the post-bending optical axis is located in a substantially lateral direction of the camera.

(91) The camera according to (90) above, which further comprises the arrangement according to any one of (1) to (83) above.

(92) A camera, characterized in that when an optical axis is bent on a short side thereof, the post-bending optical axis is located in a substantially longitudinal direction of the camera.

(93) The camera according to (92) above, which further comprises the arrangement according to any one of (1) to (83) above.

(94) The camera according to any one of (90) to (93) above, wherein a flash is located above the forefront surface of a photo taking lens.

(95) An image pickup optical system using at least one variable mirror, characterized in that shift decentration is intentionally added to at least one lens or optical surface or optical device or image pickup device or image plane in a vertical direction to the Z axis thereof and in such a range as to meet condition (101).

(96) An optical system using at least one variable mirror, characterized in that tilt decentration is intentionally added to at least one lens or optical surface or optical device or image pickup device or image plane in such a range as to meet condition (103), with the axis of rotation defined by a straight line vertical to the Z axis thereof.

(97) An optical system, characterized by comprising an invariable-shape mirror and a diaphragm, wherein the position of the diaphragm satisfies condition (601).

(98) An optical system, characterized by comprising an invariable-shape mirror and a diaphragm, and satisfying condition (599).

(99) An optical system, characterized by comprising an invariable-shape mirror, and satisfying condition (616) or (617).

The optical elements having variable optical properties, which are used for the optical system and optical apparatus of the invention as well as the optical apparatus, etc. of the invention are now explained with reference to the accompanying drawings.

An account is now given of exemplary constructions of the variable-shape mirror and variable-focus lens that are usable as the optical elements having variable optical properties in the invention. That is, prior to giving the inventive embodiments (Embodiments 1–10), set out are first embodiments of the aforesaid variable-shape mirror applicable to each inventive example (Examples 1–9 of the variable-shape mirror) and then examples of the aforesaid variable-focus lens (Embodiments 1–9 of the variable-focus lens).

EXAMPLE 1 OF THE VARIABLE-SHAPE MIRROR

FIG. 1 is illustrative in schematic of the Keplerian finder of a digital camera, which is used as the optical apparatus of the invention, that is, a variable-shape mirror applied as a part of the viewing optical system. This variable-shape mirror may also be used as a part of the viewing optical system of a silver-halide camera. First, the variable-shape mirror having variable optical properties, shown at 409, is explained. The variable-shape mirror 409 having variable optical properties (hereinafter often called simply the variable-shape mirror) comprises a transforming layer of the triple-layer structure consisting of an electrode 409k, a transformable substrate 409j and a thin film (reflecting surface) 409a formed by coating aluminum on the substrate 409j and functioning as a reflecting surface. The transforming layer is supported on a supporting member 423, and on the lower side of the supporting member 423 there are provided a plurality of electrodes 409b spaced away from the electrode 409k. Reference numeral 411a represents a plurality of variable resistors connected to the respective electrodes 409b; 412 is a power source connected between the electrode 409k and the electrodes 409b via the variable resistors 411a and a power source switch 413; 414 is a computing unit for controlling the resistance values of a plurality of variable resistors 411a; and 415, 416 and 417 are a temperature sensor, a humidity sensor and a distance sensor connected to the computing unit 414, respectively. These components are located as shown to construct a single optical apparatus.

It is here noted that the respective surfaces of the objective lens 902, eyepiece lens 901, prism 404, isosceles right-angle prism 405, mirror 406 and variable-shape mirror 409 may be configured not only as planar surfaces but also as surfaces of many other shapes, e.g., spherical shape; rotationally symmetric aspheric shape; spherical shape, planar shape, and rotationally symmetric aspheric shape decentered with respect to the optical axis of the optical apparatus; aspheric shape having a symmetric surface; aspheric shape having only one symmetric surface; aspheric shape having no symmetric surface; free-form surface shape; and surface shape having an undifferentiable point or line. Moreover, these surfaces may be configured as reflecting or refracting surfaces. Moreover, any desired reflecting or refracting surface capable of producing some influences on light may be used in the invention. In what follows, these surfaces are generally called the "extended surface". It is noted that the term "decentration" means displacement (shift) and/or tilt.

As is the case with such a membrane mirror as set forth typically in P. Rai-choudhury, Handbook of Microlithography, Micromachining and Microfabrication, Volume 2: Micromachining and Mircofabrication, page 495, FIG. 8.58, SPIE PRESS, and Optics Communication, Volume 140 (1997) pp. 187–190, when voltages are applied between the electrodes 409b and the electrode 409k, the thin film 409a is transformed by electrostatic force so that its surface shape changes. This does not only enable focusing to be performed depending on the diopter of a viewer, but also can prevent deformation or refractive index changes due to temperature and humidity changes of lenses 901, 902 and/or prism 404, isosceles right-angle prism 405 and mirror 406 or deterioration in image-formation capabilities due to contraction and expansion and deformation of lens barrels and errors on assembling of parts such as optical elements and frames. It is thus possible to perform constantly proper focusing and make correction for aberrations resulting from focusing.

Figure 3:
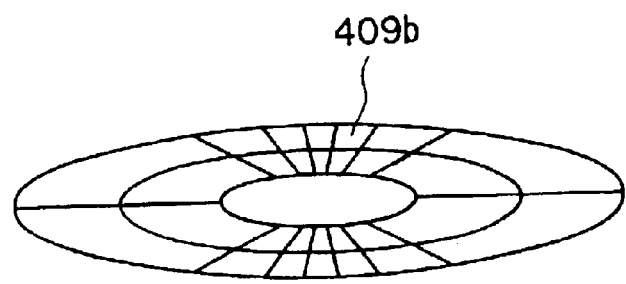
FIG. 3 is illustrative of one form of the electrode used with the variable-shape mirror of FIG. 2.
Figure 4:
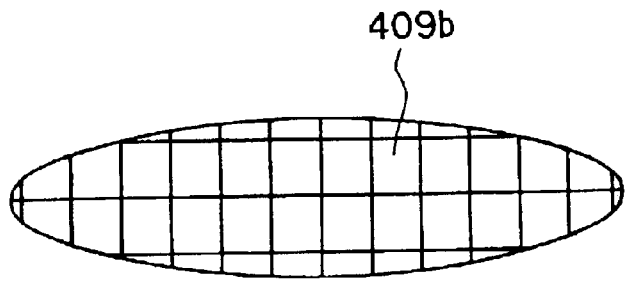
FIG. 4 is illustrative of another form of the electrode used with the variable-shape mirror of FIG. 2.

It is noted that the electrode array 409b may be concentrically or rectangularly divided as shown typically in FIGS. 3 and 4 depending on how to transform the thin film 409a.

When the aforesaid variable-shape mirror 409 is used, light from an object is refracted at the respective entrance and exit surfaces of objective lens 902 and prism 404, reflected at the variable-shape mirror 409 and further reflected at the isosceles right-angle prism 405 upon transmission through the prism 404 (In FIG. 1, the + mark in the optical path indicates that light rays propagate beyond the back side of the paper). Then, the light is reflected at the mirror 406, arriving at the eyes via the eyepiece lens 901. Thus, the viewing optical system of the optical apparatus is constructed of the lenses 901, 902, prisms 404, 405 and variable-shape mirror 409, so that aberrations at the object surface are minimized by optimization of the surface configuration and thickness of each optical element.

To be specific, the shape of the thin film 409a functioning as the reflecting surface is controlled by varying the resistance value of each variable resistor 411a in response to the signal from the computing unit 414 in such a way as to optimize the image-formation capabilities. Namely, signals of the magnitude commensurate with ambient temperature and humidity and a distance to the object are entered om the computing unit 414 from the temperature sensor 415, humidity sensor 416 and distance sensor 417 and in response to these input signals, the computing unit 414 produces signals for determining the resistance values of the variable resistors 411a in such a way as to apply on the electrode array 409b the voltage that determines the shape of the thin-film 409a, so that deterioration in the image-formation performance due to ambient temperature and humidity and the distance to the object can be compensated for. Thus, since the thin-film 409a is transformed by the voltage applied on the electrode array 409b, i.e., by electrostatic force, the thin-film 409a can take aspheric shape or many other shapes depending on the situations encountered. It is understood that the distance sensor 417 may be dispensed with; in this case, the image pickup lens 403 as a part of the viewing optical system of the digital camera should be moved to a position at which the high-frequency component of image signals from a solid-state image pickup device 408 is substantially maximized, so that the object distance is calculated from that position to transform the variable-shape mirror in such a way as to come into focus on the eyes of the viewer.

It is preferable to fabricate the transformable substrate 409j using a synthetic resin such as polyimide because it is largely transformable even at low voltage. It is noted that the prism 404 and variable-shape mirror 409 may be integrated into a unit.

Although not shown, it is understood that the solid-state image pickup device 408 may be integrally formed on the substrate of the variable-shape mirror 409 by means of a lithographic process.

If the lenses 901, 902, prisms 404, 405 and mirror 406 are fabricated by means of plastic molding, then any desired shape can then be imparted thereto so that they can be easily fabricated. While the lenses 901 and 902 have been described as being spaced away from the prism 404, it is understood that if the prisms 404, 405, mirror 406 and variable-shape mirror 409 are designed in such a way as to remove aberrations with no provision of the lenses 901 and 902, then the prisms 404, 405 and variable-shape mirror 409 can take the form of one optical block that is easy to assemble. It is also acceptable to fabricate a part or the whole of the lenses 901, 902, prism 404, 405 and mirror 406 using a glass material. By doing so, it is possible to obtain a viewing optical system further improved in terms of precision. It is further preferable to control the shape of the reflecting surface of the variable-shape mirror in such a way as to have the form of a free-form surface because aberrations can be favorably corrected with ease.

The "free-form surface" used herein is defined by the following formula (a) wherein the axis of the free-form surface is defined by the Z-axis thereof.

$$Z = cr^2 / \left[1 + \sqrt{\{1 - (1+k)c^2 r^2\}}\right] + \sum_{j=2}^{M} C_j X^m Y^n \quad (a)$$

Here the first term of formula (a) is a spherical term, and the second term is a free-form surface term, and M is a natural number of 2 or greater.

In the spherical term, c is the curvature of the apex, k is the conic or conical constant, and $r = \sqrt{(X^2 + Y^2)}$.

The free-form surface term is $$\sum_{j=2}^{M} C_j X^m Y^n$$

$$Z = C_2 X + C_3 Y + C_4 X^2 + C_5 XY + C_6 Y^2 + C_7 X^3 + C_8 X^2 Y +$$
$$C_9 XY^2 + C_{10} Y^3 + C_{11} X^4 + C_{12} X^3 Y + C_{13} X^2 Y^2 + C_{14} XY^3 +$$
$$C_{15} Y^4 + C_{16} X^5 + C_{17} X^4 Y + C_{18} X^3 Y^2 + C_{19} X^2 Y^3 + C_{20} XY^4 +$$
$$C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7$$

Here $C_j$ (j is an integer of 2 or greater) is a coefficient.

In general, the aforesaid free-form surface has no symmetric surface at both the X-Z plane and the Y-Z plane. However, by reducing all the odd-numbered terms for X to zero, that free-form surface can have only one symmetric surface parallel with the Y-Z plane. By reducing all the odd-numbered terms for Y to zero, the free-form surface can have only one symmetric surface parallel with the X-Z plane.

In the example of FIG. 1, the computing unit 414, temperature sensor 415, humidity sensor 416 and distance sensor 417 are provided so that the temperature and humidity changes and object distance changes, too, can be compensated for by the variable-shape mirror 409; however, this is not necessarily required. In short, the computing unit 414, temperature sensor 415, humidity sensor 416 and distance sensor 417 may be dispensed with, so that only changes in the diopter of the viewer can be corrected by means of the variable-shape mirror 409.

EXAMPLE 2 OF THE VARIABLE-SHAPE MIRROR

Figure 2:
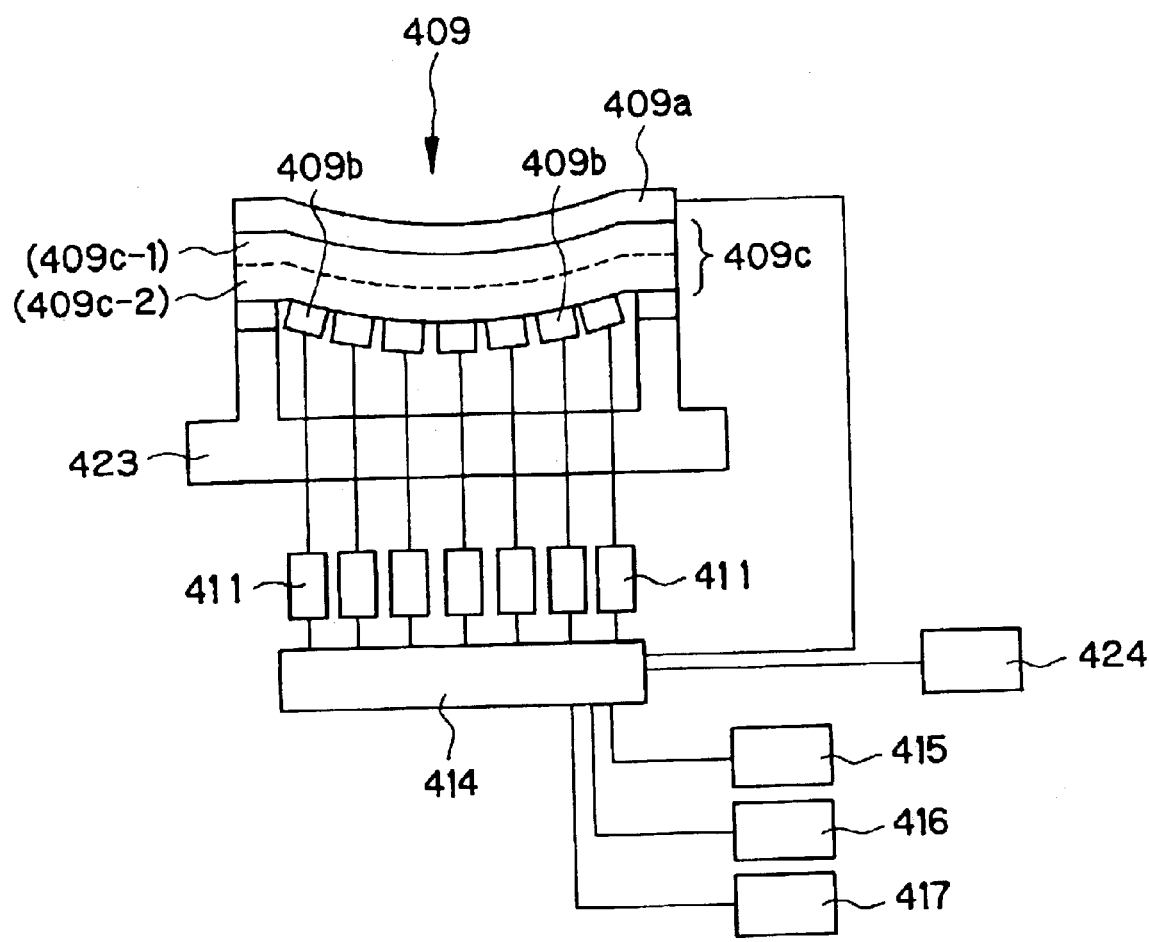
FIG. 2 is illustrative in schematic of another example of the variable-shape mirror 409.

FIG. 2 is illustrative in schematic of another example of the variable-shape mirror 409.

In this variable-shape mirror, a piezoelectric element 409c is interposed between a thin film 409a and a plurality of electrodes 409b and the assembly is provided on a supporting member 423. By varying the voltage applied on the piezoelectric element 409c for each electrode 409b, the piezoelectric element 409c is elongated and contracted in partially different manners, thereby transforming the thin film 409a. The electrode array 409b may be concentrically divided as shown in FIG. 3 or rectangularly divided as shown in FIG. 4, or alternatively it may have other shape depending on the intended purpose. In FIG. 2, reference numeral 424 is a shake sensor connected to a computing unit 414. For instance, when a digital camera shakes on photo taking, the sensor 424 actuates to sense that shake, thereby varying the voltage applied on the electrode array 409b via the computing unit 414 and variable resistors 411, so that the thin film (reflecting surface) 409a can be transformed for compensation for image blurring due to camera shake. At the same time, consideration is given to signals from the temperature sensor 415, humidity sensor 416 and distance sensor 417 for focusing, and compensation for temperature and humidity changes. Preferably in this case, some thickness and so some strength should be added to the thin film 409a because stresses in association with the transformation of the piezoelectric element 409c are applied on the thin film 409a. It is noted that although depending on the material used, the piezoelectric element 409c may have such double-layer structure 409c-1, 409c-2 as explained later.

EXAMPLE 3 OF THE VARIABLE-SHARP MIRROR

Figure 5:
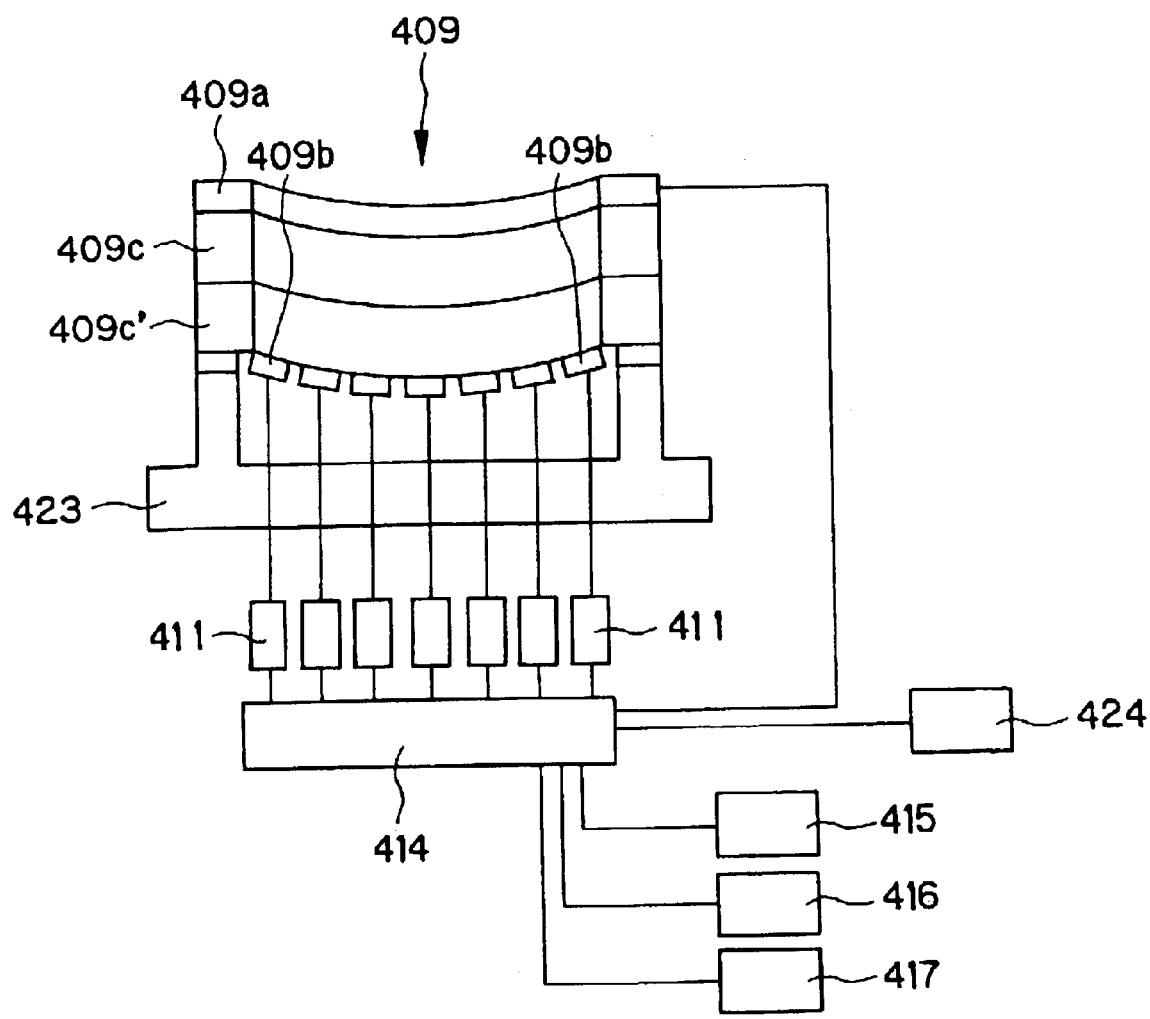
FIG. 5 is illustrative in schematic of yet another example of the variable-shape mirror 409.

FIG. 5 is illustrative in schematic of yet another example of the variable-shape mirror 409.

This variable-shape mirror is different from the variable-shape mirror shown in FIG. 2 in that the piezoelectric element interposed between the thin film 409a and a plurality of electrodes 409b is made up of two piezoelectric elements 409c and 409c' formed of materials having piezoelectric properties in opposite directions. That is, when the piezoelectric elements 409c and 409c' are formed of ferro-electric crystals, they are located with the orientations of crystallographic axes being in opposite directions. In this case, since the piezoelectric elements 409c and 409c' are elongated and contracted in opposite directions upon receipt of voltages, the force that transforms the thin film 409a (reflecting surface) becomes stronger than that of the example of FIG. 2, resulting in large transformation of the mirror surface. Other reference numerals in FIG. 5 are the same as in FIG. 2.

The piezoelectric element 409c, 409c', for instance, may be formed of piezoelectric materials such as barium titanate, Rochelle salt, quartz, tourmaline, potassium dihydrogenphosphate (KDP), ammonium dihydrogenphosphate (ADP) and lithium niobate, polycrystals and crystals thereof, solid-solution piezoelectric ceramics of $PbZrO_3$ and $PbTiO_3$, organic dielectric materials such as poly(vinyl difluoride) (PVDF), and ferroelectric materials other than the aforesaid materials, among which the organic piezoelectric materials are particularly preferred because of their low Young's modulus and because they can undergo large transformation even at low voltage. It is noted that if these piezoelectric elements are used at an uneven thickness, it is also possible to properly transform the thin film 409a in each of the aforesaid examples.

The piezoelectric element 409c, 409' may also be formed of polymer piezoelectric materials such as polyurethane, silicone rubber, acryl elastomer, PZT, PLZT, poly (vinylidene fluoride)(PVDF), copolymers such as vinylidene cyanide copolymers and copolymers of vinylidene fluoride and trifluoroethylene.

It is preferable to use organic materials having piezoelectricity, synthetic resins having piezoelectricity, elastomers having piezoelectricity, etc., because it is possible to largely transform the surface of a variable-shape mirror.

Figure 6:
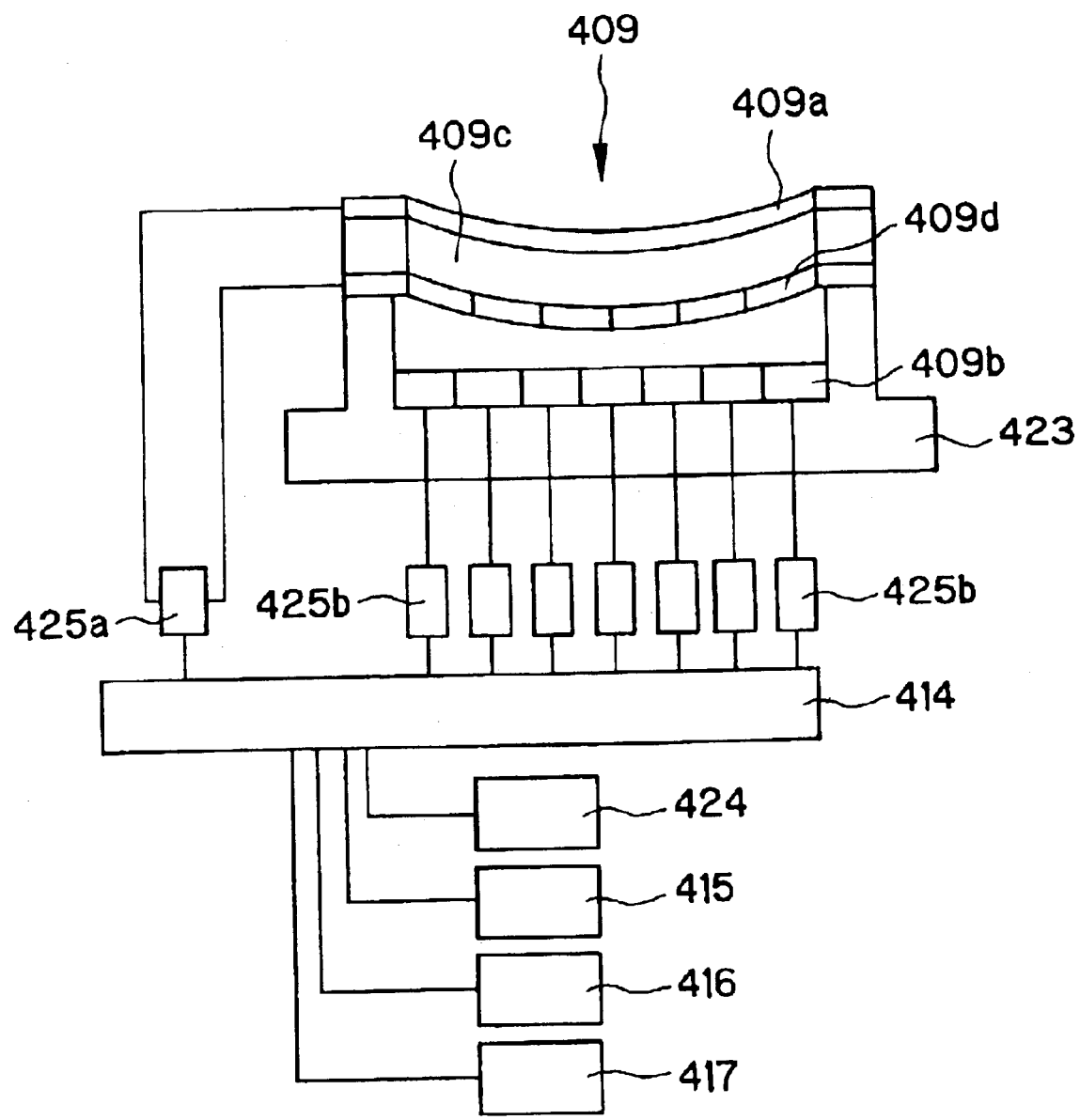
FIG. 6 is illustrative in schematic of a further example of the variable-shape mirror 409.

It is noted that when the piezoelectric element 409c of FIG. 2 or FIG. 6 is formed of an electrostrictive material such as an acryl elastomer or silicone rubber, it may be provided in the form of a double-layer structure wherein a layer of the piezoelectric element 409c is laminated on a combined substrate 409c and electro-strictive material 409c-2.

EXAMPLE 4 OF THE VARIABLE-SHARP MIRROR

FIG. 6 is illustrative in schematic of a further example of the variable-shape mirror 409.

In this variable-shape mirror, the piezoelectric element 409c is sandwiched between the thin film 409a and a plurality of electrodes 409d, and the assembly is provided on the supporting member 423. Then, voltage is applied on the piezoelectric element 409c between the thin film 409a and the electrodes 409d via the driving circuit 425 controlled by the computing unit 414. Besides, voltage is applied on a plurality of electrodes 409b provided on the internal bottom of the supporting member 423 via the driving circuit 425b controlled by the computing unit 414. Accordingly, the thin film 409a can be subjected to double transformation by the voltage applied between the thin film 409a and the electrodes 409d and electrostatic force resulting from the voltage applied on the electrodes 409b, so that much more transformation patterns than could be achieved in any of the aforesaid examples can be obtained with faster responsibility. Other reference numerals in FIG. 6 are the same as in FIG. 2.

By varying the sign of the voltage between the thin film 409a and the electrodes 409d, it is possible to transform the thin film 409a of the variable-shape mirror into either convex shape or concave shape. In this case, it is acceptable to achieve large transformation using the piezoelectric effect and minute transformation using electrostatic force. It is also acceptable to use mainly the piezoelectric effect for convex transformation and mainly electrostatic force for concave transformation. It is noted that the electrode 409d may be constructed as a single electrode or using a plurality of electrodes as is the case with the electrodes 409b. How the electrode 409d is constructed using a plurality of electrodes is illustrated in FIG. 6. It is understood that the term "piezoelectric effect" used herein includes not only the piezoelectric effect but the electrostrictive effect as well, and the piezoelectric material is understood to include the electrostrictive material, too.

EXAMPLE 5 OF THE VARIABLE-SHAPE MIRROR

Figure 7:
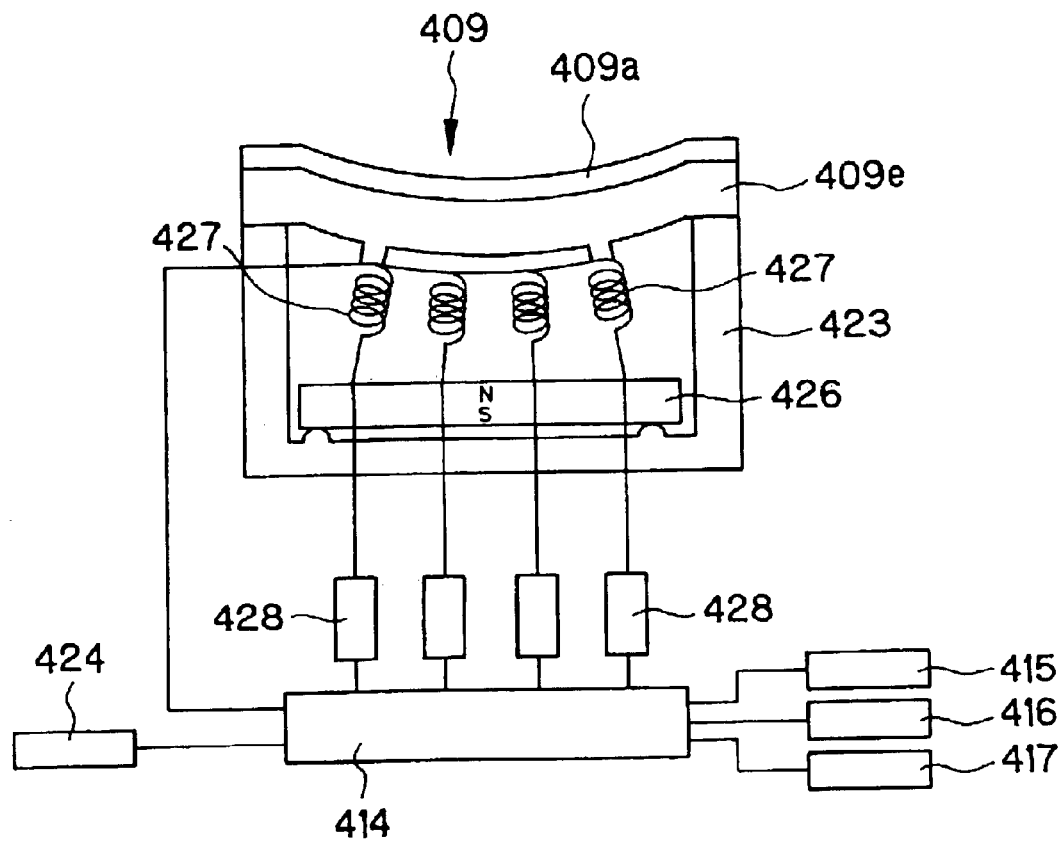
FIG. 7 is illustrative in schematic of a further example of the variable-shape mirror 409.

FIG. 7 is illustrative in schematic of yet another example of the variable-shape mirror 409.

This variable-shape mirror is designed such that the reflecting surface can be transformed by making use of electromagnetic force. The permanent magnet 426 is fixed on the inside bottom of the support frame 423, and the peripheral portion of the substrate 409e formed of silicon nitride, polyimide or the like is fixedly placed on top of that frame. In addition, the thin film 409a formed of an aluminum or other metal coat is provided on the surface of the substrate 409e, so that the variable-shape mirror 409 is set up. The substrate 409e is fixedly provided on its lower surface with a plurality of coils 427 that are then connected to the computing unit 414 via the respective driving circuits 428. Other reference numerals in FIG. 7 are the same as in FIG. 2. In response to output signals from the computing unit 414, which correspond to changes in the optical system which changes are determined in the computing unit 414 by signals from the respective sensors 415, 416, 417 and 424, suitable currents are fed to the respective coils 427 through the respective driving circuits 428, whereupon the respective coils 427 are repulsed or adsorbed by electromagnetic force exerted between them and the permanent magnet 426, so that the substrate 409e and thin film 409a can be transformed.

In this case, it is acceptable to pass varying amounts of currents through the respective coils 427, or use a single coil 427. Alternatively, the permanent magnet 426 may be provided on the lower surface of the substrate 409e while the coils 427 may be provided on the inside bottom of the support frame 423. Preferably, the coils 427 should be designed as thin-film coils as by lithography. The coils 427 may also have therein cores formed of ferromagnetic materials.

Figure 8:
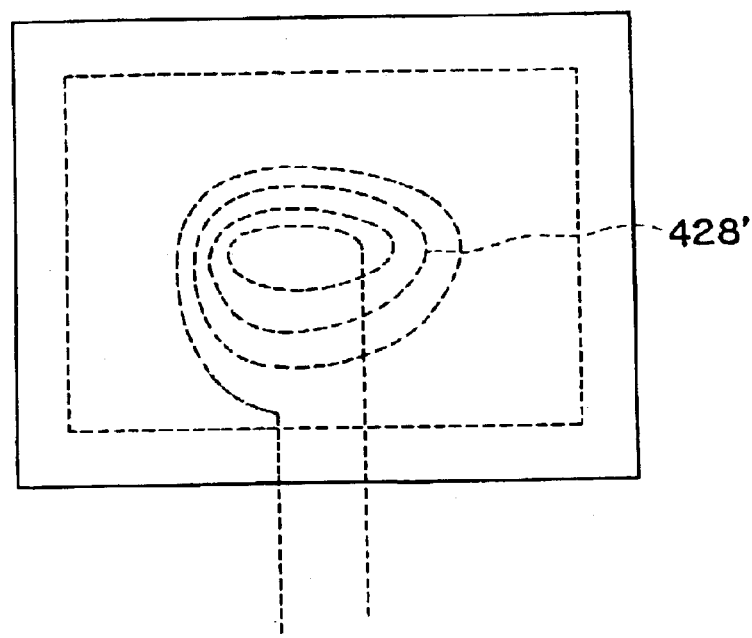
FIG. 8 is illustrative of the turn density of the thin-film coil 427 in the example of FIG. 7.

The thin-film coil 427 may also be designed in such a way as to have a turn density that varies depending on the site of the lower surface of the substrate 409e, as is the case of such a coil 428' as shown in FIG. 8, thereby imparting the desired transformation to the substrate 409e and thin-film 409a. The coil 472 may be used in the form of a single coil or may have therein a core of ferromagnetic material.

EXAMPLE 6 OF THE VARIABLE-SHARP MIRROR

Figure 9:
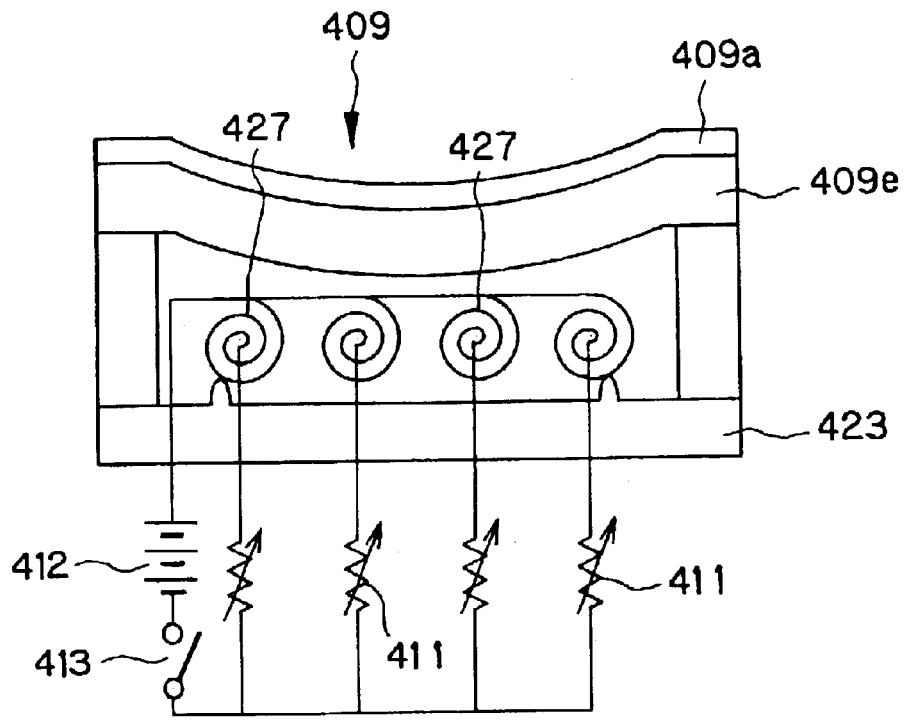
FIG. 9 is illustrative in schematic of a further example of the variable-shape mirror 409.

FIG. 9 is illustrative in schematic of a further example of the variable-shape mirror 409. Other reference numerals in FIG. 9 are the same as in FIG. 2.

Figure 10:
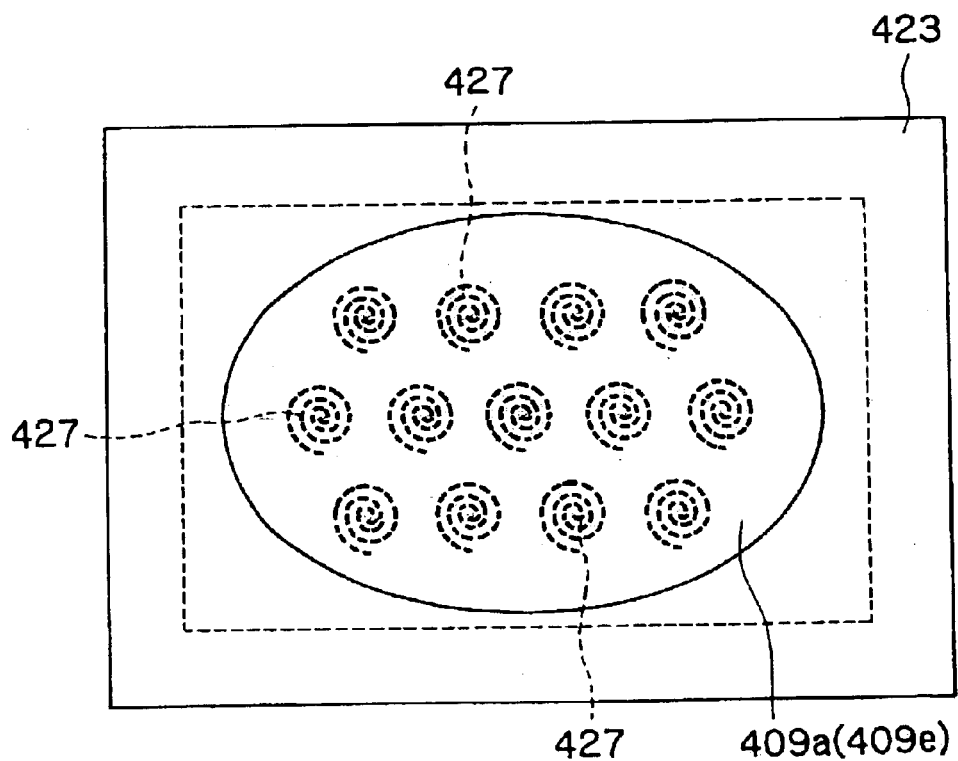
FIG. 10 is illustrative of one example of how the coils 427 are located in the example of FIG. 9.
Figure 11:
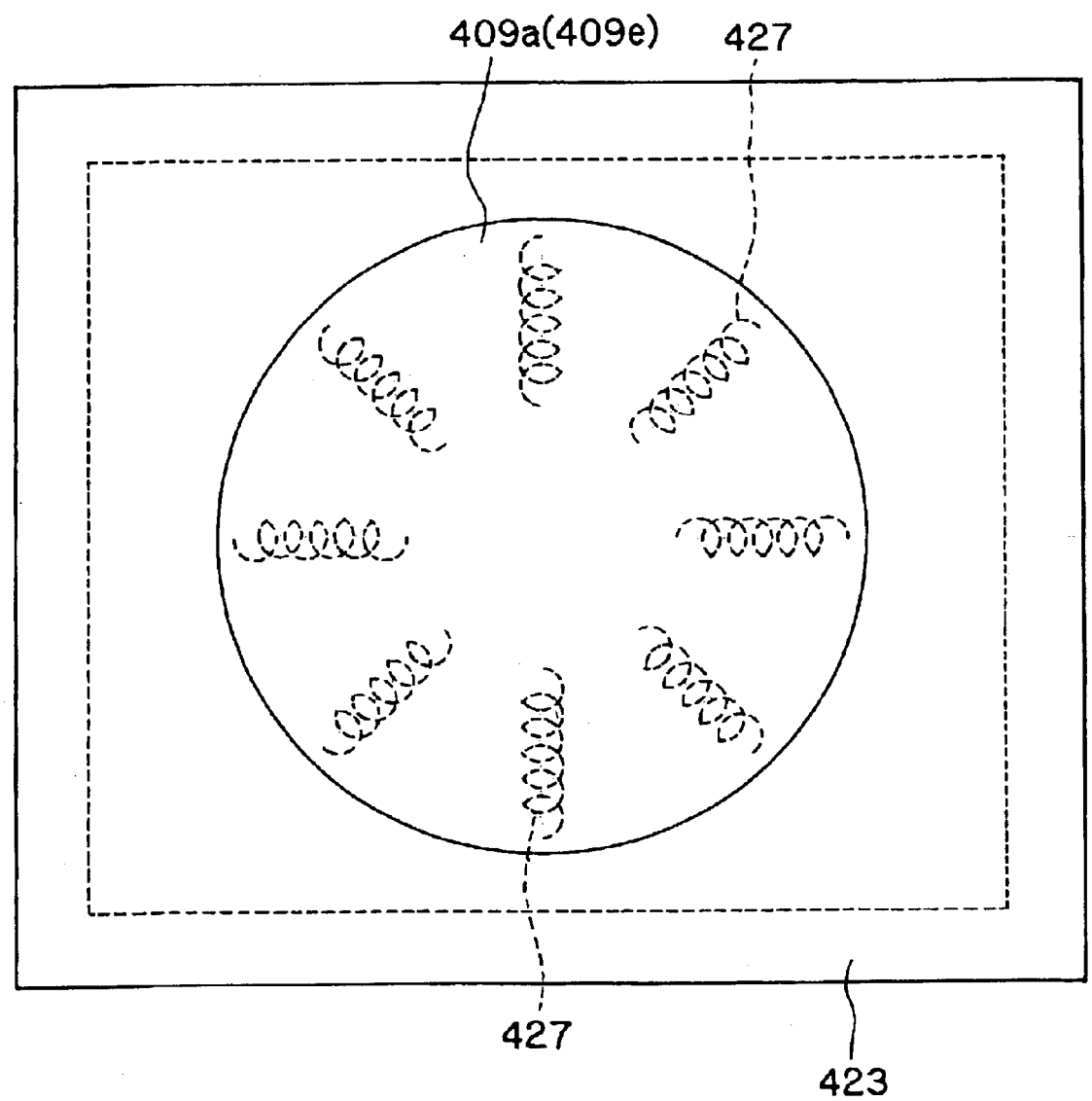
FIG. 11 is illustrative of another example of how the coils 427 are located in the example of FIG. 9.
Figure 12:
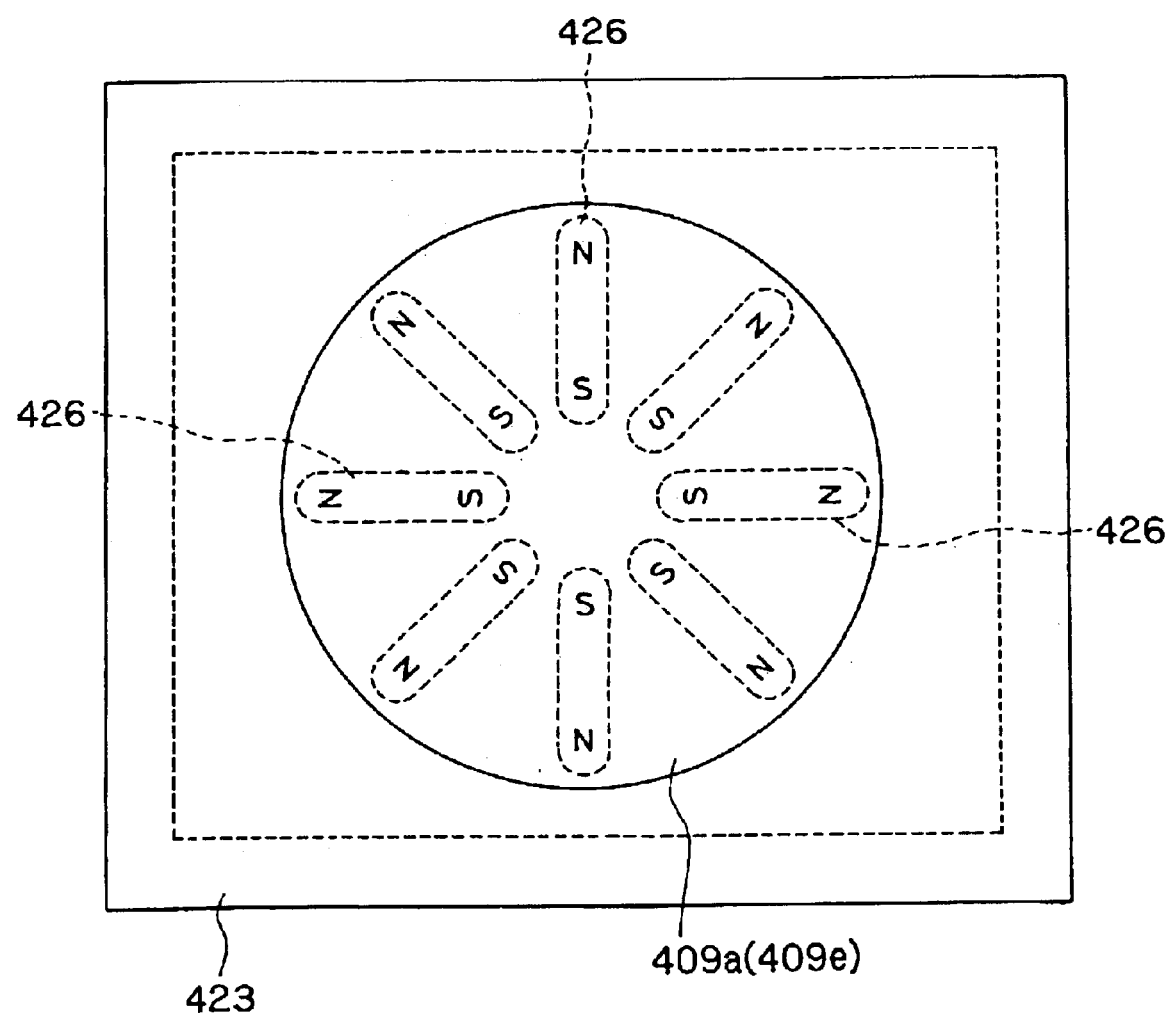
FIG. 12 is illustrative of the locations of the permanent magnets 426 suitable for the case where the coils 427 are located as in FIG. 11 in the example shown in FIG. 7.

In this variable-shape mirror, the substrate 409e is formed of iron or other ferromagnetic material, and the thin film 409a functioning as a reflecting film is formed of aluminum or the like. The peripheral portion of the substrate 409e is fixedly placed on top of the support frame 423, and the coils 427 are fixed on the inside bottom of the support frame 423. In this case, since it is unnecessary to provide the thin-film coils on the lower surface of the substrate 409e, the variable-shape mirror can be simplified in construction and so can be fabricated at low costs. If the power source switch 413 is replaced by a combined changeover and open/close switch, the directions of currents passing through the coils 427 can be so changed that the shape of the substrate 409e and thin film 409a can be changed without restraint. FIG. 10 shows one example of locating the coils 427 with respect to the substrate 409e and thin film 409a, and FIG. 11 shows another example of locating the coils 427. These locations may also be applied to the example of FIG. 7. FIG. 12 illustrates the locations of the permanent magnets 426 well fit for the case where the coils 427 are radially located as shown in FIG. 11. That is, if the permanent magnets 426 each in a rod form are radially located, more delicate transformation than could be achieved in the example of FIG. 7 can then be imparted to the substrate 409e and thin film 409a. Such transformation of the substrate 409e and thin film 409a by electromagnetic force (the examples of FIGS. 7 and 9) has a merit over transformation by electrostatic force in that the driving voltage can be much more reduced.

The present invention has been described with reference to some examples of the variable-shape mirror. For transformation of the mirror formed of a thin film, however, it is acceptable to make use of two or more forces, as exemplified in FIG. 6. In short, it is acceptable to transform the variable-shape mirror by simultaneous use of at least two of electrostatic force, electromagnetic force, piezoelectric effect, electro-striction, fluid pressure, magnetic field, temperature change, electromagnetic waves, etc. That is, if an optical element having variable optical properties is fabricated with two or more different driving methods, large transformation and fine transformation are then achievable at the same time and, hence, a mirror surface with satisfactory precision is achievable.

EXAMPLE 7 OF THE VARIABLE-SHARP MIRROR

Figure 13:
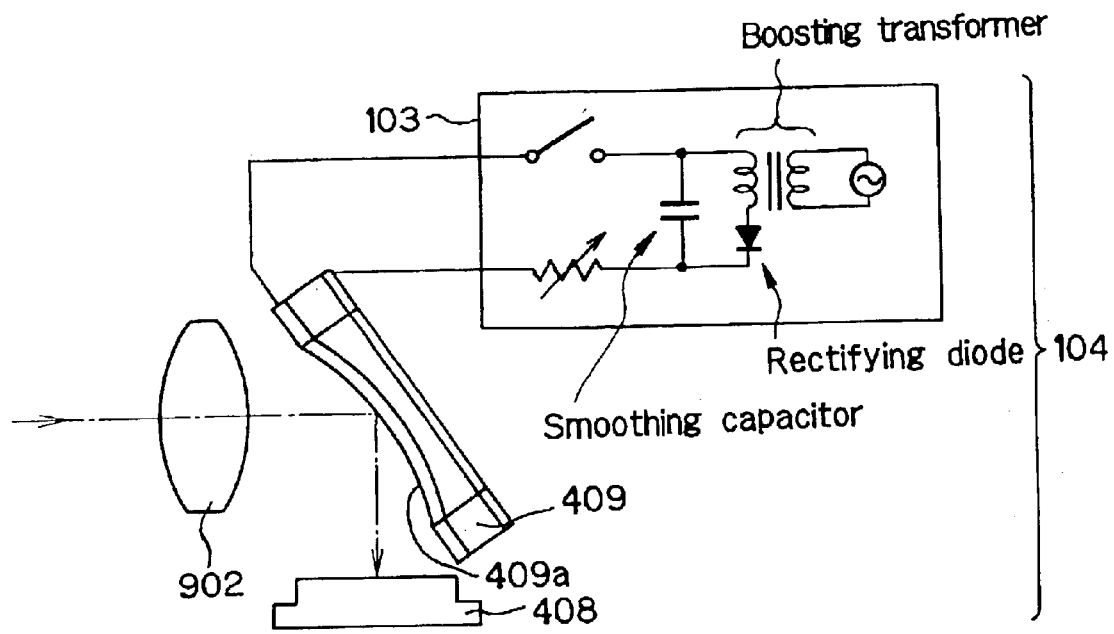
FIG. 13 is illustrative in schematic of the image pickup optical system using the variable-shape mirror 409 applicable to another optical apparatus of the invention, specifically image pickup optical systems such as digital cameras for cellular phones, capsule endoscopes, electronic endoscopes, digital cameras for personal computers and digital cameras for PDAs.

FIG. 13 is illustrative in schematic of an arrangement wherein the variable-shape mirror 409 is used for an image pickup optical system of optical apparatus, for instance, an arrangement wherein the variable-shape mirror is used for an image pickup optical system of a digital camera for cellular phones, capsule endoscopes, electronic endoscopes, a digital camera for personal computers and a digital camera for PDAs.

This image pickup optical system comprises a single image pickup unit 104 or a single optical apparatus composed of the variable-shape mirror 409, lens 902, solid-state image pickup device 408 and control system 103. In this image pickup unit 104, object light passes through the lens 902, and arrives at the variable-shape mirror 409 where the light is condensed upon reflection at the thin film (reflecting surface) 409a, so that an image is formed on the solid-state image pickup device 408. The variable-shape mirror 409 is a sort of optical element having variable optical properties, and is sometimes called a variable-focus mirror.

According to this example, even at a varying distance, focusing is achievable by transformation of the reflecting surface 409a of the variable-shape mirror 409. Since it is not necessary to drive the lens 902 by means of a motor or the like, this example is favorable in view of size reductions, weight reductions, and power savings. The image pickup unit 104 can be used as the image pickup optical system of the invention throughout the examples. If a plurality of variable-shape mirrors 409 are used, it is then possible to set up various optical systems for zooming or other purposes.

It is noted that FIG. 13 shows one exemplary construction of the control system 103 including a booster circuit for the transformer using coils. In consideration of size reductions, it is particularly preferable to use a multilayer piezoelectric transformer. The booster circuit may be used for all the inventive variable-shape mirrors and variable-focus lenses that harness electricity; however, this booster circuit is particularly useful for variable-shape mirrors and variable-focus lenses that make use of electrostatic force and piezoelectric effect.

EXAMPLE 8 OF THE VARIABLE-SHARP MIRROR

Figure 14:
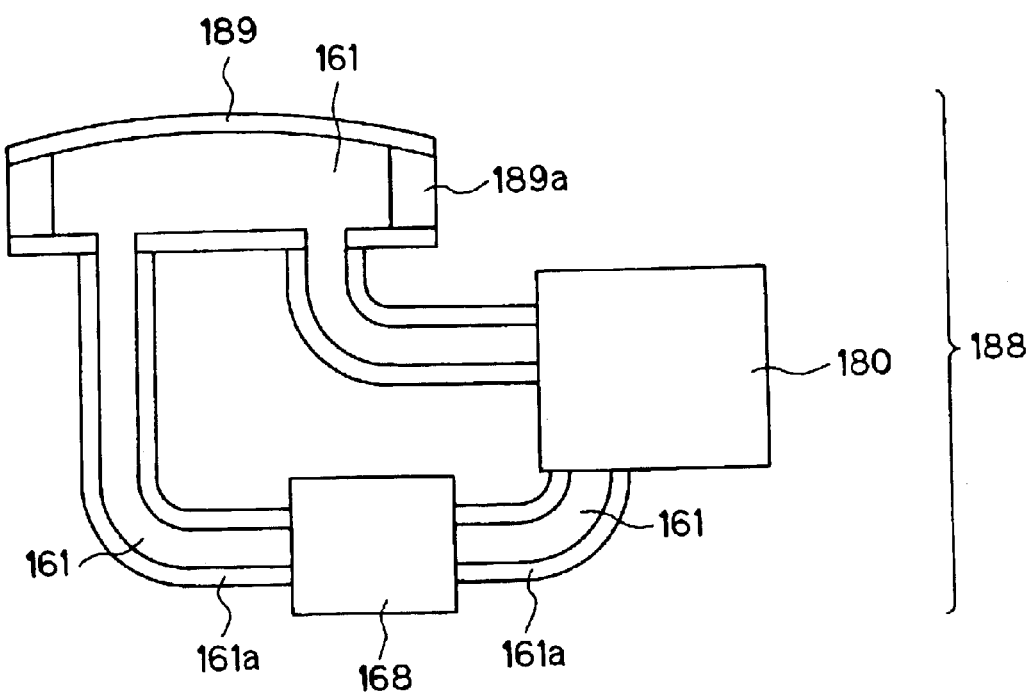
FIG. 14 is illustrative in schematic of yet another example of the variable-shape mirror, that is, the variable-shape mirror 188 to and from which the fluid 161 is fed or removed by means of the micropump 180 for transformation of a lens surface.

FIG. 14 is illustrative in schematic of a further example of the variable-shape mirror. This example is directed to a variable-shape mirror shown generally at 188, wherein the fluid 161 is fed by the micropump 180 from the line 161a to the mirror surface or fed back to the line 161a to transform the mirror surface, wherein the mirror surface is defined by the surface of the reflecting surface 189 provided across the upper surface of the support frame 189a. This example has a merit of achieving large transformation of the mirror surface. It is here noted that in the line that makes a connection between the support frame 189a and the micropump 180 there is provided a reservoir 168 that can feed a given amount of fluid 161 into the support frame 189a.

The micropump 180, for instance, is a power-driven, miniature pump fabricated by micromachining.

Exemplary pumps fabricated by micromachining include those making use of thermal transformation, piezoelectric materials, and electrostatic force.

Figure 15:
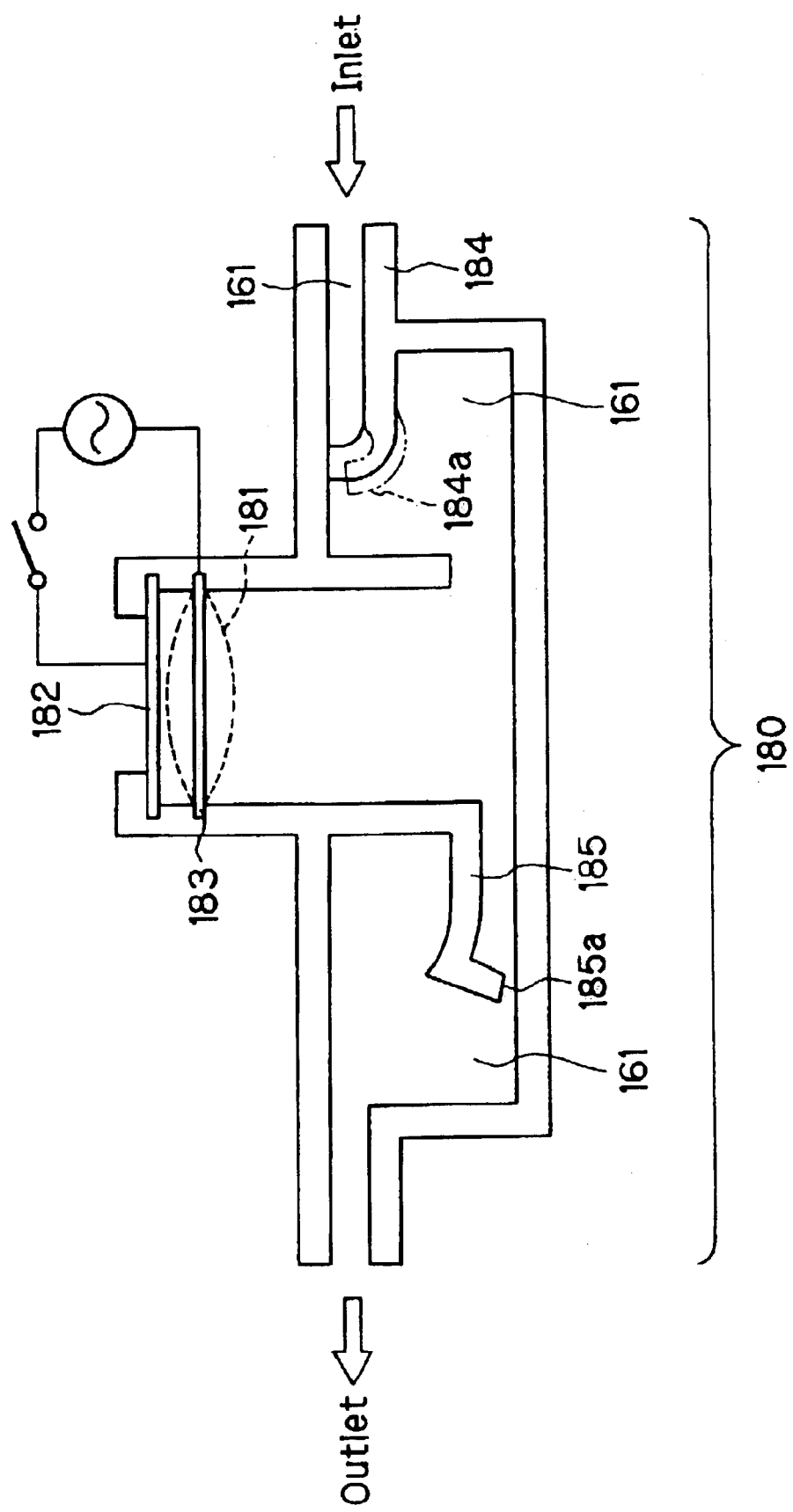
FIG. 15 is illustrative in schematic of one example of the micropump applicable to the variable-shape mirror.

FIG. 15 is illustrative in schematic of the aforesaid micropump 180. In the micropump 180, the diaphragm 181, to and from which the fluid 161 is fed and removed, vibrates by electric force such as electrostatic force and piezoelectric effect. FIG. 15 shows an example of vibrating the diaphragm 181 by electrostatic force. In FIG. 15, reference numerals 182 and 183 are electrodes. The diaphragm 181 is transformed as indicated by dotted lines. As the diaphragm 181 vibrates, the leading ends 184a and 185a of two valves 184 and 185 open and close to feed the fluid 161 from right to left.

In the variable-shape mirror 188 shown in FIG. 14, the reflecting film 189 is transformed into concave and convex shapes depending on the amount of the fluid 161, so that the surface of the reflecting film 189 can function as a variable-shape mirror. The variable-shape mirror 188 is driven by the fluid 161, for which organic and inorganic materials such as silicone oil, air, water and jelly may be used.

It is noted that for variable-shape mirrors, variable-focus lenses or the like that harness electrostatic force, and piezoelectric effect, high driving voltages are often needed. In this case, it is preferable to set up a control system using a boosting transformer, a piezoelectric transformer or the like, as shown in FIG. 13.

It is convenient to design portions of the reflecting thin film 409a and reflecting film 189 fixed on the support frame 423 or 189a as untransformable portions, because they can be used as reference surfaces when the shape of the variable-shape mirror is measured by means of interferometers or the like.

EXAMPLE 1 OF THE VARIABLE-FOCUS LENS

Figure 16:
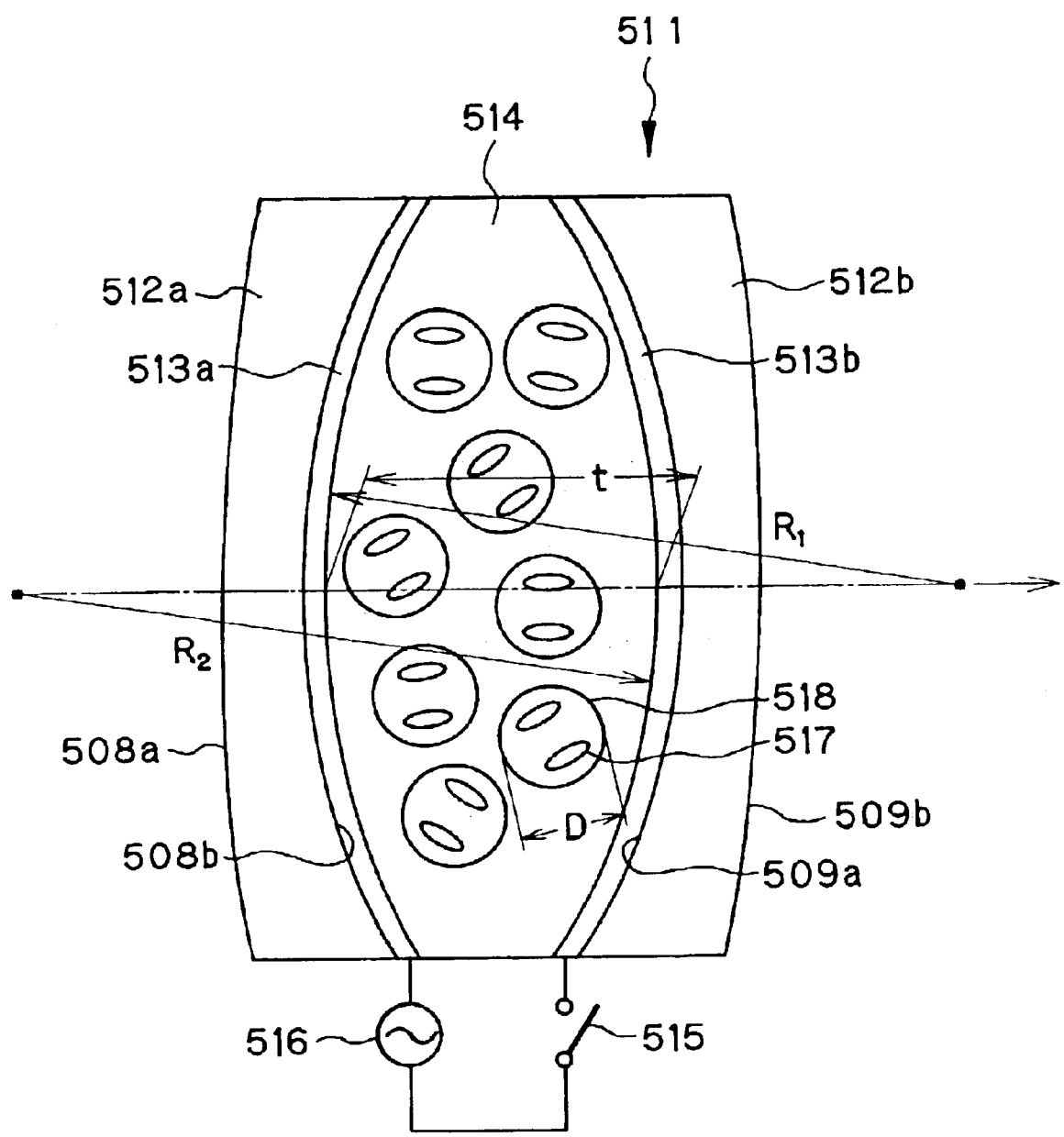
FIG. 16 is illustrative of the fundamental construction of a variable-focus lens.
Figure 18:
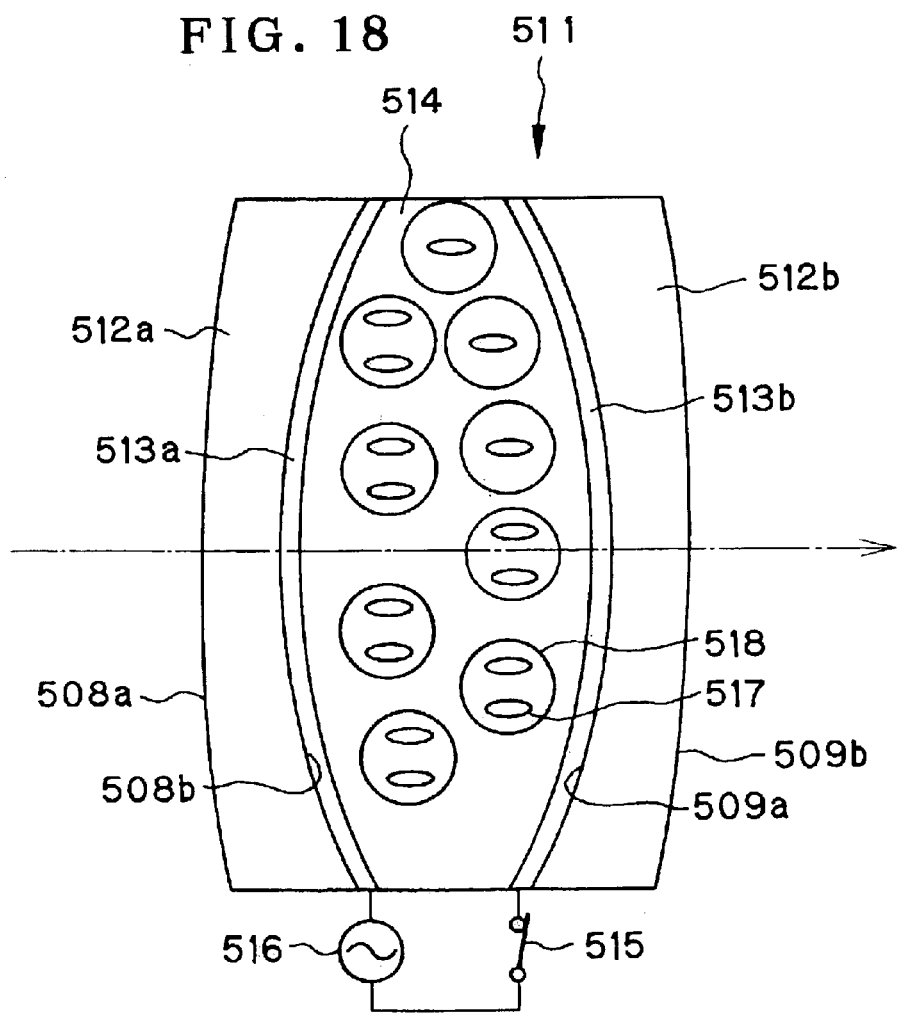
FIG. 18 is illustrative of the state of an electric field applied on the polymer dispersed liquid crystal layer shown in FIG. 16.

FIG. 16 and FIG. 18 are illustrative of the fundamental construction of the variable-focus lens that is applicable to the optical system and optical apparatus of the invention. This variable-focus lens 511 comprises a first lens 512a having lens surfaces 508a and 508b as the first and second surfaces, a second lens 512b having lens surfaces 509a and 509b as the third and fourth surfaces, and a polymer dispersed liquid crystal layer 514 interposed between these lenses while transparent electrodes 513a and 513b are located, so that incident light is converged through the first and second lenses 512a and 512b. The transparent electrodes 513a and 513b are connected to an AC source 516 via a switch 515 for selective application of an AC electric field on the polymer dispersed liquid crystal layer 514. It is noted that the polymer dispersed liquid crystal layer 514 is constructed of a multiplicity of minute polymer cells 518 each containing a liquid crystal molecule 517, wherein the polymer cells may each be in any desired form including a spherical or polygonal shape, and that the volume of the liquid crystal layer 514 should account for the sum of the volume occupied by the polymer forming the polymer cells 518 and the volume occupied by the liquid crystal molecules 517.

Referring here to the size of a typical polymer cell 518 in a spherical form, for instance, that size is given by $$2\text{ nm} \leq D \leq \lambda/5 \quad (1)$$

Here D is the average diameter of the cell, and λ is the wavelength of light used. That is, since the size of the liquid crystal molecule 517 is about 2 nm or greater, the lower limit value of the average diameter D should be 2 nm or greater. The upper limit value of D should preferably be λ/5 or less although depending on the thickness, t, of the polymer dispersed liquid crystal layer 514 in the axial direction of the variable-focus lens 511. This is because when D is greater than λ, light is scattered at the boundary surface of the polymer cell 518 due to a difference in the index of refraction between the polymer and the liquid crystal molecule 517 and, hence, the polymer dispersed liquid crystal layer 514 becomes opaque. In some applications, high precision is not required although depending on optical products for which variable-focus lenses are used. In this case, D may be λ or less. It is noted that the transparency of the polymer dispersed liquid crystal layer 514 becomes worse with increasing thickness t.

Figure 17:
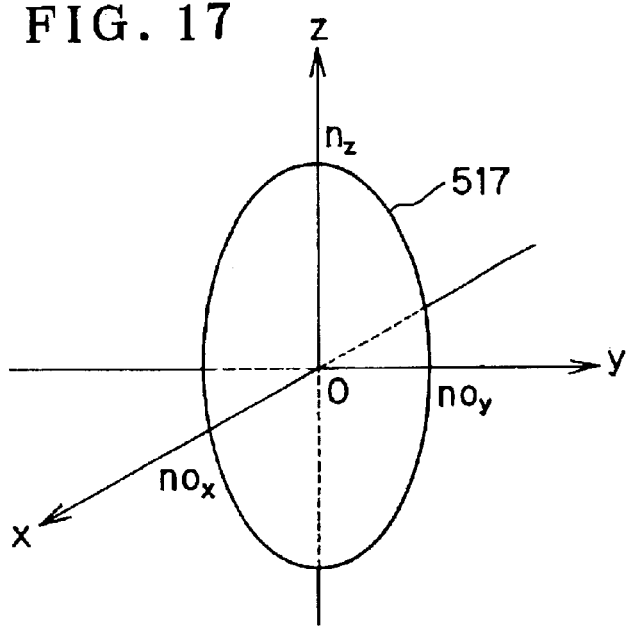
FIG. 17 is illustrative of an indicatrix for an uniaxial nematic liquid crystal molecule.

For the liquid crystal molecule 517, for instance, a uniaxial nematic liquid crystal molecule is used. The index ellipsoid of this liquid crystal molecule 517 takes such a form as shown in FIG. 17, i.e., $$n_{ox} = n_{oy} = n_o \quad (2)$$

Here $n_o$ is the refractive index of an ordinary ray, and $n_{ox}$ and $n_{oy}$ are the indices of refraction in mutually orthogonal directions within a plane including an ordinary ray.

In the state where, as shown in FIG. 16, the switch 515 is held off, that is, no electric field is applied on the polymer dispersed liquid crystal layer 514, the liquid crystal molecules 517 line up in various directions, so that the polymer dispersed liquid crystal layer 514 has a high refractive index with respect to incident light, providing a lens having strong refracting power. As shown in FIG. 18, on the other hand, as the switch 515 is put on to apply an AC electric field on the polymer dispersed liquid crystal layer 514, the liquid crystal molecules line up in such a way that the major axis direction of the index ellipsoid becomes parallel with the optical axis of the variable-focus lens 511, so that the polymer dispersed liquid crystal layer decreases in the index of refraction, providing a lens having weak refracting power.

Figure 19:
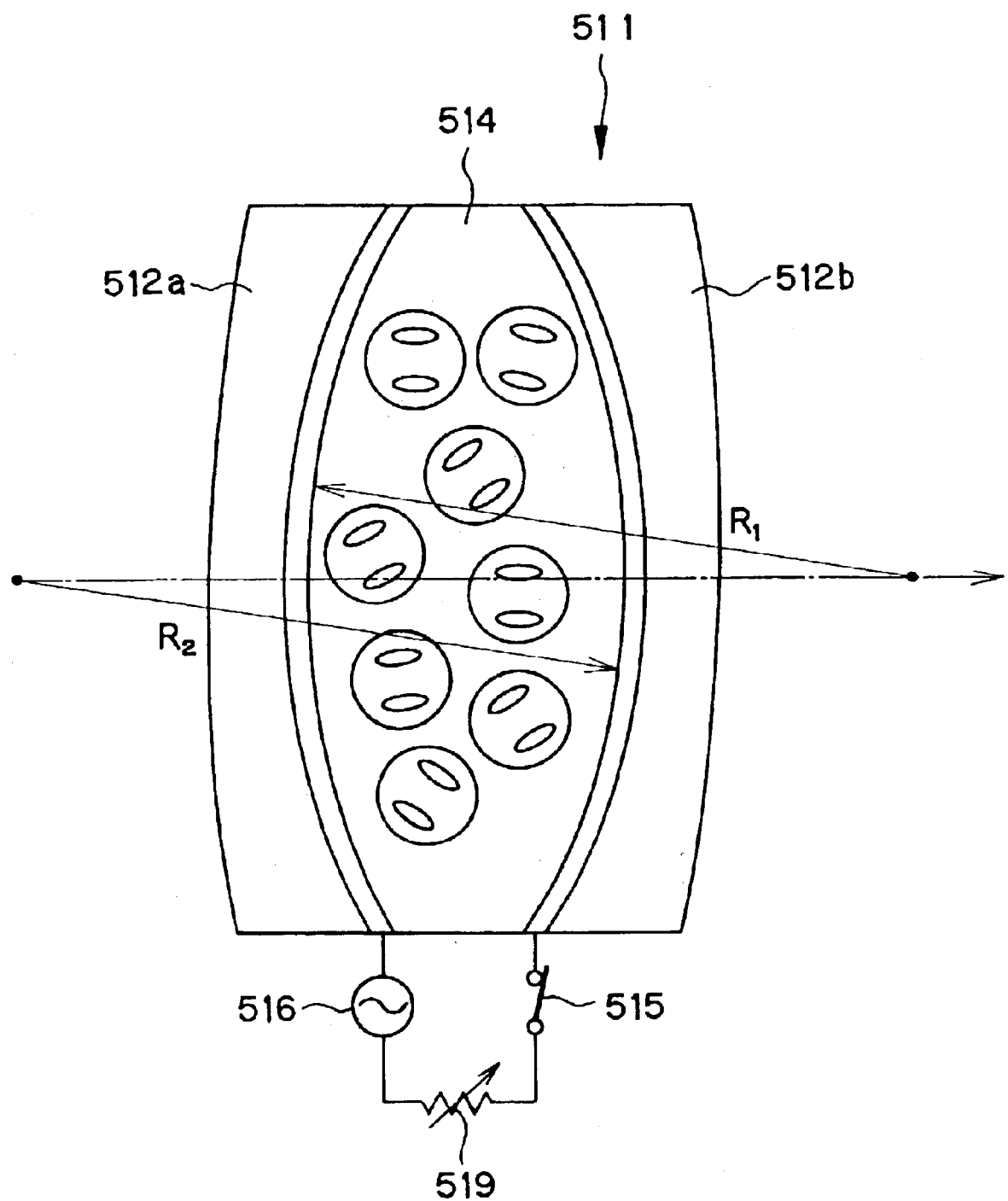
FIG. 19 is illustrative of one example of how the voltage applied on the polymer dispersed liquid crystal layer of FIG. 16 is made variable.

It is understood that it is acceptable to change the voltage applied on the polymer dispersed liquid crystal layer 514 by a variable resistor 519 as shown typically in FIG. 19 in a stepwise or continuous fashion. In this case, as the applied voltage increases, the liquid crystal molecules 517 line up in such a way that the major axis of the index ellipsoid becomes gradually parallel with the optical axis of the variable-focus lens 511, so that the refracting power can be changed in a stepwise or continuous fashion.

Referring back to the state of FIG. 16 where no electric field is applied on the polymer dispersed liquid crystal layer 514, the average refractive index of the liquid crystal molecule 517 is roughly given by $$(n_{ox} + n_{oy} + n_z)/3 = n_{LC}' \quad (3)$$

Here $n_z$ is the refractive index of the index ellipsoid in the major axis direction as shown in FIG. 17. When the aforesaid formula (2) holds, the average refractive index, $n_{LC}$, of the liquid crystal molecule 517 is given by $$(2n_o + n_e)/3 = n_{LC} \quad (4)$$

Here $n_z$ is expressed as the refractive index, $n_e$, of an extraordinary ray. Let $n_A$ be the refractive index of the polymer dispersed liquid crystal layer 514, $n_P$ be the refractive index of the polymer that forms the polymer cell 518, and ff be the ratio of the volume of the liquid crystal molecules 517 with respect to the volume of the polymer dispersed liquid crystal layer 514. Then, Maxwell-Garnet law gives $$n_A = ff \cdot n_{LC} + (1-ff)n_P \quad (5)$$

Hence, the focal length $f_1$ of the lens formed of the polymer dispersed liquid crystal layer 514 is given by $$1/f_1 = (n_A - 1)(1/R_1 - R_2) \quad (6)$$

Here $R_1$ and $R_2$ are the radii of curvature of the inside surfaces of the lens elements 512a and 512b, respectively, which face the polymer dispersed liquid crystal layer 514, provided that when the center of curvature is on the image point side, $R_1$ and $R_2$ have each a positive value. It is noted that refraction by the outside surfaces of the lens elements 512a and 512b is not taken into consideration. Thus, the focal length of the lens formed only of the polymer dispersed liquid crystal layer 514 is given by formula (6).

Suppose here that the average refractive index of an ordinary ray is given by $$(n_{ox} + n_{oy})/2 = n_o' \quad (7)$$

Then, the refractive index $n_B$ of the polymer dispersed liquid crystal layer 514 in the state shown in FIG. 18, where an electric field is applied on the polymer dispersed liquid crystal layer 514, is given by $$n_B = ff \cdot n_o' + (1-ff)n_P \quad (8)$$

Thus, the focal length $f_2$ of the lens composed only of the polymer dispersed liquid crystal layer 514 in this case is given by $$1/f_2 = (n_B - 1)(1/R_1 - 1/R_2) \quad (9)$$

It is noted that when a voltage lower than that in FIG. 18 is applied on the polymer dispersed liquid crystal layer 514, the focal length is given by a value between the focal length $f_1$ given by formula (6) and the focal length $f_2$ given by formula (9).

From formulas (6) and (9), the rate of change in the focal length of the lens formed of the polymer dispersed liquid crystal layer 514 is given by $$|(f_2 - f_1)/f_2| = |(n_B - n_A)/(n_B - 1)| \quad (10)$$

Thus, that rate of change may be increased by increasing $|n_B - n_A|$. Here, $$n_B - n_A = ff(n_o' - n_{LC}') \quad (11)$$

Hence, if $|n_o' - n_{LC}'|$ is increased, it is then possible to increase the rate of change. In practical applications, the refractive index, $n_B$, of the polymer dispersed liquid crystal layer 514 is of the order of 1.3 to 2. Suppose here $$0.01 \leq |n_o' - n_{LC}'| \leq 10 \tag{12}$$

Then, when ff=0.5, an effective variable-focus lens can be obtained because the focal length of the lens formed of the polymer dispersed liquid crystal layer 514 can be varied at least 0.5%. It is noted that $|n_o' - n_{LC}'|$ cannot possibly exceed 10 due to current restraints on available liquid crystal materials.

An account is now given of the grounds for the upper limit value to the aforesaid formula (1). "Solar energy Materials and Solar Cells", Vol. 31, Wilson and Eck, 1993, Eleevier Science Publishers B. v., pp. 197–214, "Transmission variation using scattering/transparent switching film" shows changes the transmission τ upon variations in the size of polymer dispersed liquid crystals. The publication shows at page 406 and in FIG. 6 that when t=300 µm, ff=0.5, $n_P$=1.45, $n_{LC}$=1.585 and λ=500 nm, the theoretical value for transmittance τ is τ≈90% on condition that r=5 nm where r is the radius of a polymer dispersed liquid crystal, D=λ/50 and D·t=λ·6 µm (the units of D and λ are nm)), and τ≈50% on condition that r=25 nm (D=λ/10).

For instance, suppose here the case where t=150 µm. If the transmittance τ changes with the exponential function for t, then the transmittance τ at t=150 µm is assumed to be τ≈70% at r=25 nm (D=λ/10 and D·t=λ·15 µm). Where t=75 µm, likewise, τ≈80% at r=25 nm (D=λ/10 and D·t=λ·7.5 µm).

From these results, if $$D \cdot t \leq \lambda \cdot 15 \; \mu m \tag{13}$$

the transmittance τ is then between 70% and 80% or greater, ensuring a practically satisfactory lens. For instance, this means that where t=75 µm, a sufficient transmittance is obtainable at D≤1/5.

The closer the value of $n_P$ to the value of $n_{LC}'$, the better the transmittance of the polymer dispersed liquid crystal layer 514 becomes. When the value of $n_o'$ differs from the value of $n_P$, on the other hand, the transmittance of the polymer dispersed liquid crystal layer 514 becomes worse. When the following formula (14) is satisfied, the transmittance of the polymer dispersed liquid crystal layer 514 is improved on average in both the state of FIG. 16 and the state of FIG. 18.

$$n_P = (n_o' + n_{LC}')/2 \tag{14}$$

For the variable-focus lens 511 wherein the lens formed of the polymer dispersed liquid crystal layer 514 is interposed between the first lens 512a and the second lens 512b, the transmittance is substantially on the same level and, preferably, on a higher level whether in the state of FIG. 16 or in the state of FIG. 18. There are thus some restrictions on the polymer material available for the formation of the polymer cell 518 and the material available for the liquid crystal molecule 517. In practical applications, however, it is preferred that $$n_o' \leq n_P \leq n_{LC}' \tag{15}$$

If the aforesaid formula (14) is satisfied, the aforesaid formula (13) can then slack further to $$D \cdot t \leq \lambda \cdot 60 \; \mu m \tag{16}$$

This is because the reflectivity is in proportion to the square of a refractive index difference according to Fresnel reflection law; reflection of light at the boundary between the polymer forming the polymer cell 518 and the liquid crystal molecule 517, that is, the decrease in the transmittance of the polymer dispersed liquid crystal layer 514 is roughly proportional to the square of the difference in the index of refraction between the aforesaid polymer and the liquid crystal molecule 517.

The foregoing hold true for the case where $n_o' \approx 1.45$, and $n_{LC}' \approx 1.585$. More generally, however, this may be formulated as follows.

$$D \cdot t \leq 1.15 \; \mu m \cdot (1.585 - 1.45)^2/(n_u - n_P)^2 \tag{17}$$

Here $(n_u - n_P)^2$ should be the larger of $(n_{LC}' - n_P)^2$ and $(n_o' - n_P)^2$.

To increase the change in the focal length of the lens formed of the polymer dispersed liquid crystal layer 514, it is preferable for ff to have a larger value. At ff=1, however, the volume of the polymer reduces to zero; no polymer cell 518 can be formed. Hence, $$0.1 \leq ff \leq 0.999 \tag{18}$$

The smaller the value of ff, the more improved the transmittance τ is. Preferably, the aforesaid formula (17) should thus be replaced by $$4 \times 10^{-6} [\mu m]^2 \leq D \cdot t \leq \lambda \cdot 45 \; \mu m \cdot (1.585 - 1.45)^2/(n_u - n_P)^2 \tag{19}$$

It is here noted that as can be seen from FIG. 16, the lower limit value of t is t=D, and the lower limit value of D·t is $(2 \times 10^{-3} \; \mu m)^2$, that is, $4 \times 10^{-6} \; [\mu m]^2$ because the value of D is 2 nm or greater as already mentioned.

It is understood that where D is greater than the range of 10 nm to 5 nm, the optical properties of a substance can be approximated by the index of refraction, as stated in Tadashi Mukai, "Iwanami's Science Library Volume 8—There Planetoids Coming", page 58, Iwanami Shoten, 1994. As D exceeds 500λ, scattering of light becomes geometric, and so scattering of light at the interface between the polymer forming the polymer cell 518 and the liquid crystal molecule 517 increases pursuant to Fresnel reflection formula. In practical application, therefore, D should be $$7 \; nm \leq D \leq 500 \lambda \tag{20}$$

Figure 20:
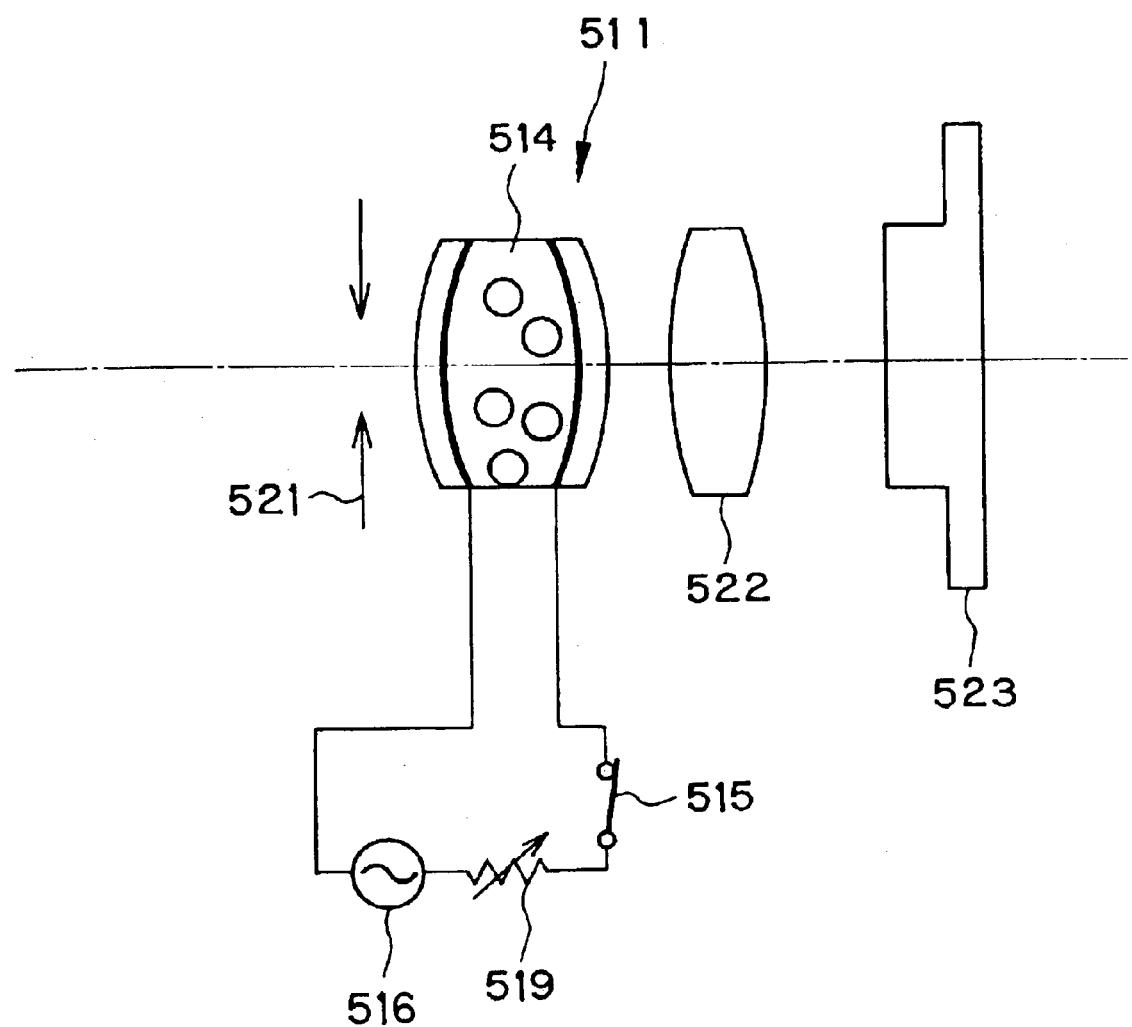
FIG. 20 is illustrative of the arrangement of one example of the image pickup system for digital cameras, in which the variable-focus lens is used.

FIG. 20 is illustrative of the construction of an image pickup optical system for digital cameras, wherein the variable-focus lens 511 shown in FIG. 19 is used. In this image pickup optical system, an image of an object (not shown) is formed on a solid-state image pickup device 523 comprising a CCD as an example through a diaphragm 521 and variable-focus lenses 511 and 522. In FIG. 20, the liquid crystal molecules are not shown.

With such an image pickup optical system, an AC voltage applied on the polymer dispersed liquid crystal layer 514 of the variable-focus lens 511 is adjusted by means of the variable resistor 519 to change the focal length of the variable-focus lens 511, so that continuous focusing can be performed at an object distance from infinity up to 600 mm as an example without movement of the variable-focus lenses 511 and 512 in the optical axis direction.

EXAMPLE 1 OF THE VARIABLE-FOCUS DIFFRACTION OPTICAL ELEMENT

Figure 21:
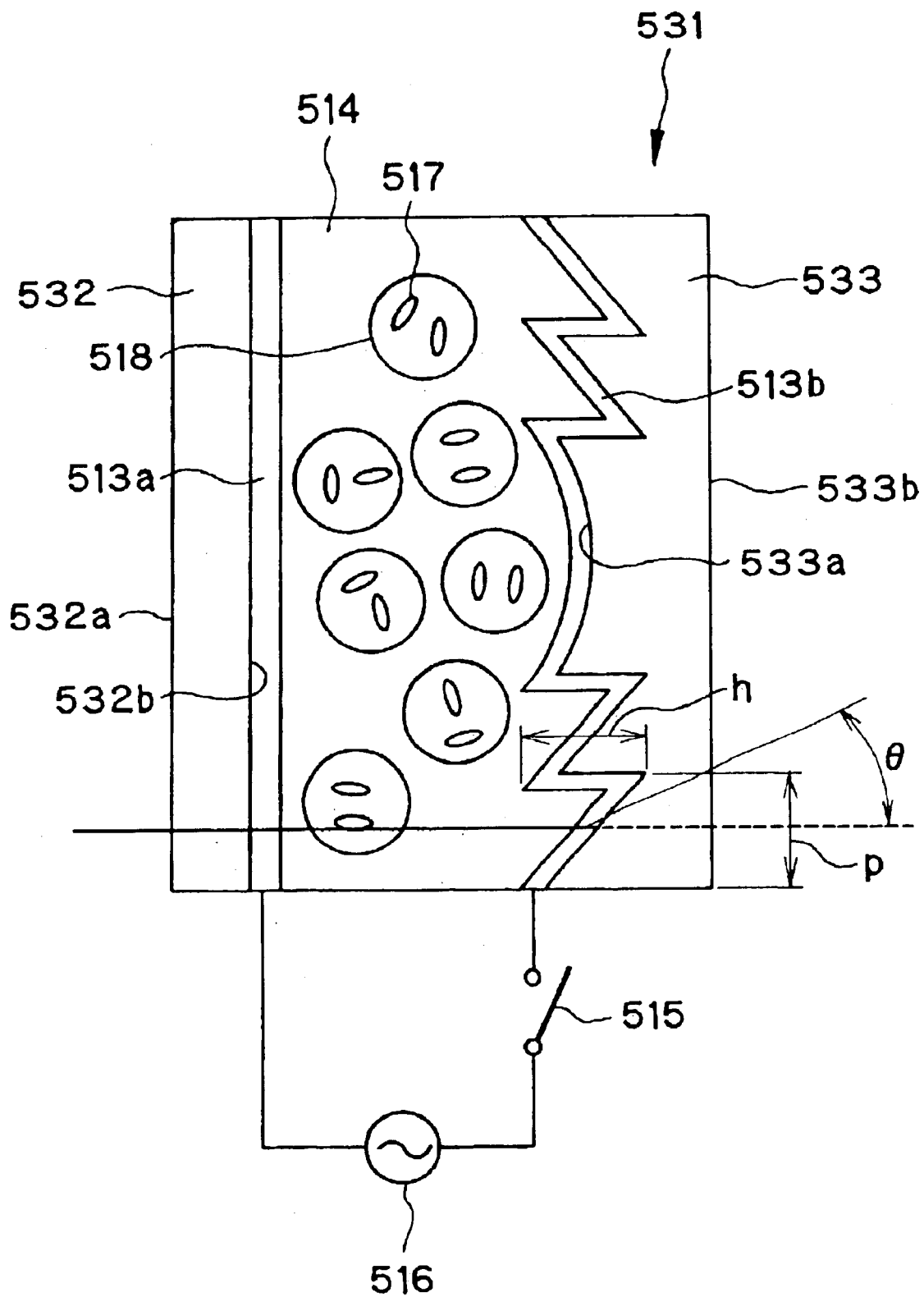
FIG. 21 is illustrative of the construction of one example of the variable-focus diffraction optical system.

FIG. 21 is illustrative of one exemplary construction of the variable-focus diffraction optical element functioning as the optical element having variable optical properties.

This variable-focus diffraction optical element 531 comprises a first transparent substrate 532 having a first surface 532a and a second surface 532b which are parallel with each other and a second transparent substrate 533 having a third surface 533a provided thereon with a ring diffraction grating having a groove depth of the order of wavelength of light and having sawtooth shape in section and a fourth surface 433b that is flat, so that incident light emerges from the element through the first and second transparent substrates 532 and 533. Between the first and second transparent substrates 532 and 533, the polymer dispersed liquid crystal layer 514 is interposed while transparent electrodes 513a and 513b are located, as explained with reference to FIG. 16. The transparent electrodes 513a and 513b are connected-to an AC power source 516 via a switch 515, so that an AC voltage can be applied on the polymer dispersed liquid crystal layer 514.

In such an arrangement, a ray incident on the variable-focus diffraction optical element 531 leaves while deflected by an angle θ that satisfies $$p \sin \theta = m\lambda \quad (21)$$

Here p is the grating pitch of the third surface 533a and m is an integer. Let h be the groove depth, $n_{33}$ be the refractive index of the transparent substrate 533 and k be an integer. If the following formulas (22) and (23)

$$h(n_A - n_{33}) = m\lambda \quad (22)$$

$$h(n_B - n_{33}) = k\lambda \quad (23)$$

are satisfied, the diffraction efficiency becomes 100% at the wavelength λ, thereby preventing flaring. In formula (22) $n_A$ is the refractive index of the polymer dispersed liquid crystal polymer 514 at no AC applied voltage, and in formula (23) $n_B$ is the refractive index of the polymer dispersed crystal polymer 514 at an applied AC voltage.

By finding a difference between both sides in formulas (22) and (23), $$h(n_A - n_B) = (m - k)\lambda \quad (24)$$

is obtained. Therefore, if, for instance, λ=500 nm, $n_A$=1.55 and $n_B$=1.5, then $$0.05 \; h = (m-k) \cdot 500 \; nm$$

If m=1 and k=0, then $$h = 10,000 \; nm = 10 \; \mu m$$

In this case, the refractive index $n_{33}$ of the transparent substrate 533 may be $n_{33}$=1.5, as found from the aforesaid formula (22). If the grating pitch at the peripheral area of the variable-focus diffraction optical element 531 is p=10 μm, then θ≈2.87° at which a lens having an F-number of 10 is obtainable.

Such a variable-focus diffraction optical element 531 has an optical path length that is variable as the application of voltage on the polymer dispersed liquid crystal layer 514 is held on or off; for instance, it may be located at a portion of a lens system at which light beams are not parallel for focusing purposes or so as to vary the focal length of the lens system, etc.

It is noted that in this example, the aforesaid formulas (22), (23) and (24) may practically be replaced by $$0.7 \; m\lambda \leq h(n_A - n_{33}) \leq 1.4 \; m\lambda \quad (25)$$

$$0.7 \; k\lambda \leq h(n_B - n_{33}) \leq 1.4 \; k\lambda \quad (26)$$

$$0.7(m-k)\lambda \leq h(n_A - n_B) \leq 1.4(m-k)\lambda \quad (27)$$

EXAMPLE 2 OF THE VARIABLE-FOCUS LENS

Figure 22:
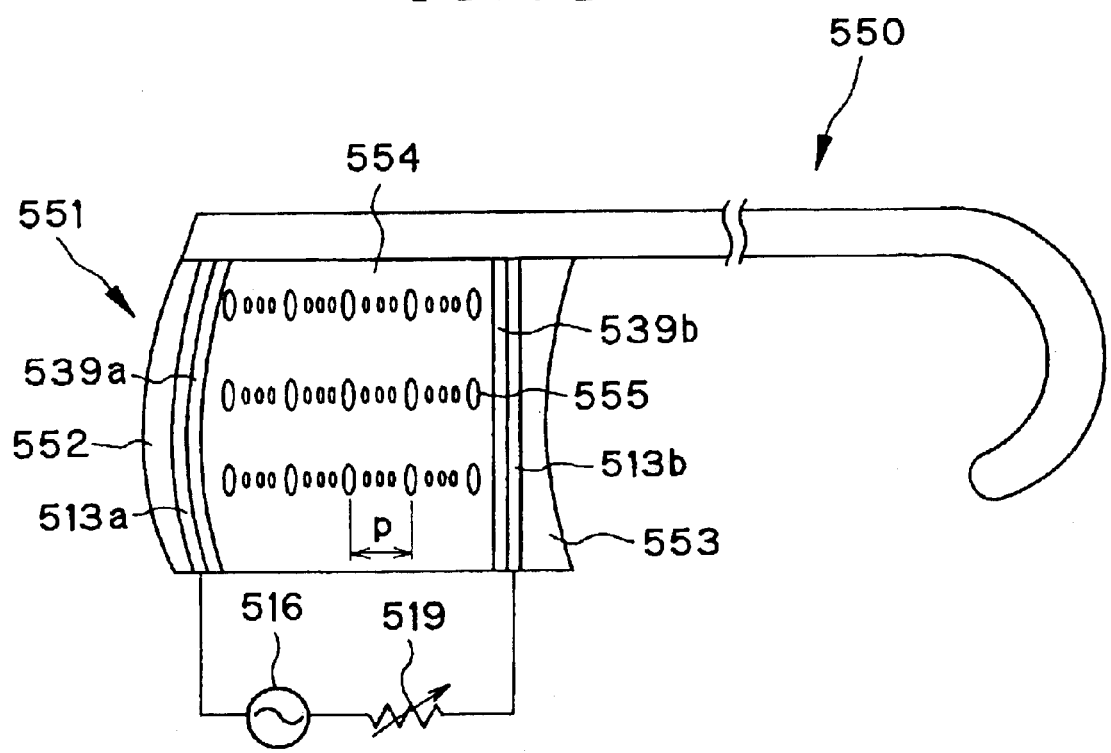
FIG. 22 is illustrative of variable-focus glasses comprising variable-focus lenses using twisted nematic liquid crystals.
Figure 23:
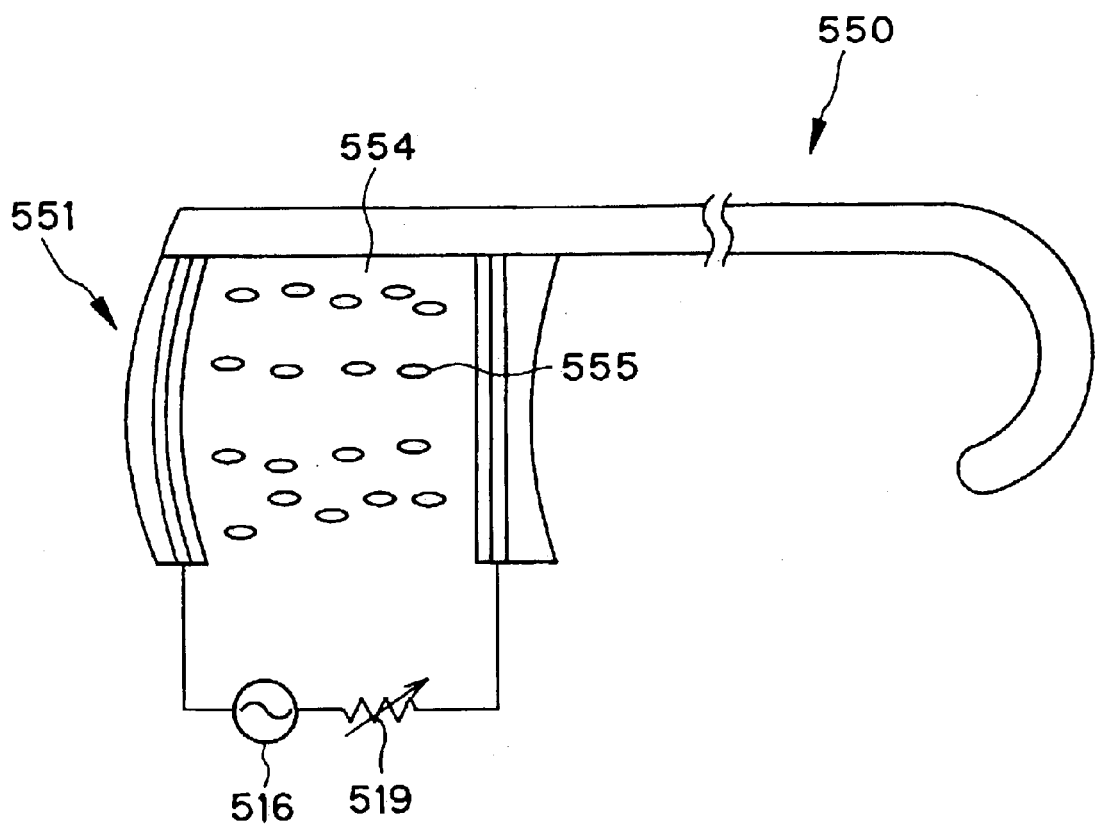
FIG. 23 is illustrative of how liquid crystal molecules line up when higher voltage is applied on the twisted nematic liquid crystal layer shown in FIG. 22.

There is also a variable-focus lens using a twisted nematic liquid crystal. FIGS. 22 and 23 are illustrative in section of one exemplary construction of variable-focus spectacles 550. The variable-focus lens 551 is constructed of lenses 552 and 553, orientation films 539a and 539b mounted on the inside surfaces of these lenses via transparent electrodes 513a and 513b, and a twisted nematic liquid crystal layer 554 interposed between these orientation films. The transparent electrodes 513a and 513b are connected to an AC power source 516 via a variable resistor 519, so that an AC voltage can be applied on the twisted nematic liquid crystal layer 554.

In such an arrangement, as the voltage applied on the twisted nematic liquid crystal layer 554 is increased, the liquid crystal molecules 555 line up in a homeotroic fashion as shown in FIG. 23 and, hence, the twisted nematic liquid crystal layer 554 is lower in refractive index and longer in focal length than the twisted nematic state at a low applied voltage as shown in FIG. 22.

It is here noted that the spiral pitch P of the liquid crystal molecules 555 in the twisted nematic state shown in FIG. 22 must be on the same level as or by far lower than the wavelength λ of light. For instance, it is thus preferred that $$2 \; nm \leq P \leq 2\lambda/3 \quad (28)$$

It is here noted that the lower limit value of this condition is determined depending on the size of the liquid crystal molecule 555, and the upper limit value is required to ensure that when incident light is natural light, the twisted nematic liquid crystal layer 554 behaves as an isotropic medium in the state of FIG. 22. Unless this upper limit value is satisfied, the variable-focus lens 551 becomes a lens having varying focal length depending on the direction of polarization, only to yield a blurred image due to the formation of a double image.

EXAMPLE 1 OF THE VARIABLE DEFLECTION ANGLE PRISM

Figure 24A:
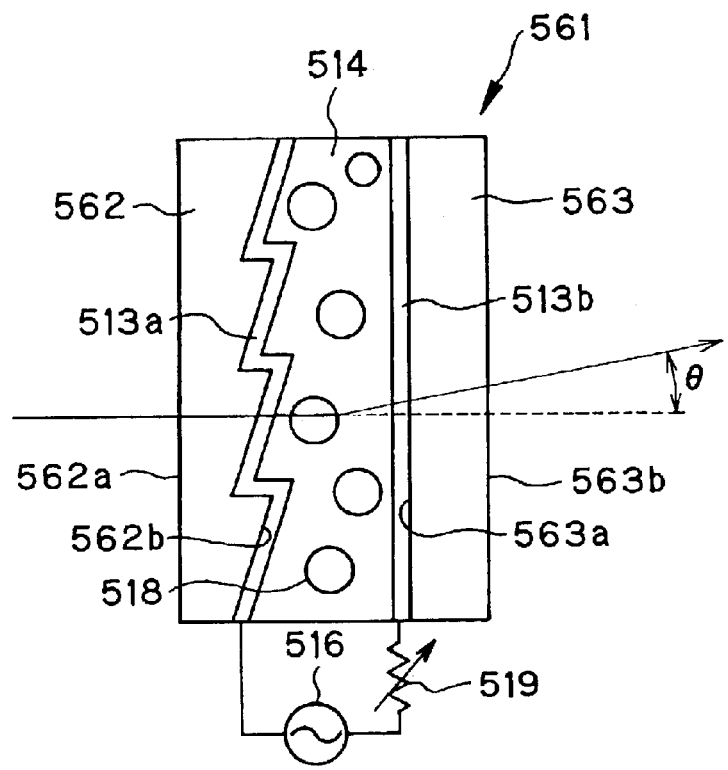
FIGS. 24(a) and 24(b) are illustrative of the constructions of two examples of the variable deflection angle prism.
Figure 24B:
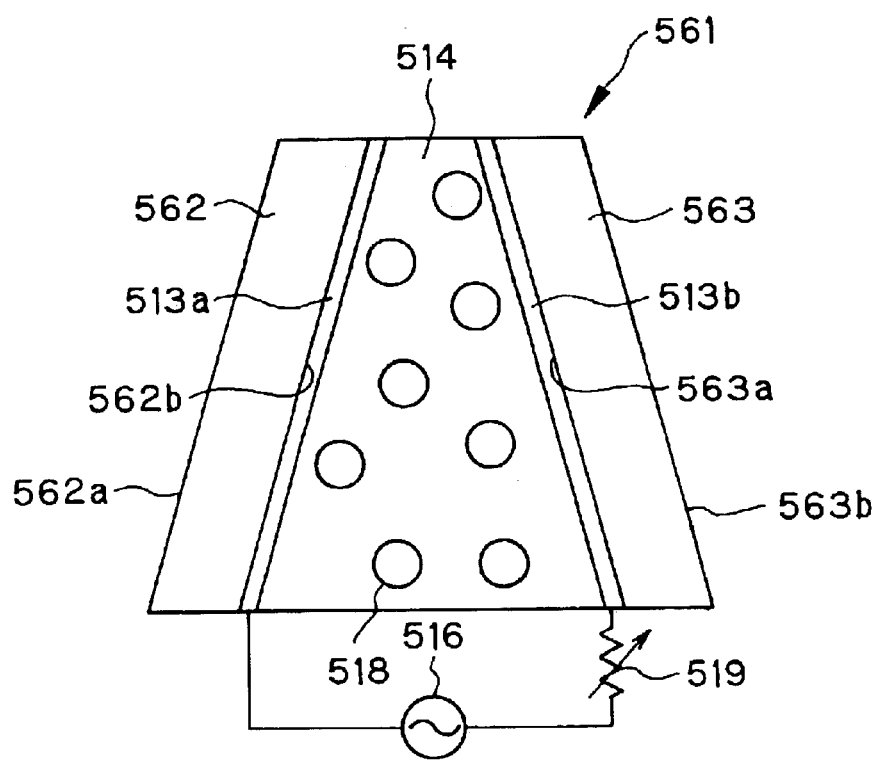

FIG. 24(a) is illustrative of one exemplary construction of the variable deflection angle prism functioning as the optical element having variable optical properties. This variable deflection angle prism 561 comprises a first transparent substrate 562 that is located on the entrance side of the prism and has a first surface 562a and a second surface 562b, and a second transparent substrate 563 in a plane-parallel plate form, which is located on the exit side of the prism and has a third surface 563a and a fourth surface 563b. The inside (second) surface 562b of the entrance-side transparent substrate 562 is configured in a Fresnel form, and between the transparent substrate 562 and the exit-side transparent substrate 563 there is provided a polymer dispersed liquid crystal layer 514 while transparent electrodes 513a and 513b are located, as explained with reference to FIG. 16. The transparent electrodes 513a and 513b are connected to an AC power source 516 via a variable resistor 519, so that an AC voltage is applied on the polymer dispersed liquid crystal layer 514 to control the angle of deflection, θ, of light transmitting through the variable deflection angle prism 561 and thereby control the direction of deflection of the transmitted light. As shown in FIG. 24(a), the inside surface 562b of the transparent substrate 562 is configured in a Fresnel form. As shown in FIG. 24(b) as an example, however, it is acceptable to relatively incline the inside surfaces of the transparent substrates 562 and 563, as is the case with an ordinary prism. Alternatively, it is acceptable to configure the prism in such a diffraction grating form as shown in FIG. 21. The aforesaid formulae (21) to (27) go true for such a diffraction grating-like prism.

Figure 25:
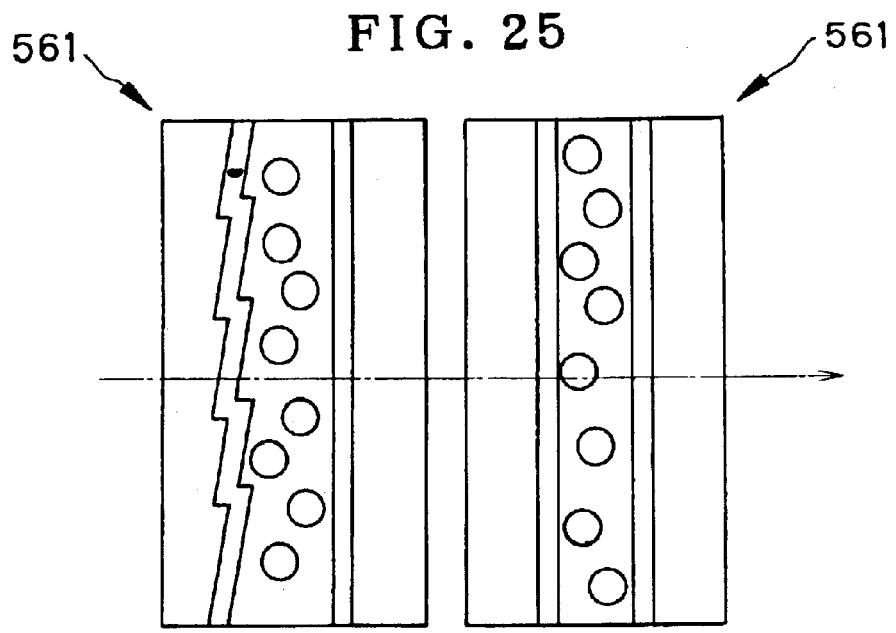
FIG. 25 is illustrative of how the variable deflection angle prism of FIGS. 24(a) and 24(b) is used.

The variable deflection angle prism 561 having such construction, for instance, may effectively be used for prevention of shaking of TV cameras, digital cameras, film cameras, binoculars, etc. Preferably in this case, the direction of diffraction (deflection) of the variable deflection angle prism 561 should be set in a vertical direction. To make further improvements in performance, it is preferable to use two variable deflection angle prisms 561, each shown in FIG. 24(a), while the direction of deflection of each prism 561 is set in a different direction in such a way that, as shown typically in FIG. 25, the angle of diffraction varies in horizontally and vertically diagonal directions. In FIGS. 24 and 25, the liquid crystal molecules are not shown.

EXAMPLE 3 OF THE VARIABLE-FOCUS LENS

Figure 26:
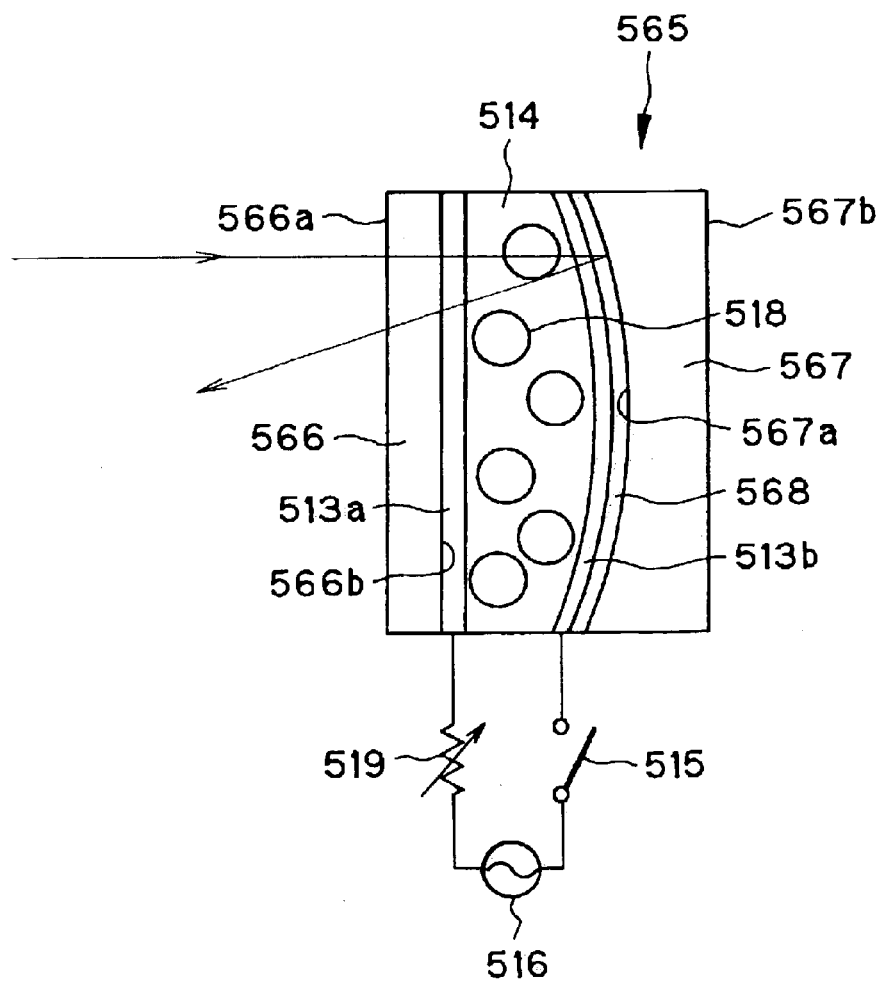
FIG. 26 is illustrative of the construction of one example of the variable-focus mirror as a variable-focus lens.

FIG. 26 is illustrative of an example wherein the variable-focus lens is used as a variable-focus mirror in an optical system. This variable-focus mirror 565 comprises a first transparent substrate 566 having a first surface 566a and a second surface 566b and a second transparent substrate 567 having a third surface 567a and a fourth surface 567b. The first transparent substrate 566 is configured in a plane plate or lens form with the inside (second) surface 566b provided with a transparent electrode 513a, and the inside (third) surface 567a of the second transparent substrate 567 is configured in a concave surface form provided thereon with a reflecting film 568. In addition, the reflecting film 568 is provided thereon with a transparent electrode 513b. Between the transparent electrodes 513a and 513b, the polymer dispersed liquid crystal layer 514 is provided as explained with reference to FIG. 16. The transparent electrodes 513a and 513b are then connected to an AC power source 516 via a switch 515 and a variable resistor 519, so that an AC voltage can be applied on the polymer dispersed liquid crystal layer 514. In FIG. 26, the liquid crystal molecules are not shown.

According to such an arrangement, a light ray entered from the transparent substrate 566 side takes an optical path that is turned back by the reflecting film (reflecting surface) 568 through the polymer dispersed liquid crystal layer 514, so that the light ray can act twice on the polymer dispersed liquid crystal layer 514. In addition, by varying the voltage applied on the polymer dispersed liquid crystal layer 514, the focal position of reflected light can be varied. In this case, the light ray incident on the variable-focus mirror 565 transmits twice through the polymer dispersed liquid crystal layer 514; each of the aforesaid formulae holds true for this example on condition that $t$ is indicative of a thickness twice as large as the polymer dispersed liquid crystal layer 514. It is noted that if the inside surface of the transparent substrate 566 or 567 is configured in such a diffraction grating form as shown in FIG. 21, it is then possible to reduce the thickness of the polymer dispersed liquid crystal layer 514 and thereby achieve further reductions in scattered light.

While the invention has been explained on the presumption that to prevent deterioration in the liquid crystals, the AC voltage is applied on the liquid crystal layer using the AC power source 516 as a power source, it is acceptable to apply DC voltage on the liquid crystal layer using a DC power source. Changes in the direction of the liquid crystal molecules are achievable not only by changing the applied voltage but also by changing the frequency of the electric field applied on the liquid crystal layer, the intensity and frequency of the magnetic filed applied on the liquid crystal layer or the temperature of the liquid crystal layer, etc. In the foregoing explanation of the invention, some polymer dispersed liquid crystal layers are in a state close to solid rather than liquid. In this case, one of the lenses 512a and 512b shown in FIG. 16, one of the transparent substrates 532 and 533 shown in FIG. 21, one of the lenses 552 and 553 shown in FIG. 22, the transparent substrate 563 shown in FIG. 24(a), one of the transparent substrates 562 and 563 shown in FIG. 24(b), and one of the transparent substrates 566 and 567 shown in FIG. 26 may be dispensed with.

The merits of the optical elements of such types as explained with reference to FIGS. 16 to 26, wherein the focal length, etc. of the optical elements vary with changes in the refractive index of the medium forming the polymer dispersed liquid crystal layer, are that mechanical designs are facilitated, mechanical structures are simplified, etc.

EXAMPLE 4 OF THE VARIABLE-FOCUS LENS

Figure 27:
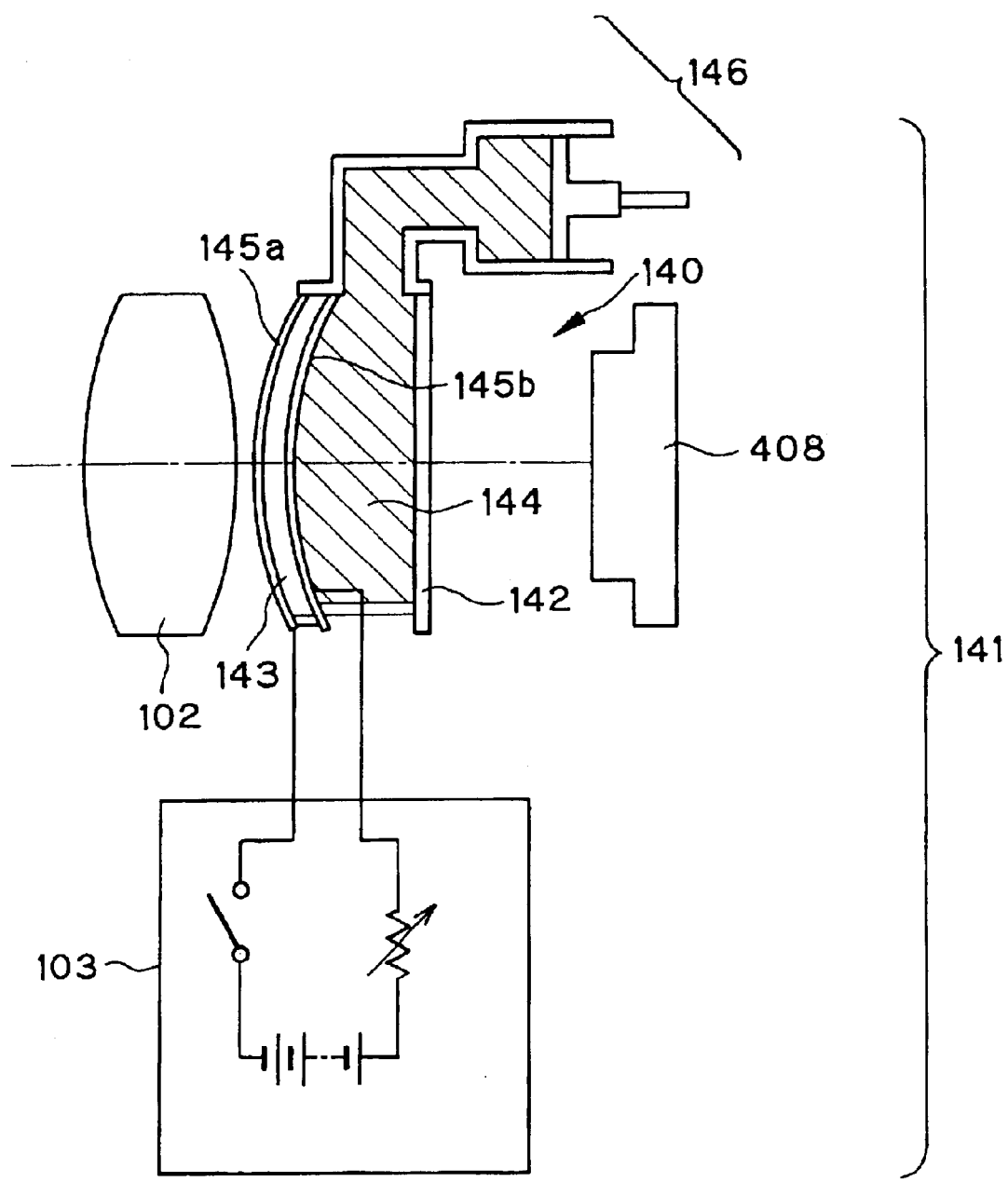
FIG. 27 is illustrative of the image pickup unit 141 used as the optical apparatus of the invention, and the optical system for the same, in which the variable-focus lens 140 is used.

FIG. 27 is illustrative in schematic of one exemplary construction of the image pickup unit 141 constructed by using a variable-focus lens 140 in the image pickup optical system of the optical apparatus of the invention. The image pickup unit 141 may be used as the image pickup optical system of the invention.

This example is directed to an image pickup lens made up of a lens 102 and a variable-focus lens 140. This image pickup lens is used together with a solid-state image pickup device 408 to set up the image pickup unit 141. The variable-focus lens 140 is composed of a plane plate form of transparent member 142, a piezoelectric synthetic resin or other soft transparent substance 143 sandwiched between a pair of transparent electrodes 145a and 145b, and a light-transmitting fluid or jelly-like substance 144 sandwiched between the transparent member 142 and the transparent electrode 145b.

For the fluid or jelly-like substance 144, silicone oil, elastic rubber, jelly, water or the like may be used. Voltage is applied via a circuit 103 on the transparent electrodes 145a and 145b with the transparent substance 143 sandwiched between them, so that the transparent substance 143 is transformed due to its piezoelectric effect to vary the focal length of the variable-focus lens 140. It is noted that the circuit 103 has therein a power source, a variable resistor, a switch, etc. As the aforesaid transparent substance 143 is transformed, pressure is applied on the fluid or jelly-like substance 144 via a cylinder 146 so that the fluid or jelly-like substance 144 is transformed following the transformation of the transparent substance 143.

Accordingly, even at a varying object distance, focusing can be performed without moving the image pickup optical system with a motor or the like. Thus, this example is much more improved in terms of size, weight and power consumptions.

In FIG. 27, reference numerals 145a and 145b represent the transparent electrodes, and 146 stands for the cylinder for storing the fluid or jelly-like substance 144. For the material for the transparent substance 143, polymer piezoelectric materials such as polyurethane, silicone rubber, acryl elastomer, PZT, PLZT and poly-(vinylidene fluoride) (PVDF), copolymers such as vinylidene cyanide copolymers and vinylidene fluoride-trifluoroethylene copolymers, etc. may be used.

Use of organic materials having piezoelectricity, synthetic resins having piezoelectricity, elastomer materials having piezoelectricity, etc. is preferable because large transformation of the lens surface of the variable-focus lens 140 is achievable. Transparent piezoelectric materials are preferably used for the transparent substance 143 of the variable-focus lens 140.

It is noted that the cylinder 146 may be removed from the variable-focus lens 140 of FIG. 27. Instead, as shown in FIG. 28, there are provided a support member 147 and a transformable member 148 for closing up the fluid or jelly-like substance 144 on their peripheral side.

The support member 147 comprises a zonal member fixed to the transparent member 142 at a given space therefrom. Between the support member 147 and the transparent member 142 there is provided the aforesaid substance 144 closed up with the transparent member 142, the electrode 145b and the aforesaid member 148. This substance 144 is transformed following the transformation of the transparent substance 143 between the pair of transparent electrodes 145a and 145b. The transparent substance 143 is closed up at its peripheral portion. According to this example, voltage is applied on the transparent substance 143 via the transparent electrodes 145a and 145b to transform the same. Even so, the transformable member 148 is transformed in such a way that the whole volume of the fluid or jelly-like substance 144 remains invariable, as shown in FIG. 29. This is the reason why that cylinder can be dispensed with. In FIGS. 28 and 29, reference numeral 148 stands for the transformable member formed of an elastic member, an accordion form of synthetic resin or metal, or the like.

Figure 28:
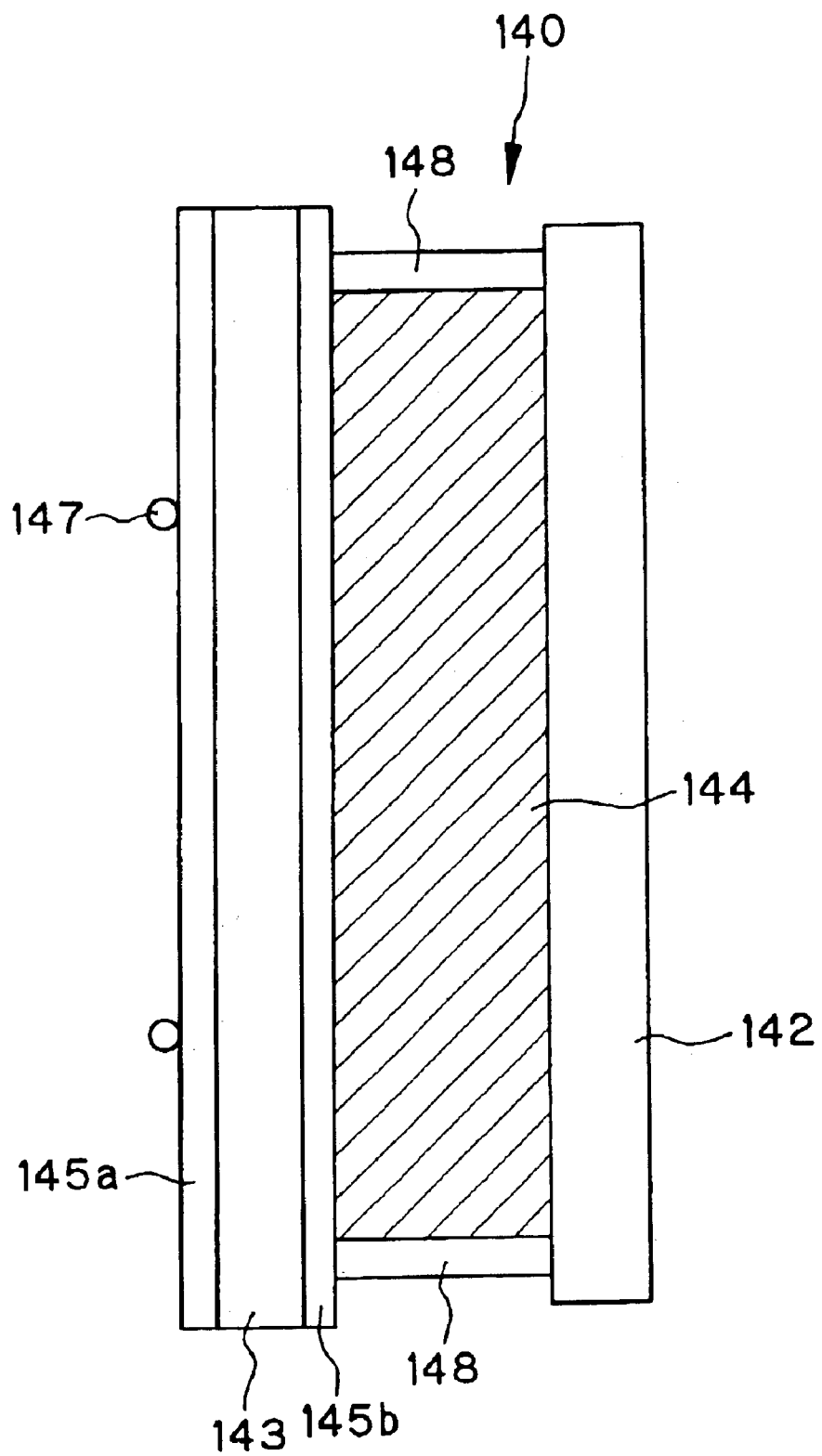
FIG. 28 is illustrative of a modification to the variable-focus lens of FIG. 27.
Figure 29:
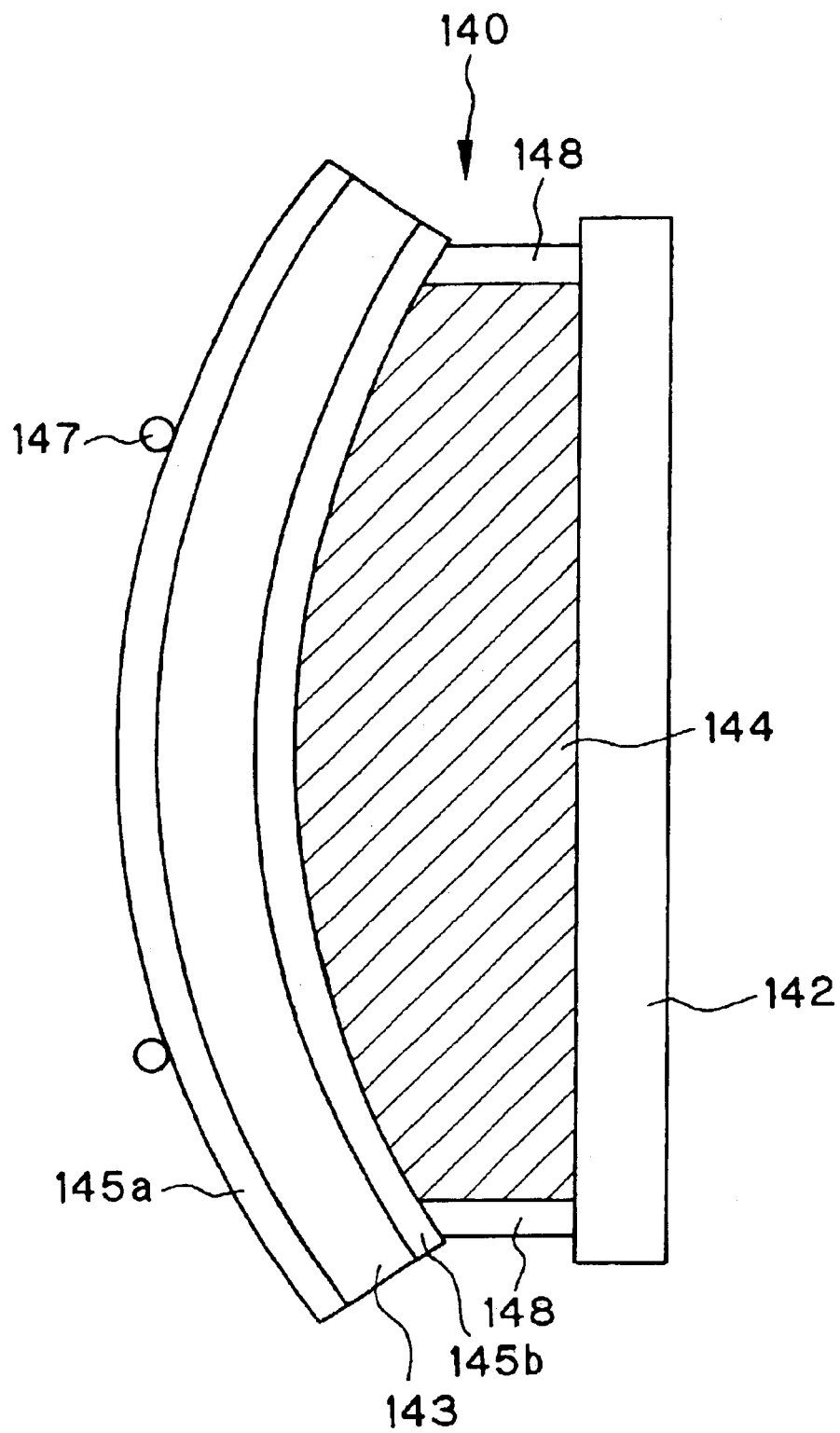

In the examples of FIGS. 27 and 28, the opposite application of voltage causes the transparent substance 143 to be transformed in the opposite direction, resulting in the formation of a concave lens.

It is noted that when an electrostrictive material such as acryl elastomer or silicone rubber is used for the transparent substance 143, it is preferable to laminate the transparent substance 143 onto the transparent substrate and electrostrictive material.

EXAMPLE 5 OF THE VARIABLE-FOCUS LENS

Figure 30:
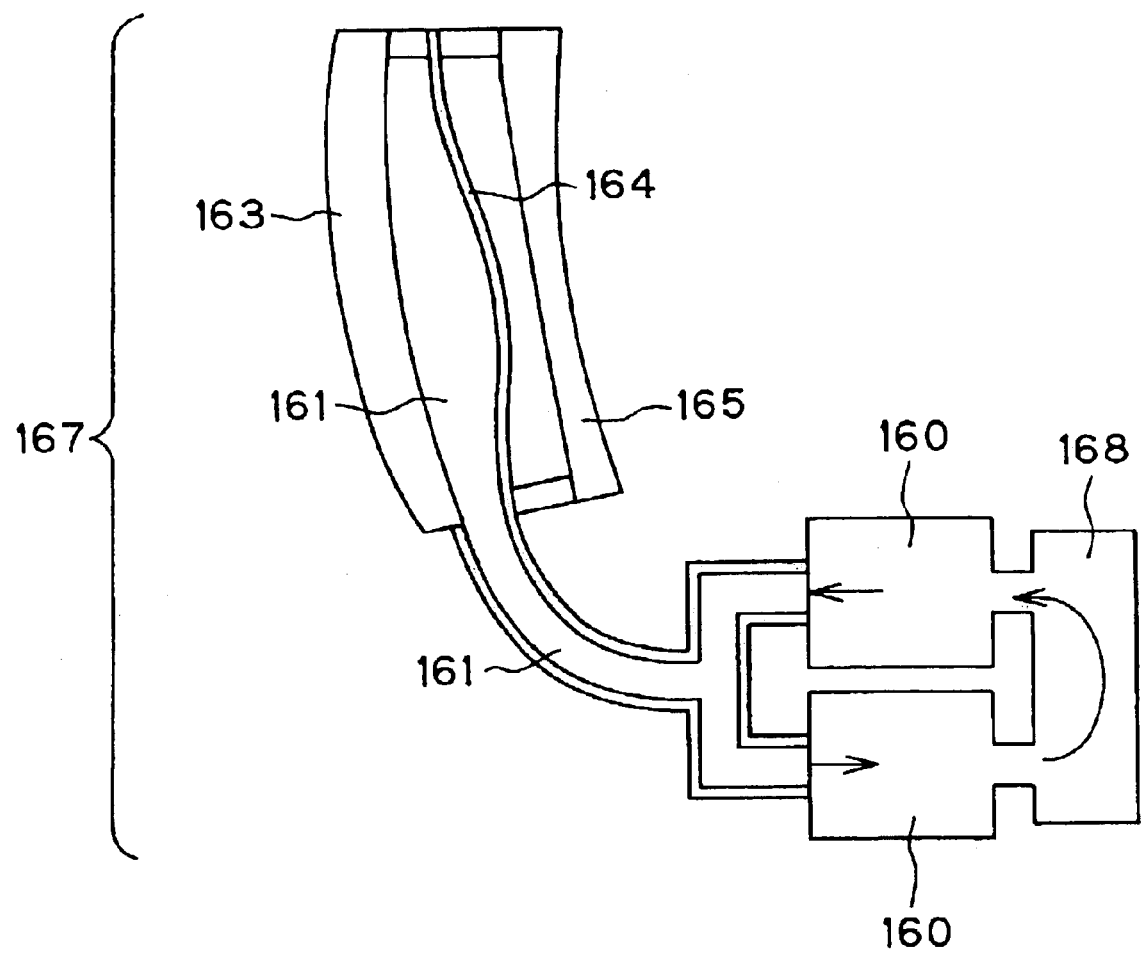
FIG. 30 is illustrative in schematic of yet another example of the variable-focus lens, that is, the variable-focus lens 167 to and from which the fluid 161 is fed or removed for transformation of the lens surface.

FIG. 30 is illustrative in schematic of a further example of the variable-focus lens, that is, a variable-focus lens 167 wherein a micropump 160 is used to feed or remove fluid 161 to or from the same, thereby transforming the lens surface of the variable-focus lens 167.

The micropump 160, for instance, is a power-driven, miniature pump fabricated by micromachining. The fluid 161 is sandwiched between a transparent substrate 163 and a transparent elastic member 164. The elastic member 164 provides a lens surface that is transformed by the fluid 161. In FIG. 30, reference numeral 165 stands for a transparent substrate for protection of the elastic member 164; however, this transparent substrate 165 is not necessarily required.

Exemplary pumps fabricated by micromachining include those harnessing thermal transformation, piezoelectric materials, and electrostatic force.

For instance, two micropumps, each shown in FIG. 15, may be used as is the case with the micropump 160 used for the variable-focus lens 160 shown typically in FIG. 30.

In this arrangement, as the fluid 161 is fed by driving the miropump 160 to transform the elastic member 164, the shape of the lens surface changes in response to light transmitting through the transparent substrate 163, fluid 161 and elastic member 164, so that the focal position of the lens varies.

Some variable-focus lenses making use of electrostatic force, piezoelectric effect, etc. often require high driving voltage. In this case, it is preferable to set up a control system using a boosting transformer, a piezoelectric transformer, etc. Particular preference is given to a multi-layer piezoelectric transformer because size reductions are achievable.

EXAMPLE 6 OF THE VARIABLE-FOCUS LENS

Figure 31:
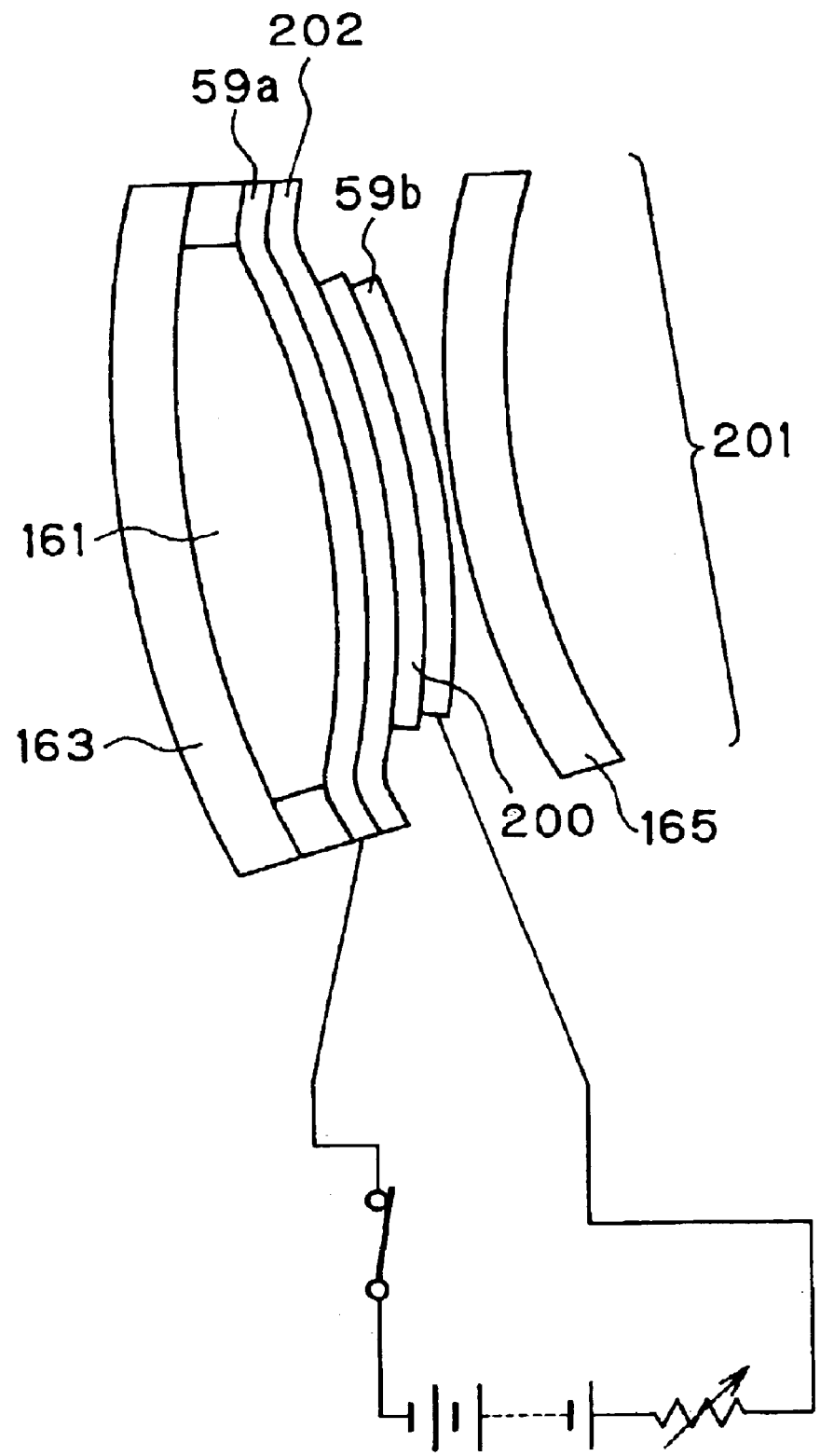
FIG. 31 is illustrative in schematic of another example of the optical element having variable optical properties, that is, the variable-focus lens 201 using the piezoelectric material 200.

FIG. 31 is illustrative of a further example of the variable-focus lens having variable optical properties, that is, a variable-focus lens 201 wherein a piezoelectric material 200 is used instead of the elastic member 164 of FIG. 30. In this example, the fluid 161 is closed up between a transparent substrate 163 and a transparent electrode 59a.

A material similar to the transparent substance 143 is used for the piezoelectric material 200, which is provided on a transparent, soft substrate 202. Preferably in this case, synthetic resins or organic materials should be used for the substrate 202.

In this example, voltage is applied on the piezoelectric material 200 via two transparent electrodes 59a and 59b, so that the piezoelectric material 200 is transformed, acting as a convex lens in FIG. 31.

Figure 32:
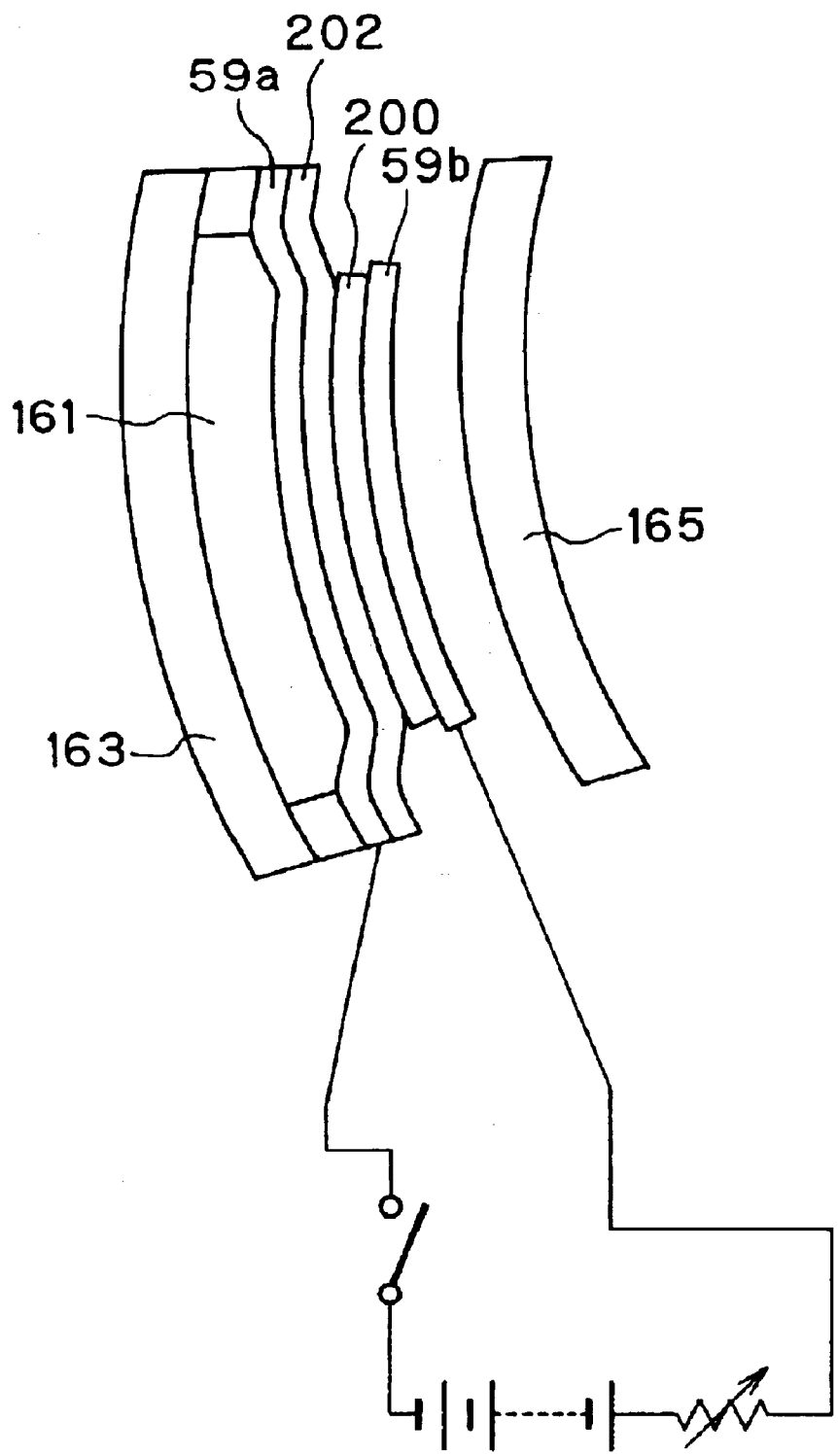
FIG. 32 is illustrative of the state of a modified variable-focus lens to FIG. 31.

Alternatively, it is acceptable that the substrate 202 is previously configured in a convex form while the size of at least one of the two transparent electrodes 59a and 59b differs from that of the substrate 202. For instance, one transparent electrode 59b is made smaller than the substrate 202. When voltage is put off in this state, only opposite portions of the two electrodes 59a and 59b are transformed in a concave form, as shown in FIG. 32, acting as a concave lens and so a variable-focus lens.

At this time, the substrate 202 is transformed in such a way that the volume of the fluid 161 remains invariable, offering a merit that any reservoir can be dispensed with.

A major merit of this example is that a portion of the substrate 202 that retains the fluid 161 can be transformed by means of the piezoelectric material, so that any reservoir can be dispensed with.

It is noted that although common to the example of FIG. 30, the transparent substrates 163 and 165 may each be configured as a lens or a plane.

EXAMPLE 7 OF THE VARIABLE-FOCUS LENS

Figure 33:
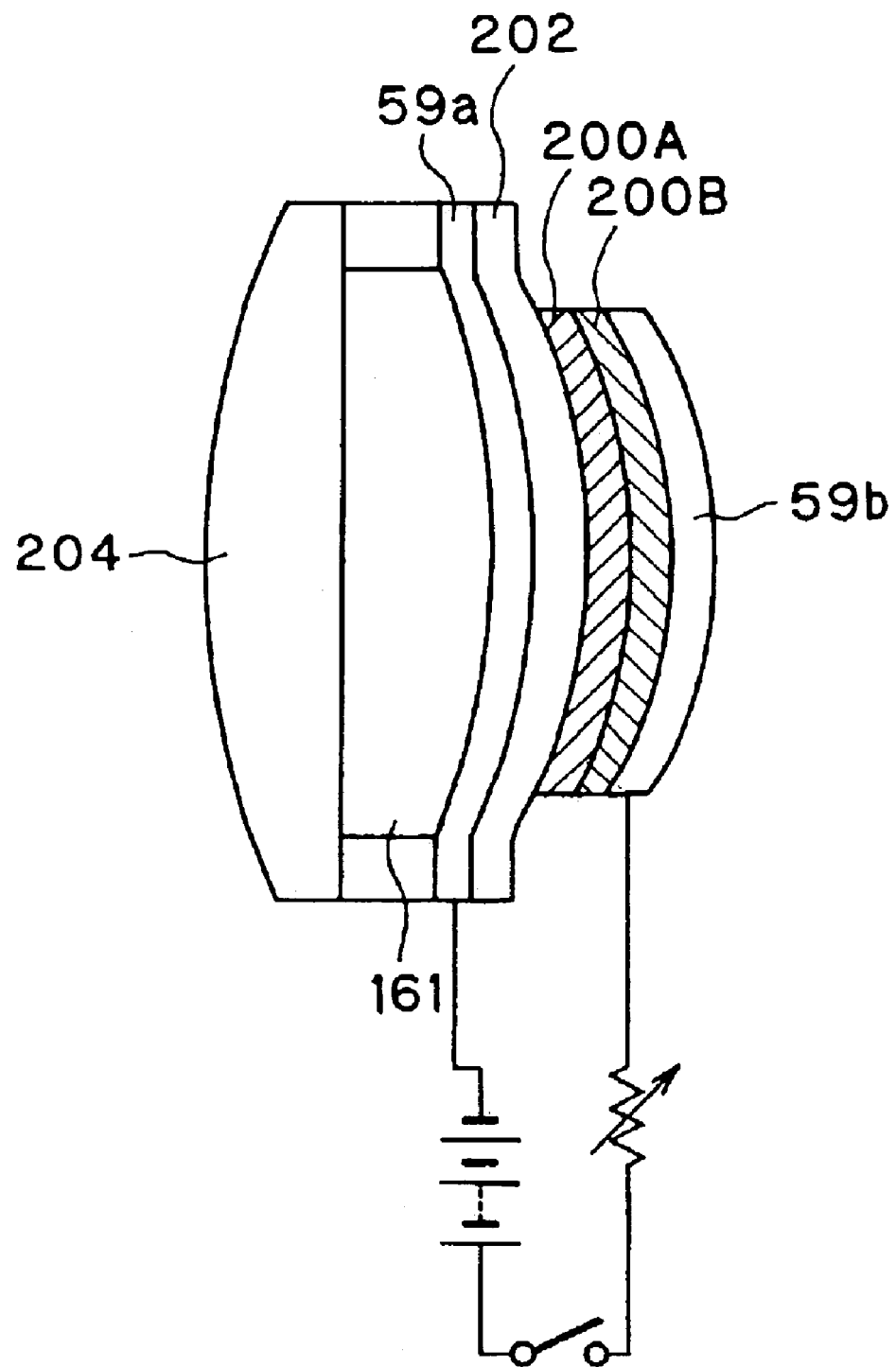
FIG. 33 is illustrative of yet another example of the optical element having variable optical properties, that is, a variable-focus lens using two thin sheets 200A and 200B each formed of a piezoelectric material.

FIG. 33 is illustrative in schematic of a further example of the variable-focus lens having variable optical properties, that is, a variable-focus lens wherein two thin sheets 200A and 200B formed of a piezoelectric material are used instead of the piezoelectric material 200 of FIG. 32.

This variable-focus lens has a merit of using the thin sheets 200A and 200B while the directivity of the piezoelectric material is reversed, thereby increasing the amount of transformation and achieving a wide variable-focus range.

In FIG. 33, reference numeral 204 stands for a lens form of transparent substrate, and 161 represents fluid.

In this example, too, the right-hand transparent electrode 59b in FIG. 33 is made smaller than the substrate 202.

It is noted that if, in the examples of FIGS. 31, 32 and 33, the substrate 202, piezoelectric material 200 and thin sheets 200A and 200B are configured to have uneven thickness, it is then possible to control the manner of transformation at an applied voltage.

This is convenient for correction of lens aberrations, etc.

EXAMPLE 8 OF THE VARIABLE-FOCUS LENS

Figure 34:
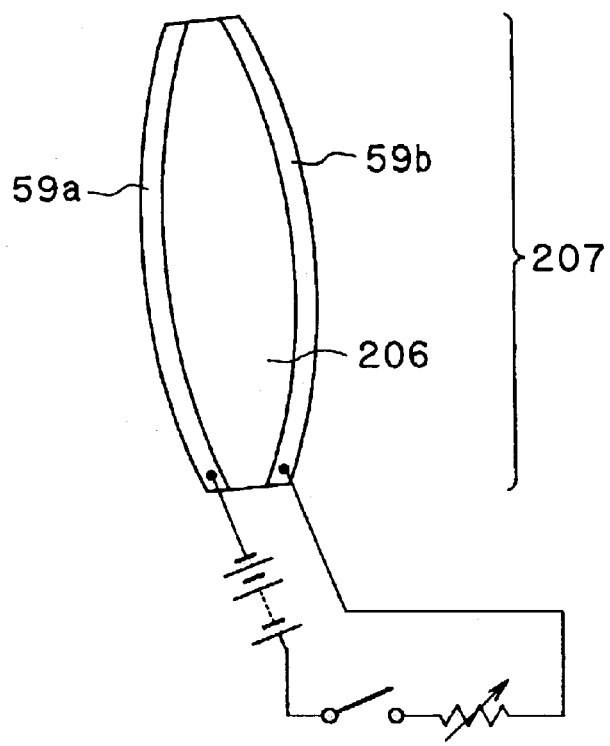
FIG. 34 is illustrative in schematic of yet another example of the variable-focus lens.

FIG. 34 is illustrative in schematic of a further example of the variable-focus lens.

This variable-focus lens 207 is made up of a pair of transparent electrodes 59a and 59b and an electrostrictive material 206 such silicone rubber or acryl elastomer, which is sandwiched between them.

Figure 35:
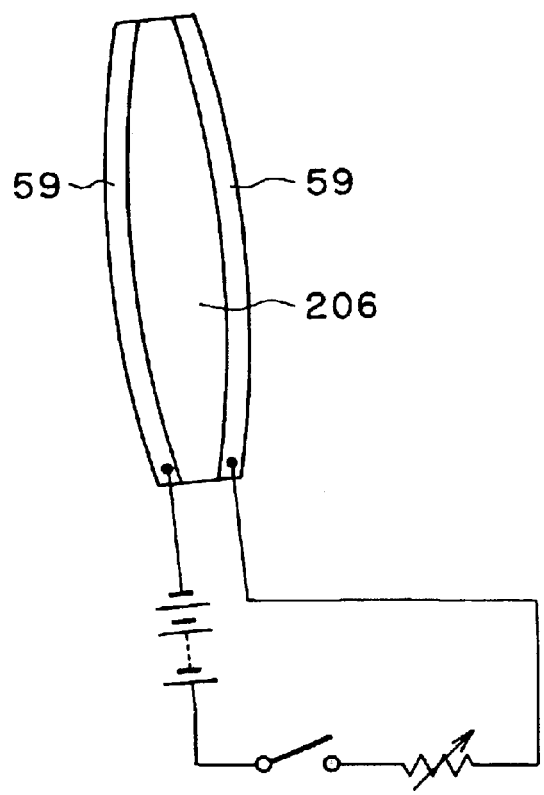
FIG. 35 is illustrative of the state of the variable-focus lens of FIG. 34.

According to the arrangement of this example, the lens 207 inflates at its middle portions at a low applied voltage as shown in FIG. 34, acting as a convex lens. At a high applied voltage, the electrostrictive material 206 elongates vertically but contracts horizontally as shown in FIG. 35, increasing in focal length and acting as a variable-focus lens.

A merit of this variable-focus lens is that power consumptions can be reduced because of no need of a large power source.

Commonly to the variable-focus lenses of FIGS. 27 to 35, variable focus is achievable through changes in the shape of the medium acting as a lens. Merits of such lenses over variable-focus lenses having varying refractive indices are that the range of focal length changes, their sizes, etc. can be selected without restraint.

EXAMPLE 9 OF THE VARIABLE-FOCUS LENS

Figure 36:
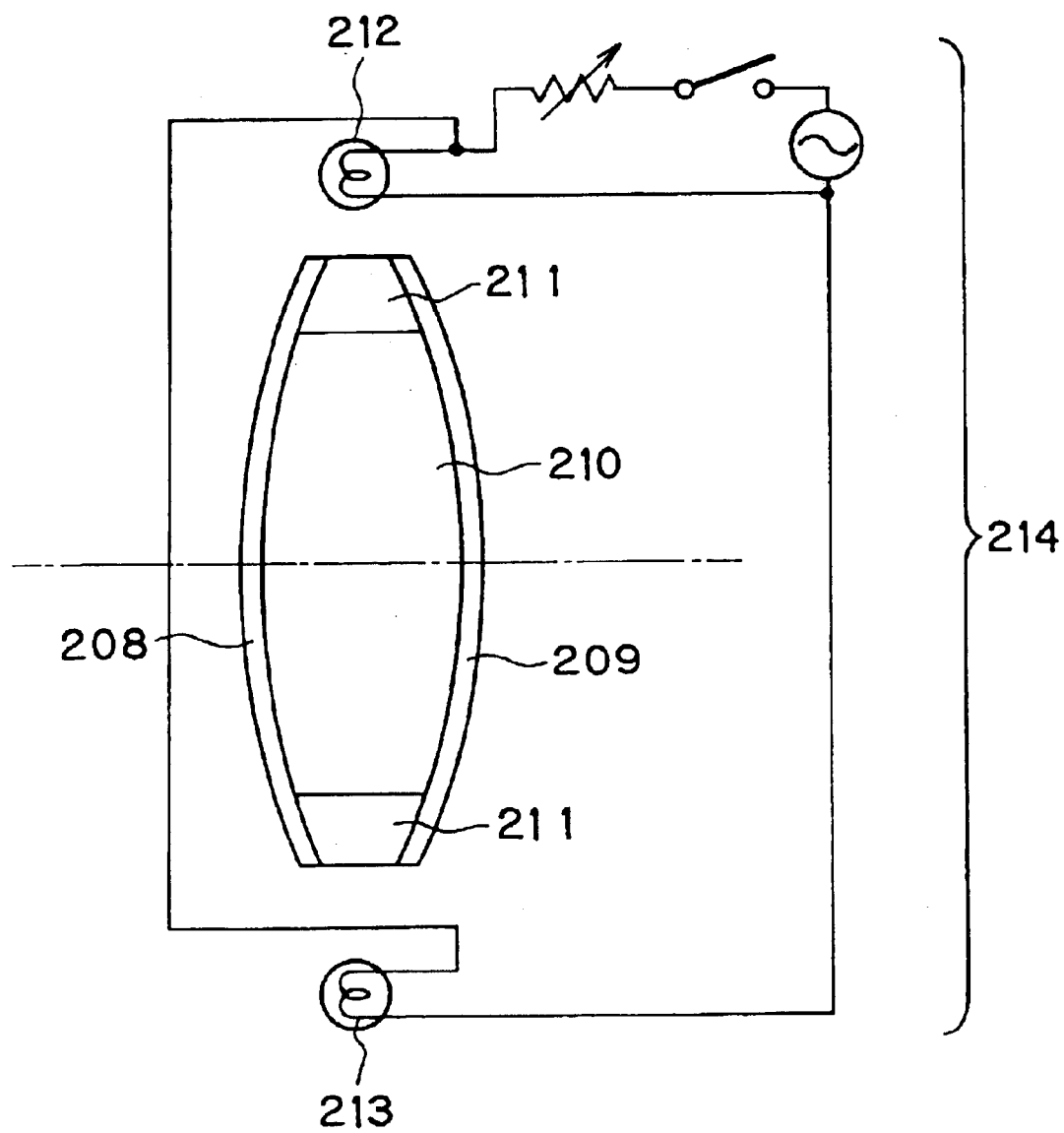
FIG. 36 is illustrative in schematic of a further example of the optical element having variable optical properties, that is, the variable-focus lens that relies on photonic effect.

FIG. 36 is illustrative in schematic of a further example of the variable-focus lens having variable optical properties, that is, a variable-focus lens making use of photomechanical effect.

This variable-focus lens 214 is built up of azo-benzene 210 sandwiched between transparent elastic members 208 and 209. The azobenzene 210 is irradiated with light by way of transparent spacers 211.

In FIG. 36, reference numerals 212 and 213 stand for light sources having wavelengths $\lambda_1$ and $\lambda_2$, respectively, such as LEDs or semiconductor lasers.

Figure 37A:
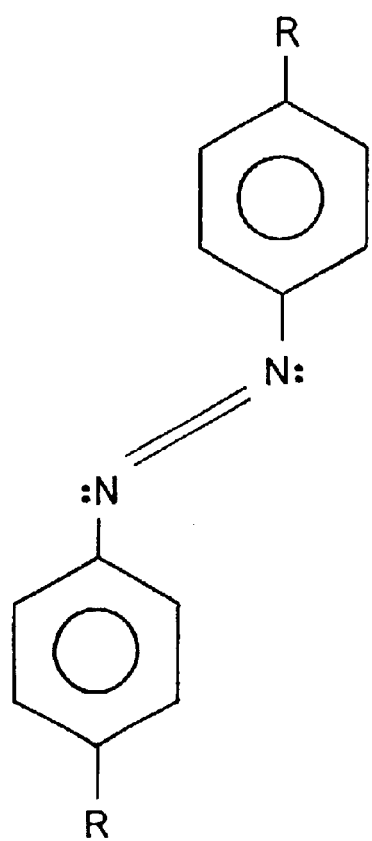
FIGS. 37(a) and 37(b) are illustrative of the structures of trans-form azobenzene and cis-form azobenzene, respectively, both used for the variable-focus lens of FIG. 36.
Figure 37B:
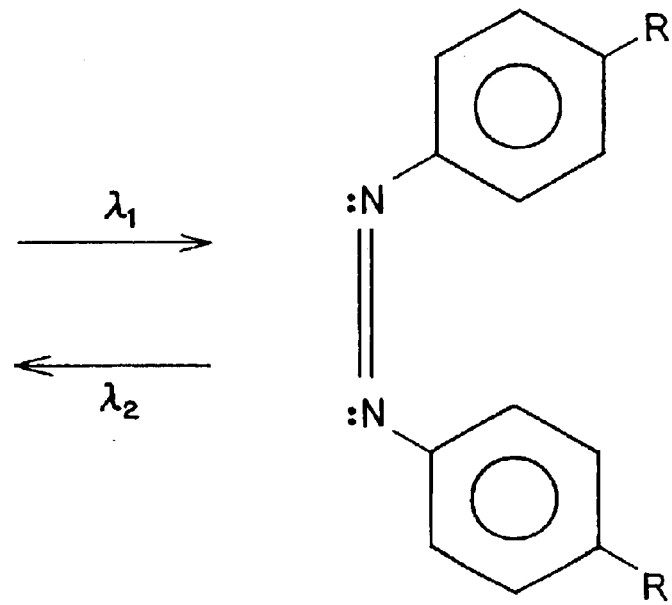

In the instant example, as the trans-form azo-benzene shown in FIG. 37(a) is irradiated with light having the center wavelength $\lambda 1$, the azobenzene 210 changes to cis-form azobenzene shown in FIG. 37(b), resulting in volume decreases. Consequently, the variable-focus lens 214 becomes thin and so the convex lens action becomes slender.

As the cis-form azobenzene 210 is irradiated with light having the center wavelength $\lambda 2$, on the other hand, the azobenzene 210 changes from cis to trans-form, resulting in volume increases. Consequently, the variable-focus lens 241 becomes thick and so the convex lens action increases.

In this way, this optical element 214 acts as a variable-focus lens.

From variable-focus lens 214, there is no light leakage that ensures high efficiency, because light is totally reflected at the boundaries between the transparent elastic members 208, 209 and air. It is here noted that light used for the lens may have wavelengths from visible to infrared wavelength, and that mixtures of azobenzene with other liquids may be used as the azo-benzene 210.

EXAMPLE 9 OF THE VARIABLE-SHAPE MIRROR

Figure 38:
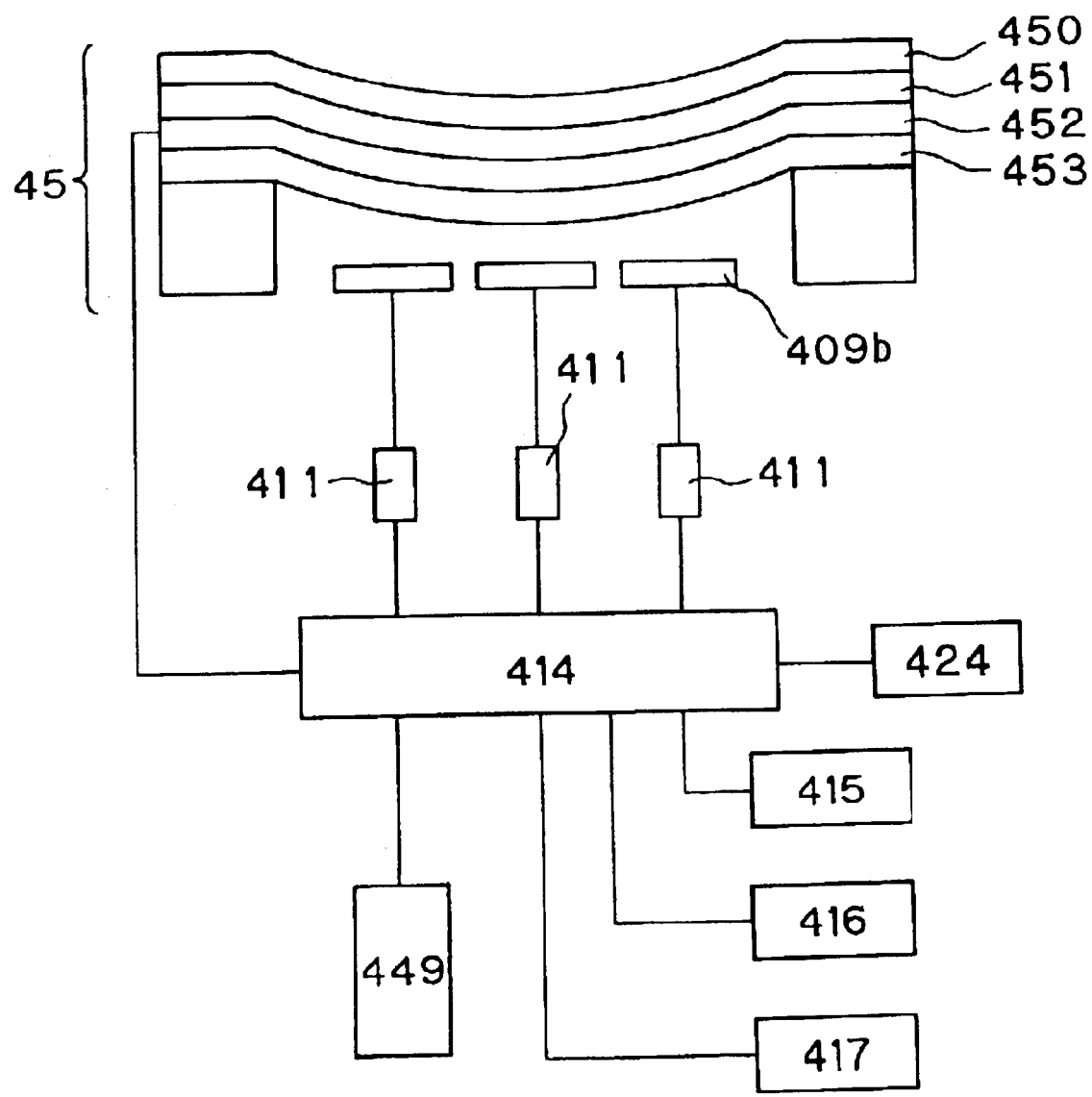
FIG. 38 is illustrative in schematic of a further example of the variable-shape mirror.

FIG. 38 is illustrative in schematic of a further example of the variable-shape mirror. This example is now explained with reference to a digital camera. In FIG. 38, reference numeral 411 is a variable resistor, 414 a computing unit, 415 a temperature sensor, 416 a humidity sensor, 417 a distance sensor, and 424 a shake sensor.

This variable-shape mirror 45 comprises a plurality of divided electrodes 409b spaced away from an electrostrictive material 453 comprising an organic material such as acryl elastomer. On the electrostrictive material 453 there are provided an electrode 452 and a transformable substrate 451 in this order. On the substrate 451 there is an aluminum or other metallic reflecting film 450 that reflects incident light. Thus, the transformable layer of the variable-shape mirror 45 has a four-layer structure.

A merit of this arrangement over an arrangement wherein the divided electrodes 409b are integral with the electrostrictive material 453 is that the surface shape of the reflecting film (reflecting surface) 450 is so smooth that aberrations are unlikely to occur optically.

It is here noted that the locations of the transformable substrate 451 and electrode 452 may be reversed.

In FIG. 38, reference numeral 449 stands for a scaling or zooming button for an associated optical system. The variable-shape mirror 45 is controlled via the computing unit 414 in such a way that the reflecting film 450 can be transformed by pressing down the button 449 for scaling or zooming purposes.

It is acceptable to use the already mentioned piezoelectric materials such as barium titanate instead of the electrostrictive materials comprising organic material such as acryl elastomer.

Commonly to each of the variable-shape mirrors as explained so far, it is preferable that as viewed from the vertical direction to the reflecting surface, the transforming portion of the reflecting surface is configured such that it is long in the direction of the entrance surface for axial rays, for instance, an elliptic shape, an oval shape and a polygonal shape. This is because the variable-shape mirror is often used while light rays are obliquely incident thereon, as in the case of FIG. 13. To reduce aberrations that occur in such cases, the shape of the reflecting surface should preferably be approximate to the ellipsoidal surface of revolution, the paraboloid of revolution, and the hyperboloid of revolution. To transform the reflecting surface of the variable-shape mirror according to that shape, it is preferable that as viewed from the vertical direction to the reflecting surface, the transforming portion of the reflecting surface is configured such that it is long in the direction of the entrance surface for axial rays.

In the present invention, the optical axis is defined by a path taken by a light ray that passes through the center of an object surface and the center of an aperture stop or an exit pupil.

For an optical system having no aperture stop or no exit pupil, the optical axis is defined by a path taken by a light ray that leaves the center of an object surface and travels vertically to the object surface.

Thus, the optical axis changes generally following the transformation of the reflecting surface of the variable-shape mirror (hereinafter called simply the variable mirror); however, that change is often slight. In the drawings referred to in Embodiments 1 to 10 of the invention, mutually orthogonal three axes in XYZ directions are shown for the sake of explanations.

In the embodiments (Embodiments 1–3 and 6–10) except Embodiments 4 and 5, the optical axis is substantially matched to the Z-axis.

Accordingly, symbols such as C, h, φ and Δ referred to in the explanations of Embodiments 1–3 and 6–10 barring Embodiments 4 and 5 have much the same value whether measured on the Z-axis basis or measured on the optical axis basis.

EXPLANATION OF THE OPTICAL SYSTEM OF THE INVENTION

Figure 39:
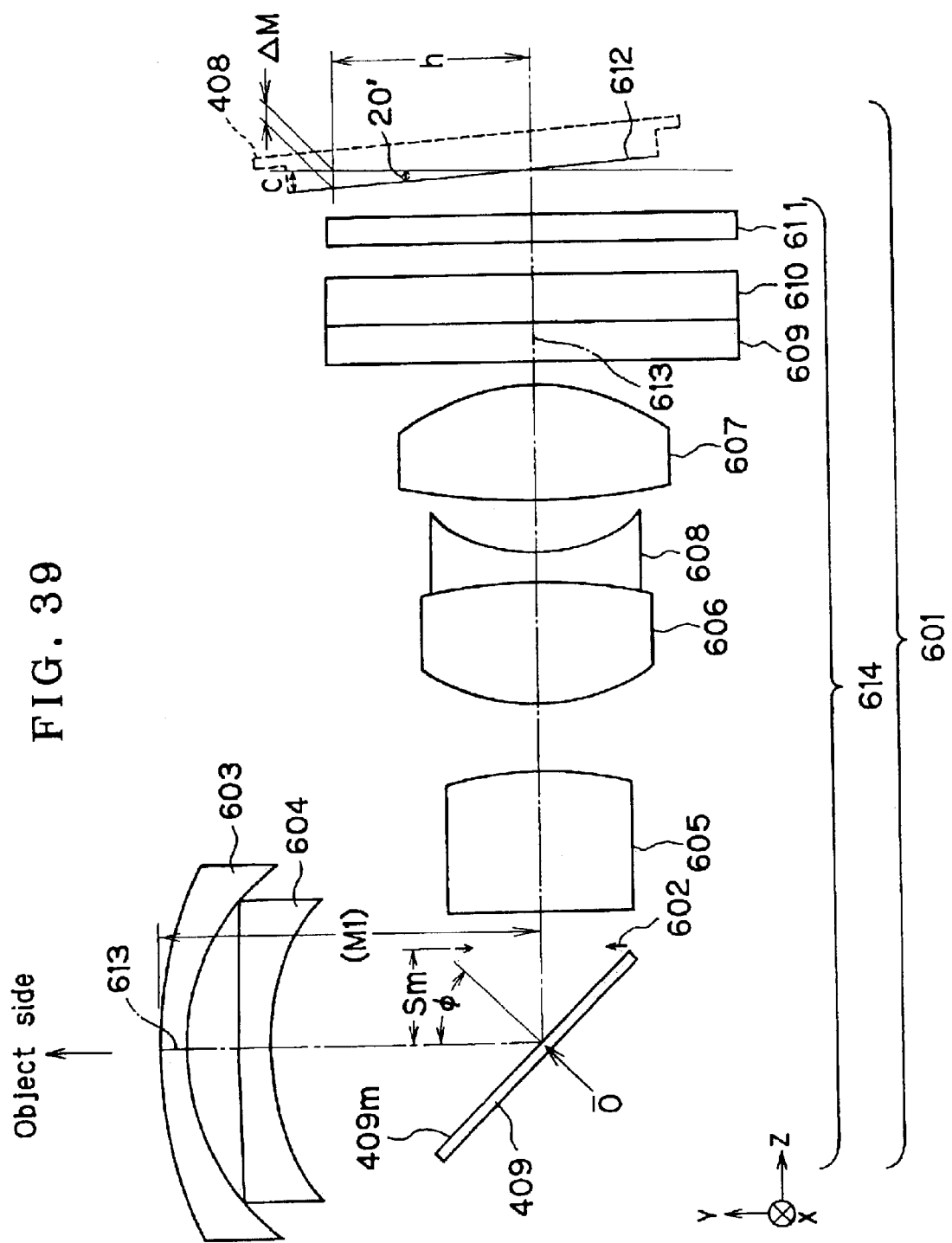
FIG. 39 is a Y-Z sectional view of an example of the image pickup apparatus for digital cameras, in which the optical system of the invention is used.

FIG. 39 is a Y-Z sectional schematic of one embodiment of the optical system of the invention used for an image pickup optical system, that is, an optical system 614 for an image pickup apparatus 601 for digital cameras, wherein a variable mirror 409 is used on an optical axis 613 where an object distance with respect to the optical system is infinite (∞). This embodiment corresponds to Embodiment 1 given later. On the optical axis 613 of the aforesaid optical system 614, an aperture stop 602 is located at a position spaced Sm away from the reflecting surface 409m of the variable mirror 409. Here this distance Sm should be measured and calculated on an air basis. In FIG. 39, ○ represents the point of intersection of the reflecting surface 409m with the optical axis 613. Therefore, the distance Sm represents the distance between the reflecting surface of the variable mirror 409 and the aperture stop 602 as measured along the optical axis. The reflecting surface 409m corresponds to the aforesaid thin film 409a, reflecting film 189, reflecting film 568, and reflecting film 450, respectively. The control means for controlling the shape of the reflecting surface 409m is not shown.

On the optical axis 613 of the aforesaid optical system 614, a concave lens 603 and a concave lens 604 are located on the object side of the variable mirror 409, and in the rear of the aperture stop 602 there are located a convex lens 605, a convex lens 606, a concave lens 608 and a convex lens 607. The concave lens 603 and concave lens 604 form together a front lens group having negative refracting power while the lenses located in the rear of the aperture stop 602 form together a rear lens group having positive refracting power.

In the rear of the rear lens group there are located a low-pass filter 609, an infrared cut filter 610 and a cover glass 611. In the rear of the cover glass 611, the image pickup surface 612 of a solid-state image pickup device 408 is obliquely located at an angle of 20' with respect to the optical axis 613 at an object distance ∞, that is, the surface vertical to the Z-axis. This angle of tilt is hereinafter referred to as C.

The above lens system is generally of the retrofocus type.

The reflecting surface 409m of the variable mirror 409 is controlled such that it has a planar form at an object distance ∞, and it turns to a free-form surface whose concaveness become strong as the object distance becomes short. Control of the reflecting surface 409m may be carried out as explained with reference to control of the film 409a, 189, 568, and 450 of the already mentioned variable-shape mirror 409.

When the optical system 614 is at an object distance ∞, therefore, the optical axis 613 is located through the optical axes of the respective lenses 603, 604, 605, 606, 608 and 607 even upon bent at the variable mirror 409. In other words, when the reflecting surface 409m of the variable mirror 409 is a plane, the optical system 614 of the image pickup apparatus 601 optically forms a non-decentration system.

When the reflecting surface 409m of the variable mirror 409 is concave, the optical system 614 takes the form of a decentration system.

The variable mirror 409 should preferably be located at a position as close to the aperture stop 602 as possible. This is because when the reflecting surface 409m of the variable mirror 409 is not a plane, it is possible to reduce the image position-depending change in the difference between the field curvature of a light beam (the field curvature of a light beam in the Y-Z plane) and the field curvature of a sagital light beam (the field curvature of a light beam in the vertical direction to the paper); that is, it is possible to reduce the amount of change in the sagital and meridional image surfaces that change depending on an image position.

A merit of locating the aperture stop 602 at a position as close to the variable mirror 409 as possible is achievable not only in the embodiment of FIG. 39 but also in the case of an optical system using a free-form surface, a decentration optical system or the like.

The merit of locating the aperture stop at a position as close to the variable mirror 409 as possible becomes noticeable as the value of φ increases, where φ is the angle of incidence of the variable mirror 409 on the optical axis 613. This effect becomes particularly prominent, if $$39°≤φ≤60° \tag{599}$$

Here φ is the angle of incidence of the variable mirror 409 on the optical axis provided that the object distance is infinite (∞).

Exceeding the upper limit of 60° to this formula (599) is not preferable because some considerable aberrations by oblique incidence are produced. Coming short of the upper limit of 39° is again not preferable for the same reason. An optical system of higher performance is obtainable, if $$39°≤φ≤55°$$

An optical system of ever higher performance is obtainable, if $$39°≤φ≤50° \tag{600}$$

For the aforesaid reason, the optical system of the invention should preferably satisfy $$0≤|Sm/f|≤10 \tag{601}$$

Here f is the focal length of the optical system 614 from which the variable mirror 409 is removed, and Sm is the distance between the reflecting surface of the variable mirror and the aperture stop as measured along the optical axis and calculated on an air basis.

As the upper limit of 10 to formula (601) is exceeded, image-formation capabilities become worse by reason of increased field curvature.

For a higher-definition image pickup apparatus, it is preferred that $$0≤|Sm/f|≤5 \tag{602}$$

Where ever higher performance is demanded, it is preferable that $$0≤|Sm/f|≤3 \tag{603}$$

In a full-aperture state, the aperture stop 602 is located at the position as already indicated. The position of the aperture stop 602 having a narrow aperture does not necessarily satisfy formulas (601), (602) and (603). In other words, a variable-aperture top may be located at a position different from that for the aperture stop in a full-aperture state. For instance, that stop may be located in a space between the convex lens 605 and the convex lens 606. In what follows, the aperture stop will hereinafter be called simply the stop.

The reason is that the location of the variable-aperture stop at the position where formulas (601), (602) and (603) are satisfied is often difficult in consideration of mechanical design. In this case, that stop should be located at another position.

Where the stop is at a narrow aperture, no problem arises even when the position of the stop does not satisfy formulas (601), (602) and (603), because aberrations are generally in good condition and so are image-formation capabilities.

Figure 40:
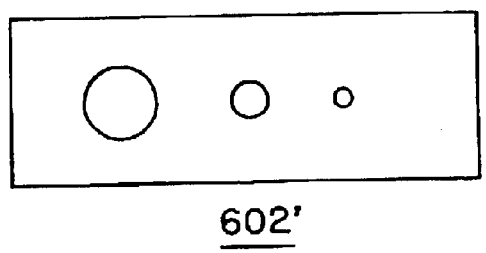
FIG. 40 is illustrative of a stop having a discontinuously varying aperture.

When such a stop 602' having discontinuously varying apertures as shown in FIG. 40 is used, it is preferable to locate that stop in any space between the convex lens in the rear of the stop 602 in a full-aperture state and the low-pass filter 609, because the aforesaid merit becomes outstanding. Each aperture in the stop 602' is inserted and de-inserted in the optical path in a sliding fashion to vary the F-number.

Reference is now made to the merit of another feature of the invention that the image pickup surface 612 is tilted by an angle of tilt, C, with respect to the plane vertical to the Z-axis.

When the reflecting surface 409m is transformed into the strongest concave surface, the optical system 614 becomes a decentration optical system wherein the image-formation surface is tilted by an angle B with respect to the plane vertical to the Z-axis. In other words, the image-formation surface moves following the transformation of the reflecting surface 409m of the variable-shape mirror 409. Accordingly, if the image pickup surface 612 is tilted at the angle B commensurate with the image-formation surface of the optical system 614, then the resolving power becomes best. However, this means that when the reflecting surface 409m is a plane, the resolving power drops. It is thus preferable that the image pickup surface 612 is tilted by an angle of B/2 with respect to the plane vertical to the Z-axis.

This is given by formulae as follows:

$$|B|/4<|C|<3|B|/4 \quad (604)$$

$$B \cdot C > 0 \quad (605)$$

Here C is the angle of tilt of the image pickup surface of the image pickup device upon tilted with respect to the plane vertical to the Z-axis, and B is the image-formation surface of the optical system tilted with respect to the plane vertical to the Z-axis.

In practical applications where the importance of object distance differs from product to product, it is preferred that $$0<|C|<|B| \quad (606)$$

$$B \cdot C > 0 \quad (605)$$

Specifically but not exclusively, the present invention has been described with reference to the reflecting surface 409m that changes from planar surface to concave surface. In general, it is preferable that corresponding to formula (606), C is selected in such a way as to satisfy the following formula (607):

$$B_m < C < B_M \quad (607)$$

where $B_m$ and $B_M$ are the minimum and maximum angles of tilt of the image-formation surface in association with the transformation of the reflecting surface of the variable mirror, respectively.

Corresponding to formula (604), it is again preferred that C is selected in such a way as to satisfy the following formula (608):

$$(B_M+3B_m)/4 < C < (3B_M+B_m)/4 \quad (608)$$

The tilt of the image-formation surface is here understood to include three-dimensional decentration (that is, the tilt allows for a degree of freedom regarding both the angle of tilt and the angle of azimuth), and the aforesaid formulae (604) to (608) hold true for this case as well.

In summary, the image pickup surface should be placed within the range of the change in the image-formation surface that occurs in association with the transformation of the reflecting surface of the variable mirror. The image pickup surface may remain fixed or change in association with the transformation of the reflecting surface of the variable mirror. This idea goes true for image pickup apparatus as well as for display apparatus, viewing apparatus, etc., the embodiments of which will be given.

The same is also applicable to optical apparatus using not only variable mirrors but also elements having variable optical properties such as variable-focus lenses.

On the other hand, let $F_{NO}$ be the F-number of the optical system and $P_x$ (in the X direction) and $P_y$ (in the Y direction) be the size of one pixel of the solid-state image pickup device 408 having the image pickup surface 612. Then, one depth of focus is given by $$D_f = k \cdot \sqrt{(P_x \cdot P_y)} \cdot F_{NO} \quad (609)$$

Here k is a constant of proportion having usually a value of the order of 1.5 to 4.

Here let $\Delta M$ represent a maximum displacement in the Z direction of the image pickup surface 612 with respect to the position of the image-formation surface on the optical axis 613, wherein the displacement is caused by the tilt of the image pickup surface 612. Then, $$\Delta M = |h \cdot \tan C| \quad (610)$$

Here h is the distance from the optical axis 613 to a point where the displacement of the image pickup surface 612 reaches a maximum as measured from the optical axis 613.

Where the value of $\Delta M$ is too small relative to $D_f$, any effect is not obtainable even when the image pickup surface 612 is tilted. Therefore, to improve resolving power by tilting the image pickup surface 612, it is preferable to satisfy the following formula (611):

$$|\Delta M| \geq D_f/20 \quad (611)$$

In order to be more effective, it is preferable to satisfy the following formula (612):

$$|\Delta M| \geq D_f/10 \quad (612)$$

The idea behind formula (611) or (612) is also applicable to the display system to be described later. Besides, the same idea is applicable to combinations of lens systems having a rotationally symmetric lens surface with variable mirrors as well as to optical systems using free-form surfaces and variable mirrors.

Figure 41:
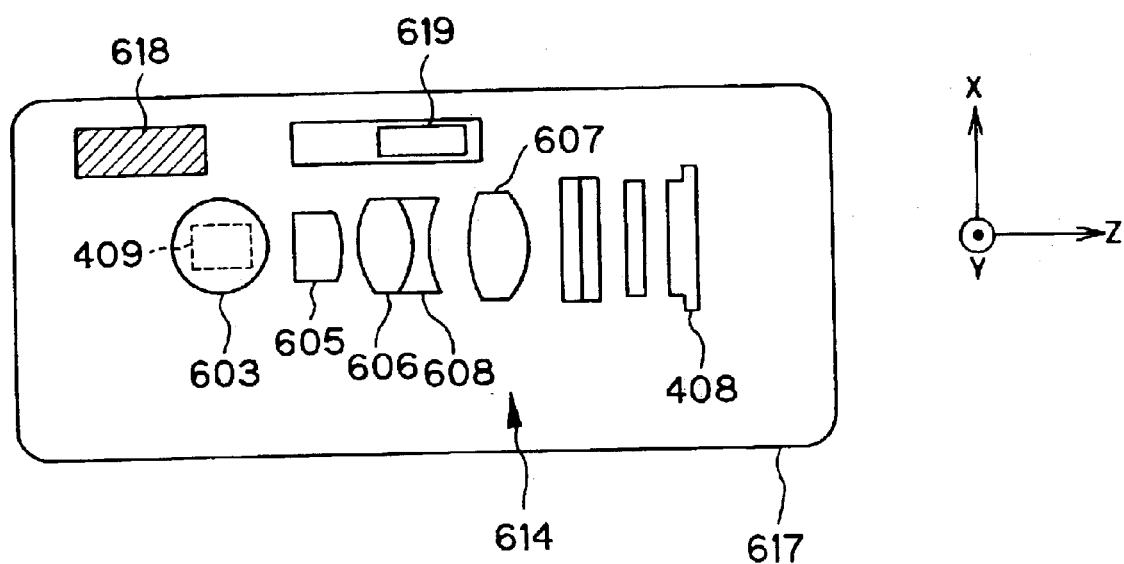
FIG. 41 is illustrative of the construction of an example of the digital camera in which the optical system of FIG. 39 is mounted.

FIG. 41 is illustrative of one exemplary construction of the digital camera 617 with the optical system of FIG. 39 mounted therein. In FIG. 41, reference numeral 618 is a flash and 619 a finder. FIG. 41 is a schematic of the digital camera as viewed from the subject side (object side).

As can be seen from FIG. 41, the optical system 614 is laterally longer, and so it is mounted in the digital camera 617 along the longitudinal direction thereof, as shown in FIG. 41.

For image pickup apparatus such as digital cameras, VTR cameras and TV cameras which are each usually in a cuboidal form, the angle of entrance, φ, of the variable mirror 40 on the optical axis 613, that is, the angle of bending, 2φ, of the optical axis 613 (FIG. 39) at the variable mirror 409 should be approximately 90°. In practical applications, it is preferable to satisfy the following formula (613):

$$39° \leq \phi \leq 55° \quad (613)$$

This is because the optical system can be received in the image pickup apparatus without detrimental to the design of the image pickup apparatus.

For optical apparatus that is required to have more compact shape, it is preferable to satisfy the following formula (614):

$$39° \leq \phi \leq 50° \quad (614)$$

For easier assembling and processing, it is preferable to satisfy the following formula (615):

$$42° \leq \phi \leq 48° \quad (615)$$

Figure 46:
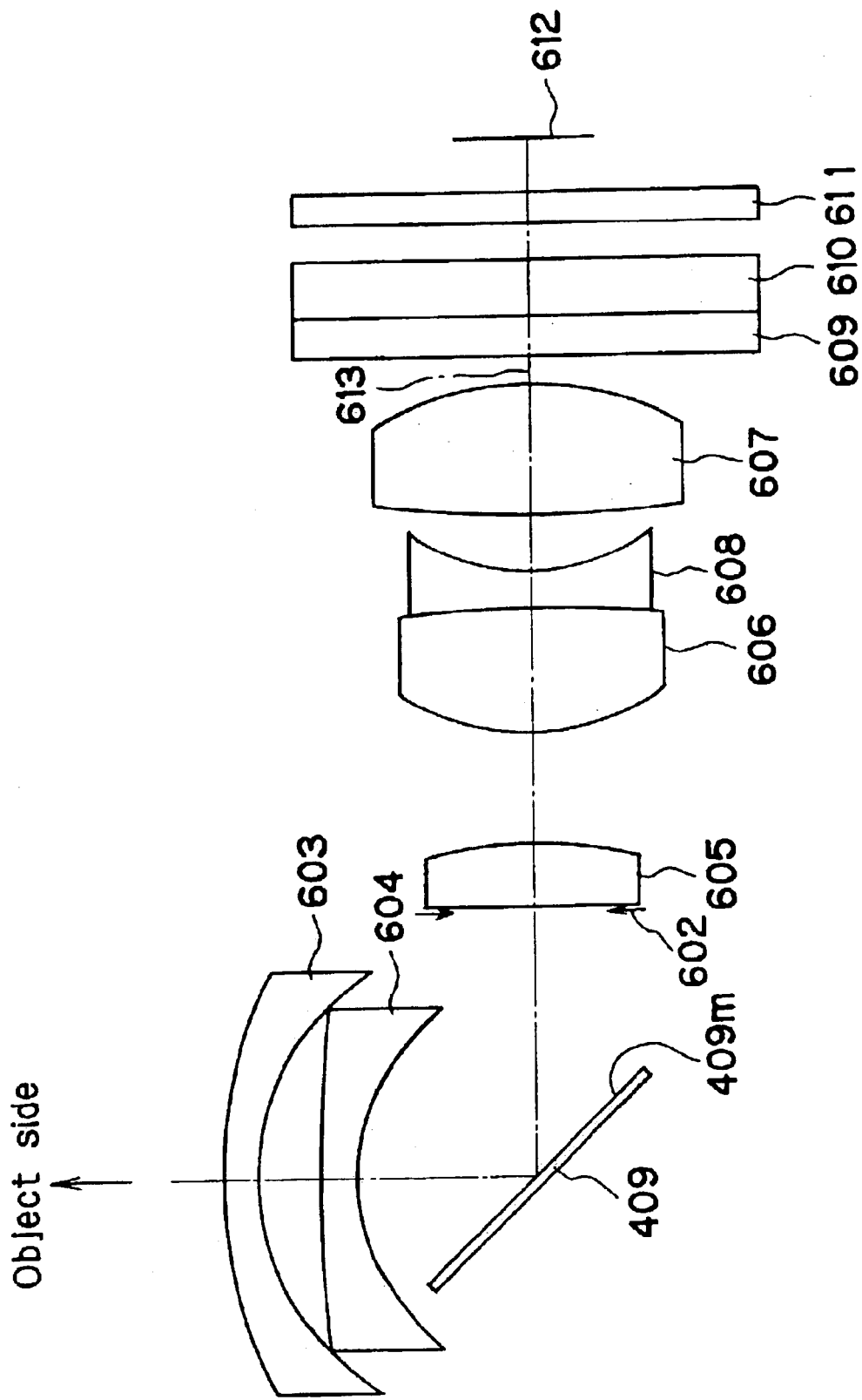
FIG. 46 is a Y-Z sectional view for Example 2 of the optical system.

The bending of the optical axis, wherein the longitudinal direction of the image pickup area on the image pickup surface 612 of the solid-state image pickup device is substantially parallel with the surface of incidence of an axial light ray on the variable mirror 409 as is the case with FIG. 39, is here called "long-side bending", whereas the bending of the optical axis, wherein the image pickup area is rotated about 90°, is called "short-side bending", as is the case with Embodiment 2, given later and shown in FIG. 46.

For the long-side bending, the optical axis after long-side bending should preferably be located in the lateral direction of the camera as shown in FIG. 41 for the purpose of making the image pickup range oblong.

Conversely for the short-side bending, the optical axis after short-side bending should preferably be located in the longitudinal direction of the camera for the purpose of making the image pickup range oblong.

In either case, it is preferable to locate the flash 618 above the front position of the lens 603 as viewed from front, because the flash is unlikely to cast a shadow upon taking portraits.

Here, the term "camera" is understood to include film cameras, digital cameras, TV cameras, image pickup apparatus for cellular phones, etc.

In the embodiment of FIG. 39, the distance M1 (as calculated on an air basis) from the center o of the reflecting surface 409m of the variable mirror 409 to the center of the first surface of the concave lens 603, that is, the point of intersection of the entrance-side first surface of the lens with the optical axis, is a determinative factor for the thickness of such image pickup apparatus as the digital camera 617. Accordingly, the value of M1 should preferably be reduced as much as possible; however, too small a value for M1 causes the front lens group comprising the concave lenses 603 and 604 to collide with the variable mirror 409. It is thus preferable to satisfy the following formula (616):

$$0.5 < M1/f < 5 \quad (616)$$

where f is the focal length of the optical system 614 from which the variable mirror is removed, and M1 is the distance (as calculated on an air basis) between the center o of the reflecting surface 409m of the variable mirror 409 and the center of the first surface of the concave lens 603.

For a more compact arrangement, it is preferable to satisfy the following formula (617):

$$0.5 < M1/f < 3 \quad (617)$$

Regarding M1 shown in FIG. 39, it must be calculated on an air basis in consideration of the refractive index, thickness, etc. of the lenses 603 and 604.

Figure 42:
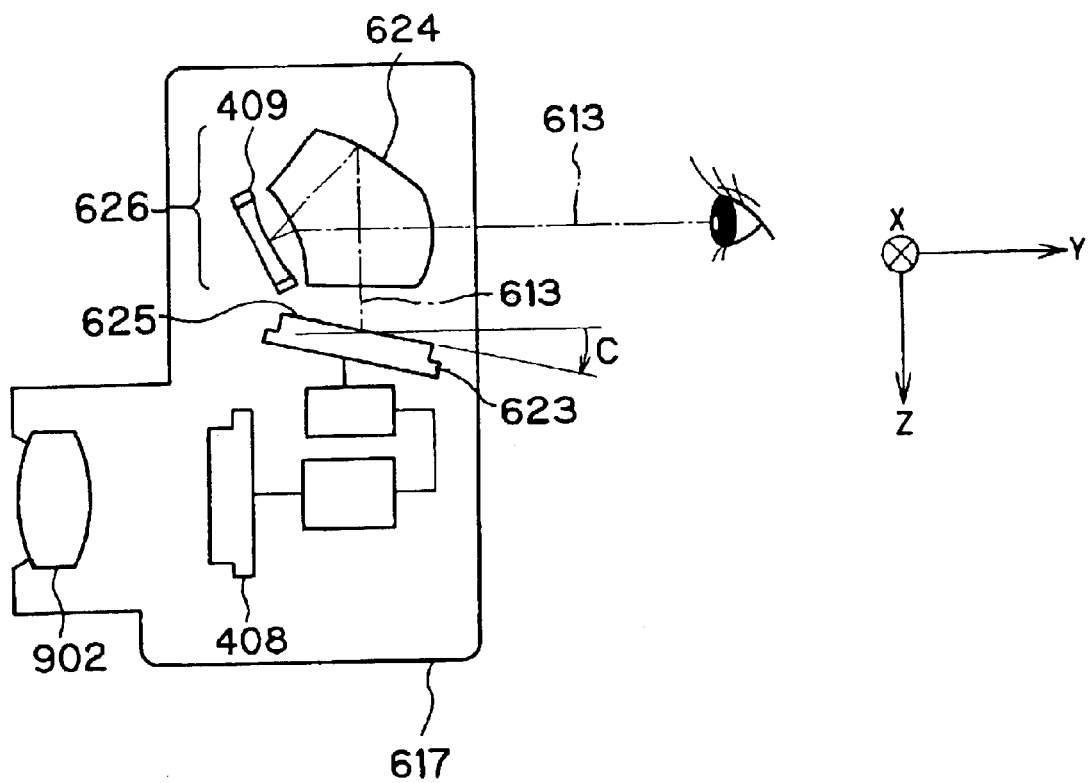
FIG. 42 is a side view of the digital camera in which the optical system of the invention is used for the finder system.

FIG. 42 is illustrative of one embodiment of a viewing optical system for which the optical system of the invention is used, that is, a digital camera 617 in which the variable mirror 409 is used for the finder system, as viewed from the side. This digital camera 617 comprises a view finder for viewing a display device 623 such as a liquid crystal display through a magnifying optical system 626 comprising a free-form surface prism 624 and a variable mirror 409. Diopter adjustment is carried out by the variable mirror 409. The display screen 625 of the display device 623 is tilted by an angle C with respect to the plane vertical to the optical axis 613 at a diopter of −1. That is, the angle of tilt is C.

Figure 43:
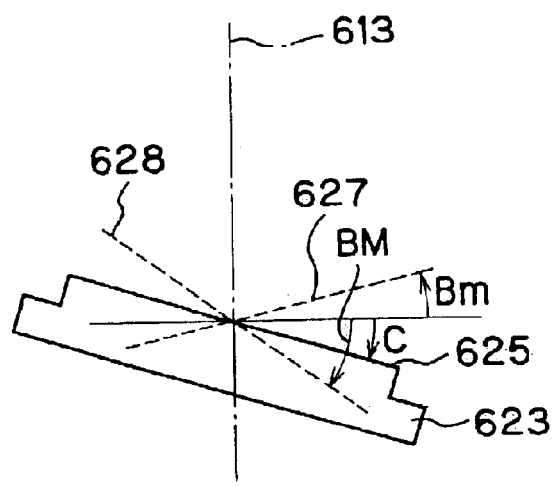
FIG. 43 is illustrative of changes in the image-formation surface in association with the transformation of the variable mirror.

Consider now the back ray tracing of light rays through the magnifying optical system 626 from the eye side. As the reflecting surface of the variable mirror 409 is transformed, the image-formation surface of the magnifying optical system 626 changes between the surface 627 and the surface 628, as shown in FIG. 43.

If, in this case, the display screen 625 of the display device 623 is located at a position substantially midway between the surface 627 and the surface 628, it is then possible to achieve a finder that enables every portion of the screen on the display surface 625 to be well viewed.

Formulae (604) to (608) and the idea behind them are again applicable to the finder of FIG. 42. If, in this case, $P_x$ and $P_y$ are replaced by the size of one pixel on the display device 623 (in the case of R, G and B three colors, one pixel is defined by a total of three colors, one for each color), then formulae (611) and (612) hold.

As already explained with reference to FIG. 39, by tilting the image pickup surface 612 by the angle C, it is possible to compensate for the changes in image-formation performance, which are caused by the changes in the image-formation surface responsible for the transformation of the reflecting surface 409m of the variable mirror 409.

In addition to the means for compensating for the changes in the image-formation surface by tilting the image pickup surface 612, other compensation means, too, are available. Substantially the same compensation for the embodiment of the optical system 614 shown in FIG. 39 may be achieved by decentering the front lens group comprising the concave lenses 603 and 604 by 0.025 mm in the left-hand direction with respect to the optical axis 613 at an object distance ∞, that is, in the −Z direction (the −Y direction in the coordinate system of FIG. 45). This then causes the image-formation surface to tilt in such a direction as to cancel the transformation of the variable mirror 409, so that an optical system having satisfactory resolution on the average is achievable.

Alternatively, substantially the same compensation for the optical system 614 of FIG. 39 may be achieved by turning the 13th surface in the numerical data about Embodiment 1 given later (that is, the right-hand optical surface of the convex lens 607 as counted in order from the object side of the concave lens 603) 4.5' clockwise. In this case, the center of turning is given by the point of intersection of the right-hand optical surface of the convex lens 607 with the optical axis 613 at an object distance ∞. Even so, the change in the tilt of the image-formation surface in association with the transformation of the reflecting surface 409m of the variable mirror 409, that is, the movement of the image-formation surface may be slacked.

By tilting the optical device comprising the solid-state image pickup device or decentering the optical element or a group of optical elements such as the front lens groups or the optical surface of the optical element, too, it is thus possible to compensate for the changes in the image-formation surface, which are caused by the transformation of the reflecting surface 409m of the variable mirror 409.

Here let A be the tilt of an image-formation surface, which is caused by the tilt or decentration of an optical device, an optical element or a group of optical elements or an optical surface. Formulae (604) to (608) again hold if C in those formulae is replaced by −A, and so do formulae (611) and (612) provided that ΔM after replacement of C by −A is used.

By tilting or decentering the optical element, it is also possible to compensate for aberrations such as coma and distortion, which are responsible for deterioration in image-formation performance.

If the reflecting surface of the variable mirror is transformed, then there are changes in aberrations other than field curvature, resulting in deterioration in image-formation performance. By tilting or decentering the optical element, however, it is possible to compensate for those aberrations.

The aforesaid tilting or decentering of the optical element is applicable not only to image pickup optical systems but also to display optical systems, viewing optical systems, etc.

The tilting or decentering of the image pickup device, display device and optical element is not always limited to one value; it is acceptable to vary the amount of tilting or decentering in association with the transformation of the reflecting surface of the variable mirror.

Figure 44:
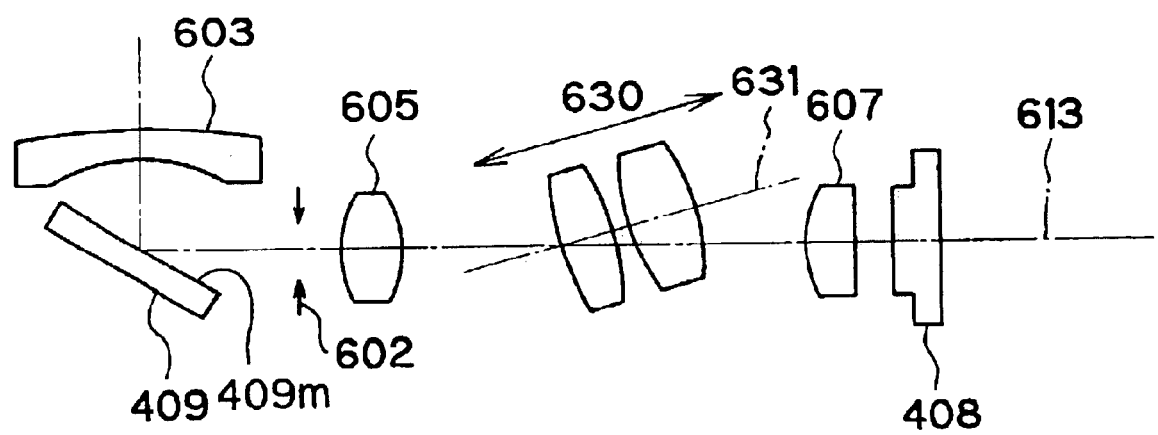
FIG. 44 is illustrative of the optical system of the invention, that is, the electronic image pickup optical system in which a lens group(s) located in the rear of the variable mirror is moved along an axis that is tilted or shifted with respect to the optical axis of the optical system.

To this end, it is acceptable to move a lens group 630 located in the rear of a stop 602 in the optical system of the invention along an axis 631 that is tilted, shifted or decentered with respect to an optical axis 613 of the optical system in a certain state, as is the case with an electronic image pickup optical system shown typically in FIG. 44. The optical system shown in FIG. 44, too, is an image pickup optical system according to the invention, and an optical apparatus using that optical image pickup system. In FIG. 44, too, the lens group 630 moves depending on the amount of transformation of a reflecting surface 409m of a variable mirror 409, so that the decentration of the lens group 630 with respect to the axis 631 varies. It is here noted that the movement of the lens group 630 along the axis 631 takes place while the attitude of each lens in the lens group 630 is kept intact. This holds true for the case where one lens is used instead of the lens group 630. The reference numerals referred to in FIG. 44 correspond to those in FIG. 39.

Thus, the amount of decentration of the optical element, display device, image pickup device or the like is not always limited to a fixed value. Preferably in this case, the angle C (angle of tilt) should comply with the following formula (618) in a state where the reflecting surface of the variable mirror is transformed:

$$Bv/3 < C < 5Bv/3 \tag{618}$$

Here Bv is the tilt of the image-formation surface caused by a change in the reflecting surface of the variable mirror. If Bv=C, then the tilt of the image-formation surface is canceled. More preferably, $$Bv/2 < C < 2Bv/3 \tag{619}$$

Even more preferably, the amount of movement of the image-formation surface should comply with formula (611) or (612). In this case, ΔM in formula (611) or (612) is thought of as the amount of movement of the image-formation surface.

With regard to the tilt of the optical element, both the formulae hold if C in formulae (618) and (619) is replaced by −A.

The optical element to be decentered includes, in addition to lenses, optical elements such as mirrors, and prisms. Moreover, it is acceptable to decenter optical surfaces.

It is here understood that the aforesaid formulae (599), (600), (601)–(603) and (613)–(617) go true for optical systems using invariable-shape mirrors in place of the variable mirror.

By complying with those formulae, optical systems having improved performance can be obtained with effects depending thereon. Other formulae may be applied to these optical systems without a hitch. For instance, when there is a fluctuation of the image-formation surface with optical system fabrication variations, regulation may be made by tilting the image pickup surface of an image pickup device with the application of formulae (604)–(612) in extended forms. More preferably, two or more of the aforesaid formulae should be met.

Here let Q (in °) represent the amount of tilt (rotation) decentration of the image pickup device, display device, optical element or optical surface. Then, it is preferable to comply with $$0 \leq |Q| < 15 \tag{619-2}$$

Exceeding the upper limit of 15° to Q is not preferred because the shading of an image becomes worse or higher-order decentration aberrations occur. If $$0 \leq |Q| < 7.5 \tag{619-3}$$

not only is the shading of an image improved but also higher-order decentration aberrations are reduced. More preferably, $$0 \leq |Q| < 3 \tag{619-4}$$

It is noted that Q represents the amount of tilt decentration of the image pickup device or the like upon tilt decentration about the axis of rotation defined by a straight line vertical to the Z-axis.

Whenever possible, the aforesaid embodiments (1) to (99) may be applied to optical systems using ordinary mirrors. More improved optical systems and image pickup apparatus are then achievable.

The arguments so far stated regarding the variable mirror hold for the cases where variable-focus lenses are used in a decentrated state. That is, even when the aberrations of an optical system vary with changes in the focal length or aberrations of a variable-focus lens, it is possible to compensate for aberrations by the decentration of an image pickup device, optical element or display device. Further, the image pickup device, optical element or display device may be not only decentered but also moved. Furthermore, the image pickup device, optical element and display device may be decentered in combination of two or more. This is more favorable because the degree of freedom in the compensation of aberrations is increased.

Here the terms used herein are collectively explained.

The optical element having variable optical properties is understood to refer to a variable mirror, a variable-focus lens, a variable prism or the like.

The image pickup surface of an image pickup device, the display surface of a display device, a screen, the field stop of a finder, the field stop of a viewing device or the like are collectively referred to as an image plane. The image plane is here defined as an image input/output plane.

EMBODIMENTS OF THE INVENTION

Given below are the embodiments of the invention. Constituting parameters of each embodiment will be given later.

In each embodiment, the Z-axis of a coordinate system with respect to an object plane is defined by a direction coming out of the center of an object and vertical to the object plane. A direction orthogonal with respect to the Z-axis is defined as the Y-axis, and an axis that forms a right-handed orthogonal coordinate system with the Y-axis and Z-axis is defined as the X-axis.

In the following embodiments, each optical surface is decentered in the Y-Z plane, and only one symmetric plane for each rotationally asymmetric free-form surface is defined as the Y-Z plane.

Upon decentration in Embodiments 1–3 and 6–10, the origin of the coordinate system is defined as a point that is moved from the apex position of a k−1 surface by a surface spacing in the Z-axis direction, where k is the optical surface to be decentered (hereinafter called the decentration surface).

The decentration surface is given by a shift of the apex position thereof from the origin of the coordinate system (X, Y and Z represent the X-axis, Y-axis and Z-axis directions, respectively) and tilts of the center axis thereof (the Z-axis of the aforesaid formula (a) for a free-form surface) with respect to the X-axis, Y-axis and Z-axis, respectively, (α, β, γ (°)). In that case, the positive sign for α and β means counterclockwise rotation with respect to the positive direction of the respective axes and the positive sing for γ means clockwise rotation with respect to the positive direction of the Z-axis.

Decentration is represented in the order of X shift, Y shift, Z shift, α tilt, β tilt and γ tilt.

In the following Embodiments 1–3 and 6–10, decentration takes place by way of detentering-and-returning. That is, when the k surface is already in a decentered state, the apex position of the k+1 surface is defined as a point that is moved from the apex position of the k surface before decentration by the surface spacing in the Z-axis direction.

The coordinate system of the optical system after reflection of light rays at the reflecting surface of the variable mirror is defined as the coordinate system before reflection, which is rotated by 2α+180°, where α is the angle of rotation of the reflecting surface. By this definition, light rays propagate along the Z-axis positive direction of the optical system.

Upon decentration in Embodiments 4 and 5, the origin of the coordinate system is defined as the apex position of the first surface of the optical system (a cover glass or the entrance side-surface of the concave lens).

As in other embodiments, the decentration surface is given by a shift of the apex position thereof from the origin of the coordinate system (X, Y and Z represent the X-axis, Y-axis and Z-axis directions, respectively) and tilts of the center axis thereof (the Z-axis of the aforesaid formula (a) for a free-form surface) with respect to the X-axis, Y-axis and Z-axis, respectively, (α, β, γ (°)). In that case, the positive sign for α and β means counterclockwise rotation with respect to the positive direction of the respective axes and the positive sing for γ means clockwise rotation with respect to the positive direction of the Z-axis.

Decentration is represented in the order of X shift, Y shift, Z shift, α tilt, β tilt and γ tilt. Apart from Embodiments 4 and 5, the focal length is defined as follows.

The focal length f is the focal length of the optical system except the variable mirror.

Embodiments 1, 2 and 3 are each directed to an image pickup optical system comprising a combined rotationally symmetric lens and variable mirror and used for an image pickup device or the like built in digital cameras, TV cameras, and cellular phone.

Embodiment 1

Figure 45:
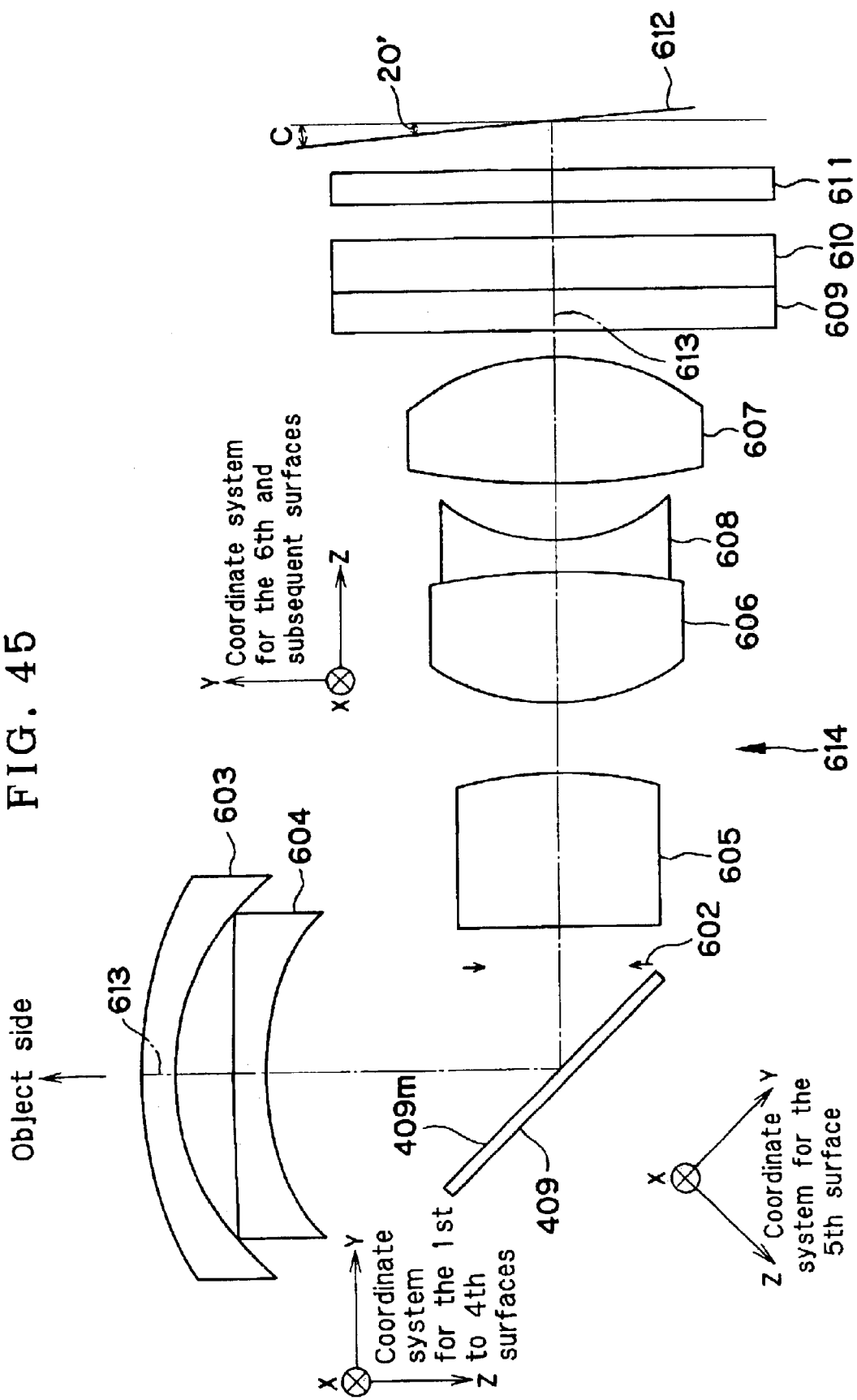
FIG. 45 is a Y-Z sectional view for Example 1 of the optical system.

This embodiment is directed to an image pickup optical system 614 in which the optical system of FIG. 39 is used, as shown in the Y-Z sectional view of FIG. 45. As shown in FIG. 45, the respective optical elements are located in order from the object side of the optical system. The first two elements are negative meniscus lenses 603 and 604, each convex on its object side, in the rear of which there is located a variable mirror 409. In the rear of the variable mirror 409, there are located a stop 602, then a double-convex positive lens 605 having an aspheric surface on its image side, then a doublet consisting of a double-convex positive lens 606 and a double-concave negative lens 608, and finally a double-convex positive lens 607 having an aspheric surface on its image side. In the rear of the positive lens 607, there are located a low-pass filter 609, then an infrared cut filter 610, and finally a cover glass 611, in the rear of which there is located an image pickup surface 612 of a solid-state image pickup device, which is tilted at an angle C of tilt (=20') with respect to a plane vertical to an optical axis 613 at an object distance of ∞. In the aforesaid image pickup optical system 614, lens systems comprising those lenses are generally of the retrofocus type. The reflecting surface 409m of the variable mirror 409 is configured in such a way as to be of plane shape at an object distance ∞because of being controlled, and turn to a free-form surface of strong concavity as the object distance becomes short. So long as the reflecting surface 409m of the variable mirror 409 is in a plane form at the object distance ∞, the image pickup optical system 614 takes the form of a non-decentration system. By tilting the image pickup surface 612 of the image pickup device with respect to the optical axis in this way, it is possible to slack aberration fluctuations due to changes in the focal length of the lens system caused by changes in the shape of the reflecting surface 409m of the variable mirror 409.

In this embodiment, the optical path is bent on the long side in the Y direction, and the dimensions of the image pickup surface 612 are 2.662 mm in the X direction and 3.552 mm in the Y direction with pixel dimensions of $P_x=P_y=2.2\,\mu m$. The numerical data (constituting parameters) given later include data on a far point of the object distance OD=1,000 cm and a near point of OD=20 cm.

In FIG. 45, the coordinate systems rotated according to the aforesaid definitions are shown.

Embodiment 2

This embodiment is the same in lens arrangement as Embodiment 1. As shown in the Y-Z sectional view of FIG. 46, the respective optical elements are located in order from the object side of the optical system. The first two elements are negative meniscus lenses 603 and 604, each convex on its object side, in the rear of which there is located a variable mirror 409. In the rear of the variable mirror 409, there are located a stop 602, then a double-convex positive lens 605, then a doublet consisting of a double-convex positive lens 606 and a double-concave negative lens 608, and finally a double-convex positive lens 607. In the rear of the positive lens 607, there are located a low-pass filter 609, then an infrared cut filter 610, and finally a cover glass 611, in the rear of which there is located an image pickup surface 612 of a solid-state image pickup device, which is tilted at an angle C of tilt with respect to a plane vertical to an optical axis 613 at an object distance ∞. In the aforesaid image pickup optical system, lens systems comprising those lenses are generally of the retrofocus type. The reflecting surface 409m of the variable mirror 409 is configured in such a way as to be of plane shape at an object distance ∞ because of being controlled, and turn to a free-form surface of strong concavity as the object distance becomes short. So long as the reflecting surface 409m of the variable mirror 409 is in a plane form at the object distance ∞, the image pickup optical system takes the form of a non-decentration system. By tilting the image pickup surface 612 of the image pickup device with respect to the optical axis in this way, it is again possible to slack aberration fluctuations due to changes in the focal length of the lens system caused by changes in the shape of the reflecting surface 409m of the variable mirror 409.

In this embodiment, the optical path is bent on the short side in the X direction, and the dimensions of the image pickup surface 612 are 4.516 mm in the X direction and 3.387 mm in the Y direction with pixel dimensions of $P_x=P_y=2.8$ μm. The numerical data (constituting parameters) given later include data on a far point of the object distance OD=1,000 cm and a near point of OD=20 cm.

The coordinate systems of this embodiment rotated according to the aforesaid definitions are not shown because of being the same as those in FIG. 45.

Embodiment 3

Figure 47:
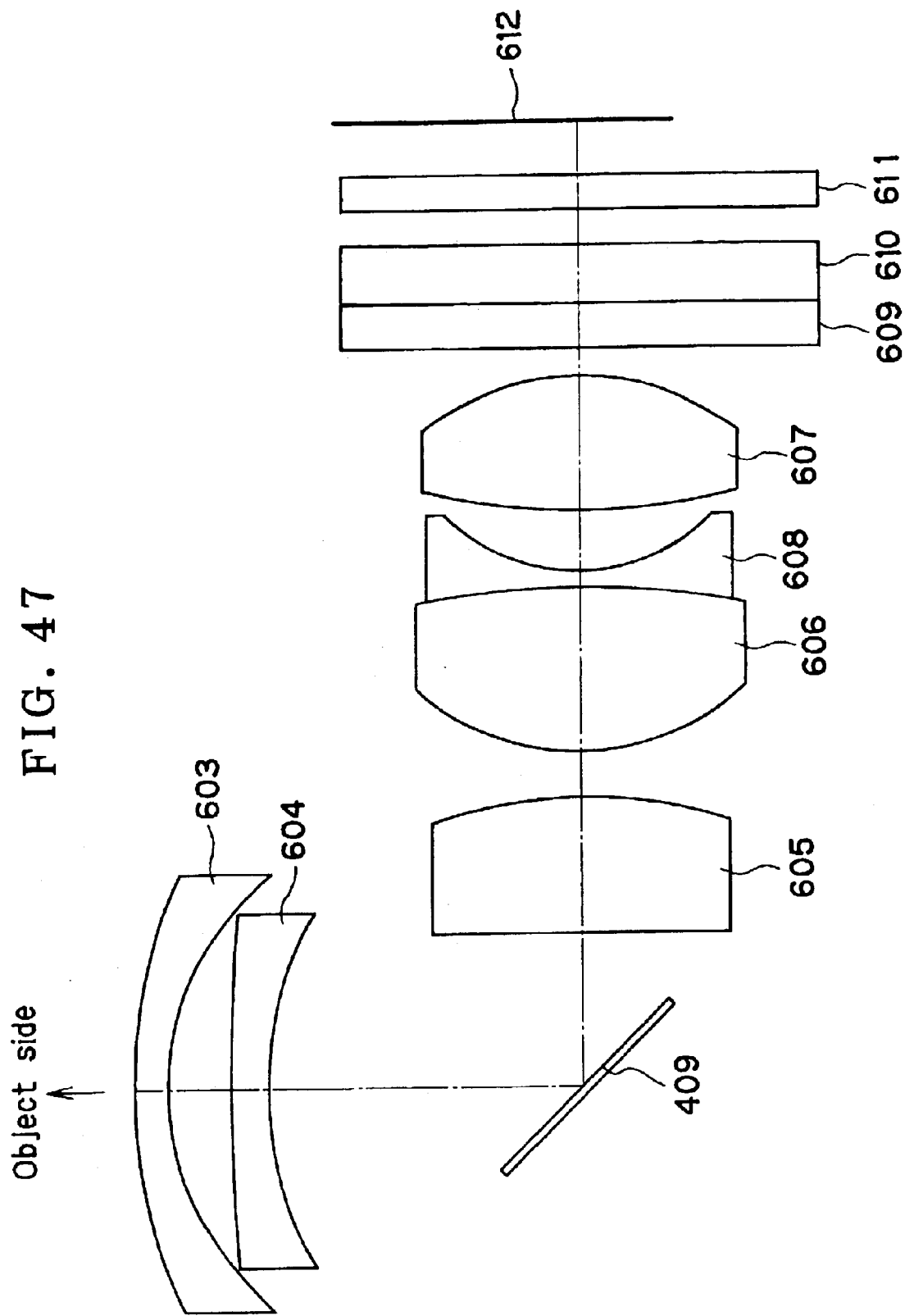
FIG. 47 is a Y-Z sectional view for Example 3 of the optical system.

The image pickup optical system of this embodiment is much the same in lens arrangement as that of Embodiment 1. As shown in the Y-Z sectional view of FIG. 47, in order from the object side of the image pickup optical system there are located a negative meniscus lenses 603 and 604, each convex on its object side. In the rear of the lens 604, there is located a variable mirror 409 that also serves as an aperture stop. In the rear of the variable mirror 409, there are located a positive meniscus lens 605 convex on its image plane side, then a doublet consisting of a double-convex positive lens 606 and a double-concave negative lens 608 and finally a double-convex positive lens 607. In the rear of the lens 607, there are located a low-pass filter 609, then an infrared cut filter 610 and finally a cover glass 611. In the rear of the cover glass 611, there is located an image pickup surface 612 of a solid-state image pickup device. In the image pickup optical system, lens systems comprising those lenses are generally of the retrofocus type. The reflecting surface of the variable mirror 409 is configured in such a way as to be of plane shape at an object distance because of being controlled, and turn to a free-form surface of strong concavity as the object distance becomes short. So long as the reflecting surface of the variable mirror 409 is in a plane form at the object distance ∞, the image pickup optical system takes the form of a non-decentration system.

In this embodiment, the optical path is bent on the long side, and the dimensions of the image pickup surface 612 are 2.662 mm in the X direction and 3.55 mm in the Y direction with pixel dimensions of $P_x=P_y=2.2$ μm. The numerical data (constituting parameters) given later include data on a far point of the object distance OD=1,000 cm and a near point of OD=20 cm.

The coordinate systems of this embodiment rotated according to the aforesaid definitions are not shown because of being the same as those in FIG. 45.

In Embodiments 1, 2 and 3, the variable mirror 409 is fixed at the periphery of the transforming reflecting surface, and the middle portion of the reflecting surface is transformed.

Embodiments 4 and 5 are each directed to a combination of a prism having a free-form surface with a variable mirror. As in Embodiments 1, 2 and 3, this combination is used for optical systems built in image pickup systems for digital cameras, TV cameras, cellular phones, etc.

Embodiment 4

Figure 48:
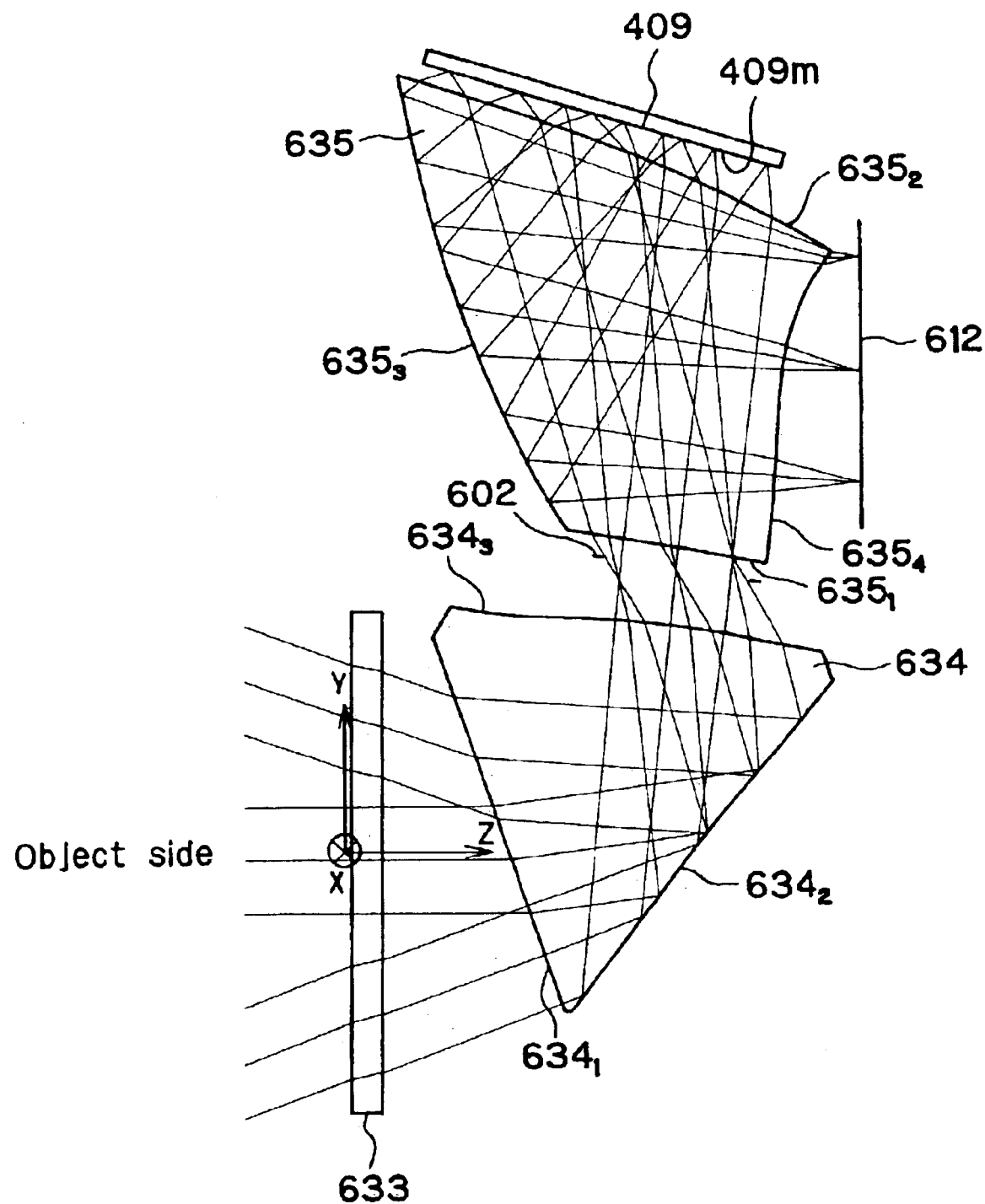
FIG. 48 is a Y-Z sectional view for Example 4 of the optical system.

As shown in the Y-Z sectional view of FIG. 48, this embodiment is directed to an image pickup optical system made up of, in order from its object side, a cover glass 633 formed of a plane-parallel plate, a first prism 634, an aperture stop 602, a second prism 635, a variable-shape mirror 409 and an image pickup surface 612 of a solid-state image pickup device. The first prism 634 is made up of a first surface $634_1$ that is an entrance surface for object light passing through the cover glass 633, a second surface $634_2$ that is a reflecting surface for reflecting the light entered in the prism via the first surface $634_1$ and a third surface $634_3$ that is an exit surface through which the light reflected at the second surface $634_2$ leaves the prism. The second prism 635 is composed of a first surface $635_1$ that is an entrance surface for the light emerging from the first prism 634 and passing through the aperture stop 602, a second surface $635_2$ that once allows the light entered in the prism via the first surface $635_1$ to leave the prism and then permits the emergent light to be reflected at the variable-shape mirror 409 so that the reflected light is again entered in the second prism 635, a third surface $635_3$ that is a reflecting surface for reflecting the light reentered in the prism via the second surface $635_2$ and a fourth surface $635_4$ that is an exit surface through which the light reflected at the third surface $635_3$ leaves the prism. Upon leaving the fourth surface $635_4$, the object light forms an image on the image pickup surface 612.

The first $634_1$, second $634_2$ and third surface $634_3$ of the first prism 634 and the first $635_1$, second $635_2$, third $635_3$ and fourth surface $635_4$ of the second prism 635 are all formed of free-form surfaces, and the reflecting surface 409m of the variable-shape mirror 409 is configured in such a way as to be of plane shape at an object distance ∞ because of being controlled, and turn to a free-form surface of strong concavity as the object distance becomes short.

FIG. 48 also shows a coordinate system for determining the decentration position of each surface and its origin that is the apex position of the entrance (front) surface of the cover glass 633, where it intersects the optical axis.

In Embodiment 4, M1 in formulae (616) and (617) is the length, as calculated on an air basis, of the optical path between the front surface of the cover glass 633 and the point of intersection of the reflecting or second surface $634_2$ with the optical axis. In other embodiments where the first reflecting surface is not composed of a variable mirror, too, M1 is defined as the length, as calculated on an air basis, of the optical path between the point of intersection of the reflecting surface, at which the light entered in the optical system is first reflected, with the optical axis and the first surface of the optical system.

Embodiment 5

Figure 49:
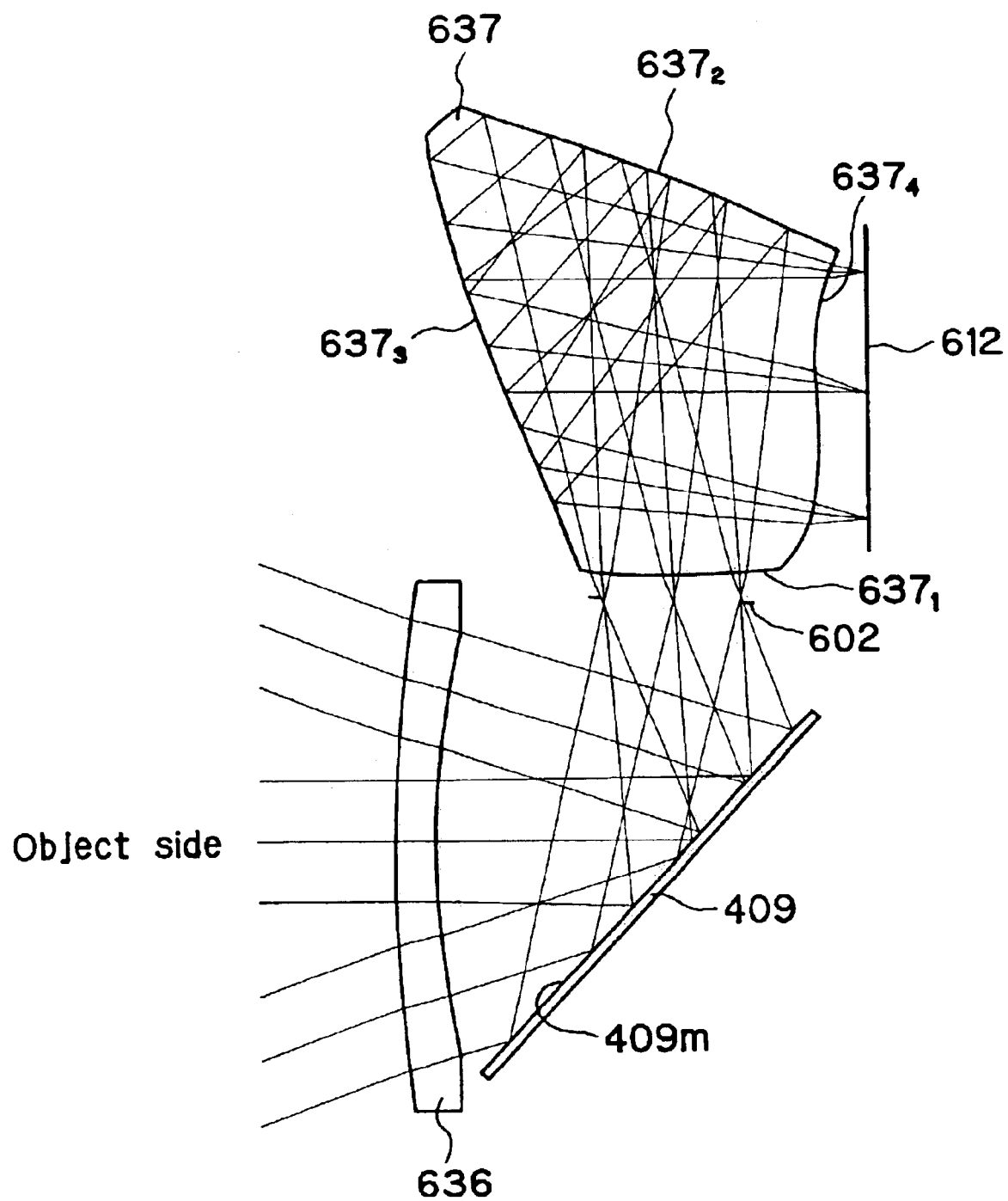
FIG. 49 is a Y-Z sectional view for Example 5 of the optical system.

As shown in the Y-Z sectional view of FIG. 49, this embodiment is directed to an image pickup optical system made up of, in order from its object side, a negative meniscus lens 636 convex on its object side and having an aspheric surface on its object side, a variable-shape mirror 409, an aperture stop 602, a prism 637 and an image pickup surface 612 of a solid-state image pickup device. The prism 637 is composed of a first surface $637_1$ that is an entrance surface for the light passing through the negative meniscus lens 636 and then through the aperture stop 602, a second surface $637_2$ that is a first reflecting surface for reflecting the light entered in the prism via the first surface $637_1$, a third surface $637_3$ that is a second reflecting surface for reflecting the light reflected at the second surface $637_2$ and a fourth surface $637_4$ that is an exit surface through which the light reflected at the third surface $637_3$ leaves the prism. Upon leaving the fourth surface $637_4$, the object light forms an image on the image pickup surface 612.

The first $637_1$, second $637_2$, third $637_3$ and fourth surface $637_4$ of the prism 637 are each composed of a free-form surface, and the reflecting surface 409m of the variable-shape mirror 409 is configured in such a way as to be of plane shape at an object distance ∞ because of being controlled, and turn to a free-form surface of strong concavity as the object distance becomes short.

As in Embodiment 4, the origin of the coordinate system for determining the decentration position of each surface in this embodiment is the apex position of the entrance surface of the negative meniscus lens 636, at which it intersects the optical axis.

In both Embodiments 4 and 5, the reflecting surface 409m of the variable-shape mirror 409 is designed to have a focusing function. For focusing, usually, lenses are mechanically driven; in these embodiments, however, there is a merit that the lens barrel structure for holding the aforesaid lens system can be very simplified. Moreover, the reflecting surface of the variable-shape mirror is designed in such a way as to be of plane shape at the object distance ∞ and be transformed as the object distance comes close to the nearest point. However, it is acceptable to design that reflecting surface in such a way that it is of plane shape at the nearest point and at the object distance ∞ it is transformed to have optical power.

In both Embodiments 4 and 5, the image pickup surface has a size of 4.48 mm×3.36 mm and a horizontal angle of view of 51.0° and a vertical angle of view of 39.3° with an entrance pupil diameter of ϕ1.66 mm and an F-number of the order of 2.8.

In Embodiments 4 and 5, ΔM is defined as the smaller of $$\Delta M = h \cdot \tan|B_M - C| \text{ or } \Delta M = h \cdot \tan|B_m - C|$$

This definition of ΔM holds for other embodiments wherein the optical system has no rotationally symmetric lens group.

In Embodiments 4 and 5, f is the average of the focal length in the X direction (vertical to the symmetric surface and the focal length in the Y direction (within the symmetric surface) at the object distance ∞.

Embodiment 6

This embodiment is directed to an photo taking optical system exemplified by a 2:1 power zoom lens that is used with digital cameras, TV cameras, etc.

Figures 50A, 50B, 50C:
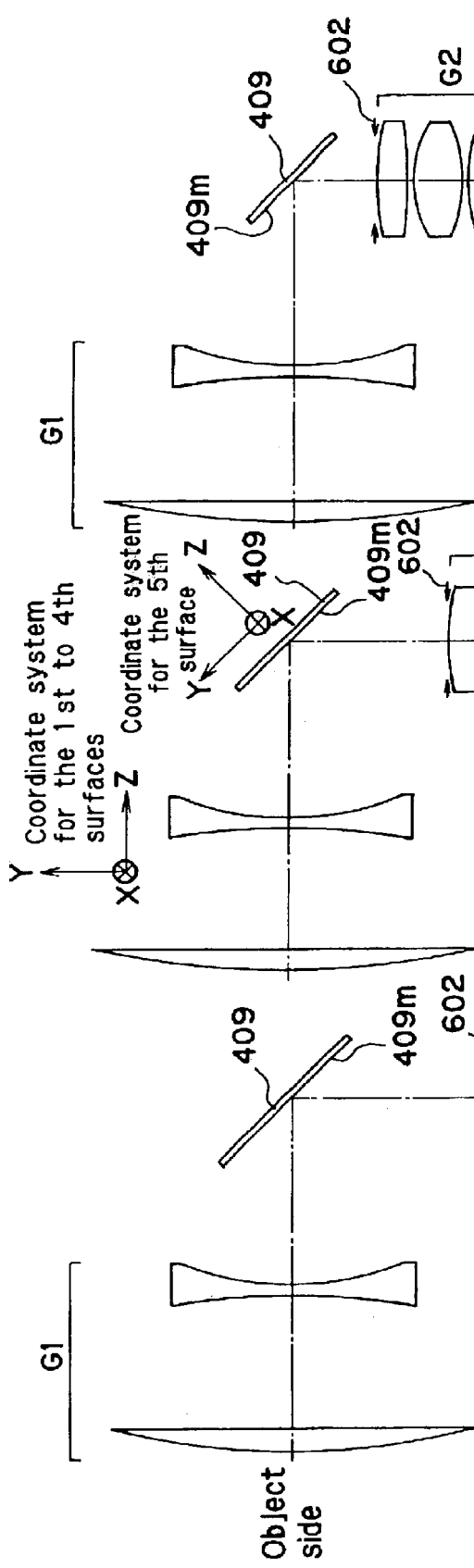
FIGS. 50(a), 50(b) and 50(c) are Y-Z sectional views for Example 6 at the wide-angle end, in the standard state and at the telephoto end, respectively, upon focused at infinity.

In this optical system, the respective optical elements are located as shown in the Y-Z sectional views of FIGS. 50(a), 50(b) and 50(c) that are illustrative of the optical system at the wide-angle end, in the standard state and at telephoto end upon focused at infinity. A first lens group G1 composed of a positive meniscus lens convex on its object side and a double-concave negative lens having an aspheric surface on its image side is fixed nearest to the object side of the optical system. In the rear of the first lens group G1 there is located a variable mirror 409, in the rear of which there are located a stop 602 and a second lens group G2 that is a moving group composed of a double-convex positive lens having an aspheric surface on its object side, a double-convex positive lens, a negative meniscus lens convex on its object side and a double-concave negative lens having an aspheric surface on its image side. In the rear of the moving group G2, there is located a fixed third lens group G3 composed of one double-convex positive lens having an aspheric surface on its image side. In the rear of the third lens group G3 there are provided filters 638 such as a low-pass filter and an infrared cut filter and a cover glass 611. In the rear of the cover glass 611, there is located an image pickup surface 612 of a solid-state image pickup device, which, as shown in FIG. 50(a), is set at an angle 23' of tilt (C=23') with respect to a plane vertical to the optical axis at an object distance ∞ and in the standard state.

In this embodiment, the reflecting surface 409m of the variable mirror 409 (the fifth surface in the numerical data enumerated later) is of concave or planar shape (in the standard state upon focused at infinity). The reflecting surface 409m of the variable mirror 409 is transformed with its center remaining fixed; however, it is acceptable to transform the middle portion of the reflecting surface while its periphery remains fixed. It is here noted that the optical axis is bent 90° at the point of intersection with the reflecting surface 409m of the variable mirror 409, and that the point of intersection of the optical axis with the reflecting surface 409m of the variable mirror 409 is the origin of the surface shape of the variable mirror 409.

FIG. 50(b) also shows the coordinate systems rotated according to the aforesaid definitions. In this regard, care must be taken of the fact that the first to fourth surfaces are different from the fifth, sixth and subsequent surfaces in terms of the direction of the coordinate axis.

For zooming according to this embodiment, the second lens group G2 moves together with the stop 602. To compensate for focus movement caused by this zooming and for focusing on object distance changes, the reflecting surface 409m of the variable mirror 409 is transformed. The 7th to 14th surfaces in the numerical data enumerated later form together the second lens group G2 that moves along the optical axis for zooming.

In this embodiment, the optical path is bent on the short side that is rather long in the X direction of the image pickup surface 612, and the dimension of the image pickup surface 612 is 4 mm in the X direction and 3 mm in the Y direction with a pixel size of $P_x = P_y = 2.5$ μm. The numerical data (constituting parameters) enumerated later include data at the wide-angle end WE, in the standard state ST and at the telephoto end TE as obtained at a far point where an object distance is OD=∞, and data in the standard state ST as obtained at a near point of OD=30 cm.

Embodiment 7

This embodiment is directed to an image pickup optical system exemplified by a 1.8:1 power zoom lens used with digital cameras, TV cameras, etc.

In this optical system, the respective optical elements are located as shown in the Y-Z sectional views of FIGS. 51(a), 51(b) and 51(c) that are illustrative of the optical system at the wide-angle end, in the standard state and at the telephoto end upon focused at infinity. A first lens group G1 composed of a positive meniscus lens convex on its object side and a double-concave negative lens having an aspheric surface on its image side is fixed nearest to the object side of the optical system. In the rear of the first lens group G1 there is located a variable mirror 409, in the rear of which there are a fixed second lens group G2 that is composed of one double-convex positive lens wherein its image side-surface serves as a stop, a third lens group G3 that is a moving group composed of one double-concave negative lens and a fixed fourth lens group G4 that is composed of a double-convex positive lens, a double-convex positive lens having an aspheric surface on its image side and a double-concave negative lens. In the rear of the fourth lens group G4, there are located filters 638 such as a low-pass filter and an infrared cut filter and a cover glass 611. In the rear of the cover glass 611, there is located an image pickup surface 612 of a solid-state image pickup device.

In this embodiment, the reflecting surface 409m of the variable mirror 409 (the fifth surface in the numerical data enumerated later) is transformed, thereby compensating for focus movement caused upon zooming movement of the third lens group G3 as well as focus movement in association with an object distance change.

In this embodiment, the reflecting surface 409m of the variable mirror 409 is of concave or planar shape (in the standard state upon focused at infinity). As in Embodiment 6, the reflecting surface 409m of the variable mirror 409 is transformed with its center remaining fixed; however, it is acceptable to transform the middle portion of the reflecting surface while its periphery remains fixed. It is here noted that the optical axis is bent 90° at the point of intersection with the reflecting surface 409m of the variable mirror 409, and that the point of intersection of the optical axis with the reflecting surface 409m of the variable mirror 409 is the origin of the surface shape of the variable mirror 409.

In the embodiment of FIGS. 51(a) to 51(c), too, the coordinate systems rotated according to the aforesaid definitions are given as in FIGS. 50(a) to 50(c).

If, as in this embodiment, the negative lens used as a part of the third lens group G3 is moved for zooming, there is then obtained a merit that larger zooming is achievable by a smaller amount of lens movement as compared with the case where positive lenses are moved for zooming.

In this embodiment, the optical path is bent on the short side that is rather long in the X direction of the image pickup surface 612, and the dimension of the image pickup surface 612 is 4 mm in the X direction and 3 mm in the Y direction with a pixel size of $P_x = P_y = 2.5$ μm. The numerical data (constituting parameters) enumerated later include data at the wide-angle end WE, in the standard state ST and at the telephoto end TE as obtained at a far point where an object distance is OD=∞.

Embodiment 8

This embodiment is directed to an optical system exemplified by an image pickup optical system using a variable mirror, which is used with a digital camera, as shown in the Y-Z sectional views of FIGS. 52(a), 52(b) and 52(c) at the wide-angle end, in the standard state and at the telephoto end, respectively, as viewed upon focused at infinity.

In this optical system, the respective optical elements are located in order from its object side. A first lens group G1 having negative power and composed of one double-concave negative lens having an aspheric surface on its image side is fixed nearest to the object side. In the rear of the lens group G1 there is located a variable mirror 409. In the rear of the mirror 409, there is located a fixed second lens group G2 having positive power and composed a negative meniscus lens convex on its object side and a positive meniscus lens convex on its object side. In the rear of the lens group G2 there is located a stop 602, in the rear of which there is located a moving third lens group G3 composed of a positive meniscus lens having an aspheric surface on its object side, a double-convex positive lens and a double-concave negative lens having an aspheric surface on its image side. In the rear of the lens group G3 there is fixed a fourth lens group G4 composed of a double-convex positive lens and a negative meniscus lens having an aspheric surface on its image side and convex on its image side. In the rear of the lens group G4 there are located filters 638 such as a low-pass filter and an infrared cut filter and a cover glass 611. In the rear of the cover glass 611 there is provided an image pickup surface 612 of a solid-state image pickup device. The third lens group G3 is a variator (zooming means) having positive power, which moves together with the stop 602 in a direction parallel with the Z-axis. The fourth lens group G4 has positive power.

In this embodiment, the third lens group G3 functions as a variator (zooming means) and the variable mirror 409 functions as a compensator (means for compensating for focus movement caused upon zooming) and serves to effect focusing upon an object distance change, so that the optical system is capable of zooming at a zoom ratio of 2.0.

In this embodiment, the F-number is in the range of 2.84 to 3.49, and the focal length is 4.2 mm at the wide-angle end, 6.3 mm in the standard state and 8.4 mm at the telephoto end. The diagonal angle of view is 61.53° at the wide-angle end, 43.29° in the standard state and 33.15° at the telephoto end with an image pickup surface size of 4.4 mm×3.3 mm. Other numerical data will be enumerated later.

In Embodiment 8, decentration is purposefully applied to the respective lenses in the first G1 and third lens group G3 as well as to the image pickup surface 612 of the solid-state image pickup device in the vertical direction to the Z-axis (as indicated by arrows in FIG. 52(a)), so that the first G1 and third lens group G3 move while the attitudes of the respective lenses forming them are kept intact. In addition, a given tilt is applied to the image pickup surface 612 of the solid-state image device. The reflecting surface of the variable mirror 409 is designed to turn to a free-form surface, thereby reducing decentration aberrations by reflection; nonetheless, some decentration aberrations remain. On these decentration aberrations such decentration of the lenses and tilt of the image pickup surface as mentioned above have an effective action.

It is here noted that the Z-axis positive direction of the coordinate system for the reflecting surface of the variable mirror 409 (see FIG. 50(b)) goes from the surface to the back surface of the paper. When that reflecting surface turns to the free-form surface with power components $C_4$ and $C_6$ (in the aforesaid formula (a)) being positive, it takes the form of a convex mirror. Conversely, when the power components $C_4$ and $C_6$ are negative, the reflecting surface takes the form of a concave mirror, i.e., a mirror having positive power.

Application of decentration in the directions indicated by arrows in FIG. 52(a) is effective for reducing trapezium distortion unique to a refracting optical system.

It is here desired to comply with the following formula (101) in a certain state:

$$0 \leq |\Delta|/f < 1 \tag{101}$$

Here Δ is the amount of decentration applied to each lens, and f is the focal length of the optical system.

By decentering the lens within the range defined by formula (101), aberrations such as trapezium distortion can effectively be reduced. As the upper limit of 0.2 is exceeded, the amount of decentration becomes too large and aberrations of rim rays become large, making well-balanced correction for aberrations difficult.

More preferably for correction of aberrations, the following formula (102) should be satisfied in a certain state:

$$0 \leq |\Delta|/f < 0.5 \tag{102}$$

Even more preferably, the following formula (102-2) should be satisfied in a certain state.

$$0 \leq |\Delta|/f < 0.2 \tag{102-2}$$

To say nothing of the lens, it is acceptable to decenter the optical element, optical surface, and solid-state image pickup device by Δ. Even for that case, formulae (101), (102) and (102-2) hold true.

It is also desired to satisfy the following formula (103) in a certain state:

$$0 \leq |\Psi| < 15 \tag{103}$$

Here $\Psi$ is the amount (°) of tilt applied to the lens, optical element, optical surface, and image pickup surface 612 of the solid-state image pickup device, and more exactly $\Psi$ is the amount (°) of tilt decentration applied with the axis of rotation defined by a straight line vertical to the Z-axis. This is for the reason explained with reference to FIG. 39 plus the following reason.

By decentering the lens, optical element, optical surface or image pickup device within the range defined by formula (103), aberrations inclusive of asymmetric components can effectively be reduced. As the upper limit of 15° is exceeded, the difference in the angle of tilt of a chief ray between both ends of the image plane becomes too large, resulting in changes in the brightness of the image pickup surface at both its ends due to shading (light-and-shade distortion, color variations), etc.

More preferably, the following formula (104) should be met in a certain state because the brightness of the image pickup surface can be kept substantially uniform.

$$0 \leq |\Psi| < 7.5 \tag{104}$$

Most preferably, $$0 \leq |\Psi| < 3 \tag{105}$$

Throughout the present invention, formulae (101) to (105) hold to ensure an optical system having much more improved performance.

Embodiment 9

This embodiment is directed to an optical system exemplified by a 1.4:1 power zoom image pickup optical system using a variable mirror, which is used with digital cameras, TV cameras or the like, as shown in the Y-Z sectional views of FIGS. 53(a), 53(b) and 53(c) at the wide-angle end, in the standard state and at the telephoto end upon focused at infinity.

In this optical system, the respective optical elements are put in order from its object side. A first lens group G1 having negative power and composed of a double-concave negative lens having an aspheric surface on its image side and a double-convex positive lens is fixed nearest to the object side of the optical system. In the rear of the lens group G1 there is located a variable mirror 409. In the rear of the variable mirror 409, there is located a fixed second lens group G2 having positive power and composed of one positive meniscus lens convex on its object side. In the rear of the lens group G2 there is located a stop 602, in the rear of which there is located a moving third lens group G3 that has positive power, is composed of a double-convex positive lens having an aspheric surface on its object side, a double-convex positive lens and a double-concave negative lens, and moves together with the stop 602. In the rear of the lens group G3, there is located a fixed fourth lens group G4 having positive power and composed of one double-convex positive lens having an aspheric surface on its image side. In the rear of the lens group G4 there are located filters 638 such as a low-pass filter and an infrared cut filter, and a cover glass 611, in the rear of which there is located an image pickup surface 612 of a solid-state image pickup device. This optical system is generally of the retrofocus type.

The third lens group G3 having positive power is a variator (zooming means) that moves along the optical axis (in the Z-axis direction) for zooming. The variable mirror 409 functions as a compensator and a focusing lens, and the reflecting surface of this variable mirror is transformed to compensate for a displacement of focus position upon zooming and a focus displacement in association with an object distance change. That reflecting surface is configured in such a way as to be of planar shape at an object distance oo and in the standard state, and turn to a free-form surface in otherwise states.

FIG. 53(a) also shows the coordinate systems rotated according to the foregoing definitions.

In this embodiment, the image pickup surface 612 of the solid-state image pickup device has a size of 4 mm×3 mm.

Embodiment 10

This embodiment is directed to an optical system exemplified by a 1.4:1 power zoom image pickup optical system using a variable mirror, which is used with digital cameras, TV cameras or the like, as shown in the Y-Z sectional views of FIGS. 54(a), 54(b) and 54(c) at the wide-angle end, in the standard state and at the telephoto end upon focused at infinity. This embodiment is the same as Embodiment 9 with the exception of the angle of incidence of axial light rays on the variable mirror 409, wherein the tilt, $\alpha$, around the X-axis is 40° (the tilt $\alpha$ around the X-axis in Embodiment 9 is 0°). Otherwise, this embodiment is the same as Embodiment 9.

With such an arrangement, it is possible to locate the optical system at substantially unavailable dead space, thereby reducing the size and weight of a camera for which that optical system is used.

Enumerated below are the constituting parameters of Embodiments 1 to 9. The symbols used hereinafter have the following meanings. "FFS" indicates a free-form surface, "ASS" an aspheric surface, "RE" a reflecting surface, and "DM" a variable mirror. Regarding decentration and surface spacing, "WE", "ST" and "TE" stand for the wide-angle end, the standard state and the telephoto end, respectively, and "OD" is an abbreviation of object distance. "$F_{NO}$" and "f" represent an F-number and a focal length, respectively, and "$2\omega$" indicates an angle of view. The refractive index and Abbe number are given on a d-line basis (of 587.56 nm), and the unit of radii of curvature, length or the like is mm.

Example 1

| Surface No. | Radius of curvature | Surface separation | Displacement and tilt | Refractive index | Abbe's No. |
|---|---|---|---|---|---|
| Object plane | ∞ | OD | | | |
| 1 | 8.5796 | 0.6288 | | 1.48749 | 70.23 |
| 2 | 4.8982 | 1.1476 | | | |
| 3 | 83.0956 | 0.6288 | | 1.48749 | 70.23 |
| 4 | 5.3732 | 5.6372 | | | |
| 5 | F F S① (DM) | 1.9870 | (1) | | |
| 6 | ∞ (Stop) | 0.7860 | | | |
| 7 | 424.0614 | 3.1156 | | 1.69350 | 53.20 |
| 8 | A S S① | 1.4249 | | | |
| 9 | 4.0221 | 2.6536 | | 1.61272 | 58.72 |
| 10 | −12.3981 | 0.5980 | | 1.80518 | 25.42 |
| 11 | 3.1643 | 1.1554 | | | |
| 12 | 13.7693 | 2.4759 | | 1.58913 | 61.28 |
| 13 | A S S② | 0.4505 | | | |
| 14 | ∞ | 0.7860 | | 1.51633 | 64.14 |
| 15 | ∞ | 1.0139 | | 1.54771 | 62.84 |
| 16 | ∞ | 0.6288 | | | |
| 17 | ∞ | 0.5895 | | 1.51633 | 64.14 |
| 18 | ∞ | 0.9039 | | | |

-continued

| | | |
|---|---|---|
| Image plane | ∞ | |

A S S ①

| | |
|---|---|
| R | −6.9345 |
| K | 0 |
| A | $5.0512 \times 10^{-4}$ |
| B | $2.3242 \times 10^{-5}$ |
| C | $8.5974 \times 10^{-7}$ |
| D | 0.0000 |

A S S ②

| | |
|---|---|
| R | −4.0663 |
| K | 0 |
| A | $3.2379 \times 10^{-3}$ |
| B | $-1.1957 \times 10^{-4}$ |
| C | $1.8730 \times 10^{-5}$ |
| D | $-1.7278 \times 10^{-6}$ |

F F S ①

OD: 10000 mm ∞ (Plane)
OD: 199 mm

| | | | | | |
|---|---|---|---|---|---|
| $C_4$ | $-3.9974 \times 10^{-4}$ | $C_6$ | $-2.4073 \times 10^{-4}$ | $C_8$ | $1.7387 \times 10^{-5}$ |
| $C_{10}$ | $-1.5820 \times 10^{-5}$ | $C_{11}$ | $-7.0840 \times 10^{-5}$ | $C_{13}$ | $-6.7258 \times 10^{-5}$ |
| $C_{15}$ | $-4.3771 \times 10^{-6}$ | $C_{17}$ | $3.3172 \times 10^{-5}$ | $C_{19}$ | $8.6220 \times 10^{-6}$ |
| $C_{21}$ | $1.2993 \times 10^{-6}$ | | | | |

Displacement and tilt(1)

OD: 10000 mm

| X | 0.00 | Y | 0.00 | Z | 0.00 |
|---|---|---|---|---|---|
| α | −45.00 | β | 0.00 | γ | 0.00 |

OD: 199 mm

| X | 0.00 | Y | −0.0025 | Z | 0.0025 |
|---|---|---|---|---|---|
| α | −45.00 | β | 0.00 | γ | 0.00 |

Example 2

| Surface No. | Radius of curvature | Surface separation | Displacement and tilt | Refractive index | Abbe's No. |
|---|---|---|---|---|---|
| Object plane | ∞ | OD | | | |
| 1 | 11.2997 | 0.8 | | 1.48749 | 70.23 |
| 2 | 5.8484 | 1.46 | | | |
| 3 | 40.6257 | 0.8 | | 1.48749 | 70.23 |
| 4 | 5.0467 | 4.172 | | | |
| 5 | F F S ① (DM) | 6.4280 | (1) | | |
| 6 | ∞ (Stop) | 0.1000 | | | |
| 7 | 402.0057 | 1.6027 | | 1.69350 | 53.20 |
| 8 | A S S ① | 2.7316 | | | |
| 9 | 5.0481 | 3.1457 | | 1.61272 | 58.72 |
| 10 | −21.2400 | 0.7162 | | 1.80518 | 25.42 |
| 11 | 4.1483 | 1.4700 | | | |
| 12 | 21.3595 | 3.1500 | | 1.58913 | 61.28 |
| 13 | A S S ② | 0.5731 | | | |
| 14 | ∞ | 1.0000 | | 1.51633 | 64.14 |
| 15 | ∞ | 1.2900 | | 1.54771 | 62.84 |
| 16 | ∞ | 0.8000 | | | |
| 17 | ∞ | 0.7500 | | 1.51633 | 64.14 |
| 18 | ∞ | 1.1500 | | | |
| Image plane | ∞ | | | | |

A S S ①

| | |
|---|---|
| R | −7.9125 |
| K | 0 |
| A | $2.4528 \times 10^{-4}$ |
| B | $6.9726 \times 10^{-6}$ |
| C | $1.5934 \times 10^{-7}$ |
| D | 0.0000 |

A S S ②

| | |
|---|---|
| R | −5.9487 |
| K | 0 |
| A | $1.5723 \times 10^{-3}$ |
| B | $-3.5870 \times 10^{-5}$ |
| C | $3.4713 \times 10^{-6}$ |
| D | $-1.9783 \times 10^{-7}$ |

F F S ①

OD: 10000 mm ∞ (Plane)
OD: 200 mm

| | | | | | |
|---|---|---|---|---|---|
| $C_4$ | $-5.7211 \times 10^{-4}$ | $C_6$ | $-3.8031 \times 10^{-4}$ | $C_8$ | $-1.4049 \times 10^{-4}$ |
| $C_{10}$ | $-4.4030 \times 10^{-6}$ | $C_{11}$ | $-3.8692 \times 10^{-5}$ | $C_{13}$ | $-6.4296 \times 10^{-6}$ |
| $C_{15}$ | $-7.4233 \times 10^{-6}$ | $C_{17}$ | $2.8434 \times 10^{-5}$ | $C_{19}$ | $6.4832 \times 10^{-6}$ |
| $C_{21}$ | $7.6062 \times 10^{-7}$ | | | | |

Displacement and tilt(1)

OD: 10000 mm

| X | 0.00 | Y | 0.00 | Z | 0.00 |
|---|---|---|---|---|---|
| α | −45.00 | β | 0.00 | γ | 0.00 |

OD: 200 mm

| X | 0.00 | Y | −0.0045 | Z | 0.0045 |
|---|---|---|---|---|---|
| α | −45.00 | β | 0.00 | γ | 0.00 |

Example 3

| Surface No. | Radius of curvature | Surface separation | Displacement and tilt | Refractive index | Abbe's No. |
|---|---|---|---|---|---|
| Object plane | ∞ | OD | | | |
| 1 | 9.5643 | 0.6288 | | 1.48749 | 70.23 |
| 2 | 4.9813 | 1.1476 | | | |
| 3 | 53.0339 | 0.6288 | | 1.48749 | 70.23 |
| 4 | 6.0601 | 5.6372 | | | |
| 5 | F F S ① (DM) | 0.0000 | (1) | | |
| 6 | ∞ (Stop) | 2.7730 | | | |
| 7 | −3898.0721 | 2.6174 | | 1.69350 | 53.20 |
| 8 | A S S ① | 0.8296 | | | |
| 9 | 4.3002 | 3.1278 | | 1.61272 | 58.72 |
| 10 | −13.4612 | 0.2900 | | 1.80518 | 25.42 |
| 11 | 3.3407 | 1.1554 | | | |
| 12 | 10.9559 | 2.4759 | | 1.58913 | 61.28 |
| 13 | A S S ② | 0.4505 | | | |
| 14 | ∞ | 0.7860 | | 1.51633 | 64.14 |
| 15 | ∞ | 1.0139 | | 1.54771 | 62.84 |
| 16 | ∞ | 0.6288 | | | |
| 17 | ∞ | 0.5895 | | 1.51633 | 64.14 |
| 18 | ∞ | 0.9039 | | | |
| Image plane | ∞ | | | | |

A S S ①

| | |
|---|---|
| R | −7.1262 |
| K | 0 |
| A | $5.0512 \times 10^{-4}$ |
| B | $2.3242 \times 10^{-5}$ |
| C | $8.5974 \times 10^{-7}$ |
| D | 0.0000 |

A S S ②

| | |
|---|---|
| R | −4.0552 |
| K | 0 |
| A | $3.2379 \times 10^{-3}$ |
| B | $-1.1957 \times 10^{-4}$ |
| C | $1.8730 \times 10^{-5}$ |
| D | $-1.7278 \times 10^{-6}$ |

F F S ①

OD: 10000 mm ∞ (Plane)
OD: 199 mm

-continued

| | | | | | |
|---|---|---|---|---|---|
| $C_4$ | $-3.8173 \times 10^{-4}$ | $C_6$ | $-2.8779 \times 10^{-4}$ | $C_8$ | $1.1139 \times 10^{-5}$ |
| $C_{10}$ | $1.7792 \times 10^{-6}$ | $C_{11}$ | $-5.8183 \times 10^{-5}$ | $C_{13}$ | $-7.9933 \times 10^{-5}$ |
| $C_{15}$ | $1.1723 \times 10^{-5}$ | $C_{17}$ | $4.3409 \times 10^{-5}$ | $C_{19}$ | $4.4641 \times 10^{-6}$ |
| $C_{21}$ | $7.9419 \times 10^{-7}$ | | | | |

Displacement and tilt(1)

OD: 10000 mm

| X | 0.00 | Y | 0.00 | Z | 0.00 |
|---|---|---|---|---|---|
| α | −45.00 | β | 0.00 | γ | 0.00 |

OD: 199 mm

| X | 0.00 | Y | −0.0025 | Z | 0.0025 |
|---|---|---|---|---|---|
| α | −45.00 | β | 0.00 | γ | 0.00 |

Example 4

| Surface No. | Radius of curvature | Surface separation | Displacement and tilt | Refractive index | Abbe's No. |
|---|---|---|---|---|---|
| Object plane | ∞ | OD | | | |
| 1 | ∞ | | | 1.4950 | 65.0 |
| 2 | ∞ | | (1) | | |
| 3 | F F S① | | (2) | 1.5753 | 33.5 |
| 4 | F F S②(RE) | | (3) | 1.5753 | 33.5 |
| 5 | F F S③ | | (4) | | |
| 6 | ∞ (Stop) | | (5) | | |
| 7 | F F S④ | | (6) | 1.5254 | 55.8 |
| 8 | F F S⑤ | | (7) | | |
| 9 | F F S⑥ (DM) | | (8) | | |
| 10 | F F S⑤ | | (7) | 1.5254 | 55.8 |
| 11 | F F S⑦ (RE) | | (9) | 1.5254 | 55.8 |
| 12 | F F S⑧ | | (10) | | |
| Image plane | ∞ | | (11) | | |

F F S①

| $C_4$ | $-5.5517 \times 10^{-2}$ | $C_6$ | $2.0486 \times 10^{-3}$ | $C_8$ | $8.2810 \times 10^{-3}$ |
|---|---|---|---|---|---|
| $C_{10}$ | $-8.5302 \times 10^{-4}$ | $C_{11}$ | $-6.7010 \times 10^{-4}$ | $C_{13}$ | $-1.3461 \times 10^{-5}$ |
| $C_{15}$ | $-3.2629 \times 10^{-5}$ | | | | |

F F S②

| $C_4$ | $7.5064 \times 10^{-4}$ | $C_6$ | $4.7195 \times 10^{-3}$ | $C_8$ | $1.0011 \times 10^{-3}$ |
|---|---|---|---|---|---|
| $C_{10}$ | $2.0023 \times 10^{-4}$ | $C_{11}$ | $5.3288 \times 10^{-4}$ | $C_{13}$ | $2.4016 \times 10^{-4}$ |
| $C_{15}$ | $-3.3745 \times 10^{-6}$ | | | | |

F F S③

| $C_4$ | $-2.9178 \times 10^{-2}$ | $C_6$ | $-2.5537 \times 10^{-2}$ | $C_8$ | $-1.2147 \times 10^{-4}$ |
|---|---|---|---|---|---|
| $C_{10}$ | $-3.0816 \times 10^{-3}$ | $C_{11}$ | $-3.5993 \times 10^{-3}$ | $C_{13}$ | $-7.7931 \times 10^{-4}$ |
| $C_{15}$ | $1.8634 \times 10^{-3}$ | | | | |

F F S④

| $C_4$ | $4.1055 \times 10^{-2}$ | $C_6$ | $-1.6467 \times 10^{-3}$ | $C_8$ | $1.3429 \times 10^{-2}$ |
|---|---|---|---|---|---|
| $C_{10}$ | $-5.1910 \times 10^{-3}$ | $C_{11}$ | $-3.2802 \times 10^{-3}$ | $C_{13}$ | $-4.5662 \times 10^{-4}$ |
| $C_{15}$ | $2.5734 \times 10^{-3}$ | | | | |

F F S⑤

| $C_4$ | $4.4810 \times 10^{-2}$ | $C_6$ | $1.9137 \times 10^{-2}$ | $C_8$ | $4.6577 \times 10^{-3}$ |
|---|---|---|---|---|---|
| $C_{10}$ | $6.0341 \times 10^{-4}$ | $C_{11}$ | $-2.4116 \times 10^{-3}$ | $C_{13}$ | $-8.9014 \times 10^{-4}$ |
| $C_{15}$ | $-1.8792 \times 10^{-4}$ | | | | |

F F S⑥

OD: ∞

∞ (Plane)

OD: 300 mm

| $C_4$ | $0.2436 \times 10^{-3}$ | $C_6$ | $-0.2417 \times 10^{-3}$ | $C_8$ | $0.3852 \times 10^{-4}$ |
|---|---|---|---|---|---|
| $C_{10}$ | $0.2104 \times 10^{-4}$ | $C_{11}$ | $0.3557 \times 10^{-4}$ | $C_{13}$ | $0.4883 \times 10^{-4}$ |
| $C_{15}$ | $0.8406 \times 10^{-4}$ | | | | |

OD: 100 mm

| $C_4$ | $0.1544 \times 10^{-2}$ | $C_6$ | $0.2309 \times 10^{-3}$ | $C_8$ | $-0.5617 \times 10^{-4}$ |
|---|---|---|---|---|---|
| $C_{10}$ | $0.7945 \times 10^{-4}$ | $C_{11}$ | $0.6287 \times 10^{-5}$ | $C_{13}$ | $0.4663 \times 10^{-4}$ |
| $C_{15}$ | $0.1610 \times 10^{-3}$ | | | | |

-continued

F F S⑦

| $C_4$ | $4.7561 \times 10^{-3}$ | $C_6$ | $2.4333 \times 10^{-2}$ | $C_8$ | $1.4691 \times 10^{-4}$ |
|---|---|---|---|---|---|
| $C_{10}$ | $-2.3047 \times 10^{-4}$ | $C_{11}$ | $3.0443 \times 10^{-4}$ | $C_{13}$ | $4.4181 \times 10^{-4}$ |
| $C_{15}$ | $6.3190 \times 10^{-5}$ | | | | |

F F S⑧

| $C_4$ | $7.6293 \times 10^{-2}$ | $C_6$ | $8.4242 \times 10^{-2}$ | $C_8$ | $-1.6163 \times 10^{-3}$ |
|---|---|---|---|---|---|
| $C_{10}$ | $2.1965 \times 10^{-2}$ | $C_{11}$ | $-1.0794 \times 10^{-2}$ | $C_{13}$ | $1.0773 \times 10^{-2}$ |
| $C_{15}$ | $1.5515 \times 10^{-3}$ | | | | |

Displacement and tilt(1)

| X | 0.00 | Y | 0.00 | Z | 0.50 |
|---|---|---|---|---|---|
| α | 0.00 | β | 0.00 | γ | 0.00 |

Displacement and tilt(2)

| X | 0.00 | Y | 0.00 | Z | 2.50 |
|---|---|---|---|---|---|
| α | 18.90 | β | 0.00 | γ | 0.00 |

Displacement and tilt(3)

| X | 0.00 | Y | 0.37 | Z | 5.53 |
|---|---|---|---|---|---|
| α | −39.12 | β | 0.00 | γ | 0.00 |

Displacement and tilt(4)

| X | 0.00 | Y | 3.54 | Z | 5.27 |
|---|---|---|---|---|---|
| α | 81.85 | β | 0.00 | γ | 0.00 |

Displacement and tilt(5)

| X | 0.00 | Y | 4.47 | Z | 5.06 |
|---|---|---|---|---|---|
| α | 80.38 | β | 0.00 | γ | 0.00 |

Displacement and tilt(6)

| X | 0.00 | Y | 4.80 | Z | 4.99 |
|---|---|---|---|---|---|
| α | 79.47 | β | 0.00 | γ | 0.00 |

Displacement and tilt(7)

| X | 0.00 | Y | 10.81 | Z | 4.54 |
|---|---|---|---|---|---|
| α | −112.18 | β | 0.00 | γ | 0.00 |

Displacement and tilt(8)

| X | 0.00 | Y | 11.32 | Z | 4.35 |
|---|---|---|---|---|---|
| α | −106.68 | β | 0.00 | γ | 0.00 |

Displacement and tilt(9)

| X | 0.00 | Y | 8.57 | Z | 1.75 |
|---|---|---|---|---|---|
| α | 19.23 | β | 0.00 | γ | 0.00 |

Displacement and tilt(10)

| X | 0.00 | Y | 7.71 | Z | 6.78 |
|---|---|---|---|---|---|
| α | −11.18 | β | 0.00 | γ | 0.00 |

Displacement and tilt(11)

| X | 0.00 | Y | 7.53 | Z | 7.93 |
|---|---|---|---|---|---|
| α | 0.00 | β | 0.00 | γ | 0.00 |

Example 5

| Surface No. | Radius of curvature | Surface separation | Displacement and tilt | Refractive index | Abbe's No. |
|---|---|---|---|---|---|
| Object plane | ∞ | OD | | | |
| 1 | A S S① | | (1) | 1.4950 | 65.0 |
| 2 | 11.80 | | (1) | | |
| 3 | F F S① (DM) | | (2) | | |
| 4 | ∞ (Stop) | | (3) | | |
| 5 | F F S② | | (4) | 1.5254 | 55.8 |
| 6 | F F S③ (RE) | | (5) | 1.5254 | 55.8 |
| 7 | F F S④ (RE) | | (6) | 1.5254 | 55.8 |
| 8 | F F S⑤ | | (7) | | |
| Image plane | ∞ | | (8) | | |

-continued

A S S ①

| | |
|---|---|
| R | 22.00 |
| K | 0.0000 |
| A | $-2.4210 \times 10^{-5}$ |
| B | $-9.9065 \times 10^{-6}$ |
| C | $1.1124 \times 10^{-6}$ |
| D | $-3.1030 \times 10^{-8}$ |

F F S ①

OD: ∞ ∞ (Plane)

OD: 300 mm

| | | | | | |
|---|---|---|---|---|---|
| $C_4$ | $-0.1081 \times 10^{-2}$ | $C_6$ | $-0.5802 \times 10^{-3}$ | $C_8$ | $0.3173 \times 10^{-4}$ |
| $C_{10}$ | $0.1772 \times 10^{-4}$ | $C_{11}$ | $0.5494 \times 10^{-4}$ | $C_{13}$ | $0.1430 \times 10^{-4}$ |
| $C_{15}$ | $0.1663 \times 10^{-4}$ | | | | |

OD: 100 mm

| | | | | | |
|---|---|---|---|---|---|
| $C_4$ | $-0.2773 \times 10^{-2}$ | $C_6$ | $-0.1542 \times 10^{-2}$ | $C_8$ | $-0.2874 \times 10^{-4}$ |
| $C_{10}$ | $-0.2977 \times 10^{-4}$ | $C_{11}$ | $0.6391 \times 10^{-4}$ | $C_{13}$ | $0.2256 \times 10^{-4}$ |
| $C_{15}$ | $0.1430 \times 10^{-4}$ | | | | |

F F S ②

| | | | | | |
|---|---|---|---|---|---|
| $C_4$ | $6.1295 \times 10^{-2}$ | $C_6$ | $3.9654 \times 10^{-2}$ | $C_8$ | $1.0685 \times 10^{-3}$ |
| $C_{10}$ | $4.1023 \times 10^{-3}$ | $C_{11}$ | $6.2844 \times 10^{-4}$ | $C_{13}$ | $1.6803 \times 10^{-4}$ |
| $C_{15}$ | $-5.3019 \times 10^{-5}$ | | | | |

F F S ③

| | | | | | |
|---|---|---|---|---|---|
| $C_4$ | $1.2426 \times 10^{-2}$ | $C_6$ | $1.5190 \times 10^{-2}$ | $C_8$ | $6.4772 \times 10^{-4}$ |
| $C_{10}$ | $2.3776 \times 10^{-3}$ | $C_{11}$ | $-2.2208 \times 10^{-4}$ | $C_{13}$ | $-2.4289 \times 10^{-4}$ |
| $C_{15}$ | $-3.7480 \times 10^{-4}$ | | | | |

F F S ④

| | | | | | |
|---|---|---|---|---|---|
| $C_4$ | $1.8321 \times 10^{-2}$ | $C_6$ | $1.4688 \times 10^{-2}$ | $C_8$ | $4.6539 \times 10^{-4}$ |
| $C_{10}$ | $2.8609 \times 10^{-3}$ | $C_{11}$ | $-6.2302 \times 10^{-5}$ | $C_{13}$ | $4.6144 \times 10^{-5}$ |
| $C_{15}$ | $9.9163 \times 10^{-5}$ | | | | |

F F S ⑤

| | | | | | |
|---|---|---|---|---|---|
| $C_4$ | $-5.5356 \times 10^{-2}$ | $C_6$ | $4.0768 \times 10^{-2}$ | $C_8$ | $-5.9738 \times 10^{-3}$ |
| $C_{10}$ | $4.9578 \times 10^{-2}$ | $C_{11}$ | $-4.3522 \times 10^{-5}$ | $C_{13}$ | $7.9267 \times 10^{-3}$ |
| $C_{15}$ | $-1.4149 \times 10^{-3}$ | | | | |

Displacement and tilt(1)

| | | | | | |
|---|---|---|---|---|---|
| X | 0.00 | Y | 0.00 | Z | 0.54 |
| α | 0.00 | β | 0.00 | γ | 0.00 |

Displacement and tilt(2)

| | | | | | |
|---|---|---|---|---|---|
| X | 0.00 | Y | 0.00 | Z | 3.98 |
| α | -42.88 | β | 0.00 | γ | 0.00 |

Displacement and tilt(3)

| | | | | | |
|---|---|---|---|---|---|
| X | 0.00 | Y | 3.30 | Z | 3.74 |
| α | 87.76 | β | 0.00 | γ | 0.00 |

Displacement and tilt(4)

| | | | | | |
|---|---|---|---|---|---|
| X | 0.00 | Y | 3.61 | Z | 3.71 |
| α | 90.66 | β | 0.00 | γ | 0.00 |

Displacement and tilt(5)

| | | | | | |
|---|---|---|---|---|---|
| X | 0.00 | Y | 9.08 | Z | 3.43 |
| α | -109.68 | β | 0.00 | γ | 0.00 |

Displacement and tilt(6)

| | | | | | |
|---|---|---|---|---|---|
| X | 0.00 | Y | 6.71 | Z | 1.27 |
| α | 20.60 | β | 0.00 | γ | 0.00 |

Displacement and tilt(7)

| | | | | | |
|---|---|---|---|---|---|
| X | 0.00 | Y | 6.21 | Z | 5.72 |
| α | 2.21 | β | 0.00 | γ | 0.00 |

Displacement and tilt(8)

| | | | | | |
|---|---|---|---|---|---|
| X | 0.00 | Y | 6.08 | Z | 6.42 |
| α | 0.00 | β | 0.00 | γ | 0.00 |

Example 6

Dis-

-continued

| Surface No. | Radius of curvature | Surface separation | placement and tilt | Refractive index | Abbe's No. |
|---|---|---|---|---|---|
| Object plane | ∞ | OD | | | |
| 1 | 38.6526 | 1.0000 | | 1.78472 | 25.68 |
| 2 | 461.7859 | 6.1659 | | | |
| 3 | -36.1451 | 0.5000 | | 1.88300 | 40.76 |
| 4 | A S S ① | 8.8769 | | | |
| 5 | F F S ① (DM) | d1 | (1) | | |
| 6 | ∞ (Stop) | 0.0027 | | | |
| 7 | A S S ② | 1.5000 | | 1.58913 | 61.14 |
| 8 | -34.1279 | 0.3000 | | | |
| 9 | 5.3258 | 2.3195 | | 1.49700 | 81.54 |
| 10 | -7.5448 | 0.3339 | | | |
| 11 | 8.8035 | 1.1293 | | 1.51633 | 64.14 |
| 12 | 6.4876 | 0.6000 | | | |
| 13 | -7.6045 | 0.4822 | | 1.78472 | 25.68 |
| 14 | A S S ③ | d2 | | | |
| 15 | 5.7683 | 2.0000 | | 1.58913 | 61.14 |
| 16 | A S S ④ | 0.6335 | | | |
| 17 | ∞ | 1.4400 | | 1.54771 | 62.84 |
| 18 | ∞ | 0.1000 | | | |
| 19 | ∞ | 0.6000 | | 1.51633 | 64.14 |
| 20 | ∞ | 0.1000 | | | |
| Image plane | ∞ | | | | |

A S S ①

| | |
|---|---|
| R | 11.4585 |
| K | 0 |
| A | $-3.9475 \times 10^{-4}$ |
| B | $1.8310 \times 10^{-5}$ |
| C | $-7.0474 \times 10^{-7}$ |
| D | $9.4977 \times 10^{-9}$ |

A S S ②

| | |
|---|---|
| R | 10.1952 |
| K | 0 |
| A | $-1.0958 \times 10^{-3}$ |
| B | $-2.7608 \times 10^{-5}$ |
| C | $-7.8979 \times 10^{-6}$ |
| D | $6.5162 \times 10^{-7}$ |

A S S ③

| | |
|---|---|
| R | 3.0814 |
| K | 0 |
| A | $8.6123 \times 10^{-9}$ |
| B | $6.8144 \times 10^{-9}$ |
| C | $1.3393 \times 10^{-5}$ |
| D | $1.8978 \times 10^{-5}$ |

A S S ④

| | |
|---|---|
| R | -4.6546 |
| K | 0 |
| A | $8.5517 \times 10^{-3}$ |
| B | $-3.8898 \times 10^{-4}$ |
| C | $1.2459 \times 10^{-5}$ |
| D | $-2.2448E-11$ |

F F S ①

OD: ∞
WE:

| | | | | | |
|---|---|---|---|---|---|
| $C_4$ | $-9.8421 \times 10^{-4}$ | $C_6$ | $-4.2911 \times 10^{-4}$ | $C_8$ | $-1.5966 \times 10^{-5}$ |
| $C_{10}$ | $-5.2103 \times 10^{-6}$ | $C_{11}$ | $2.8086 \times 10^{-5}$ | $C_{13}$ | $2.0309 \times 10^{-5}$ |
| $C_{15}$ | $4.0156 \times 10^{-6}$ | | | | |

ST:

∞ (Plane)

TE:

| | | | | | |
|---|---|---|---|---|---|
| $C_4$ | $-7.7919 \times 10^{-4}$ | $C_6$ | $-3.7233 \times 10^{-4}$ | $C_8$ | $1.0707 \times 10^{-5}$ |
| $C_{10}$ | $-7.0938 \times 10^{-6}$ | $C_{11}$ | $2.2248 \times 10^{-5}$ | $C_{13}$ | $2.0368 \times 10^{-5}$ |
| $C_{15}$ | $5.1541 \times 10^{-6}$ | | | | |

OD: 300 mm
ST:

| | | | | | |
|---|---|---|---|---|---|
| $C_4$ | $-4.0528 \times 10^{-4}$ | $C_6$ | $-1.8902 \times 10^{-4}$ | $C_8$ | $1.1075 \times 10^{-5}$ |

-continued

| | | | | | |
|---|---|---|---|---|---|
| $C_{10}$ | $-5.7948 \times 10^{-7}$ | $C_{11}$ | $-5.4568 \times 10^{-6}$ | $C_{13}$ | $-5.0512 \times 10^{-6}$ |
| $C_{15}$ | $-1.6676 \times 10^{-6}$ | | | | |

Displacement and tilt(1)

| X | 0.00 | Y | 0.00 | Z | 0.00 |
|---|---|---|---|---|---|
| α | 45.00 | β | 0.00 | γ | 0.00 |

Variable space

| | WE | ST | TE |
|---|---|---|---|
| f | 4.13419 | 5.83091 | 8.06924 |
| $F_{NO}$ | 2.8449 | 3.1912 | 3.4907 |
| d1 | 10.7424 | 7.7662 | 4.0296 |
| d2 | 0.9446 | 3.9174 | 7.6601 |

Example 7

| Surface No. | Radius of curvature | Surface separation | Displacement and tilt | Refractive index | Abbe's No. |
|---|---|---|---|---|---|
| Object plane | ∞ | OD | | | |
| 1 | 35.1214 | 1.0000 | | 1.78472 | 25.68 |
| 2 | 167.8232 | 1.0000 | | | |
| 3 | -130.3582 | 0.2969 | | 1.51633 | 64.14 |
| 4 | A S S① | 18.7302 | | | |
| 5 | F F S① (DM) | 4.3019 | (1) | | |
| 6 | 7.7555 | 2.3000 | | 1.58913 | 61.14 |
| 7 | -32.1532 (Stop) | d1 | | | |
| 8 | -5.7308 | 0.6694 | | 1.84666 | 23.78 |
| 9 | 15.1681 | d2 | | | |
| 10 | 15.3016 | 2.0000 | | 1.69680 | 55.53 |
| 11 | -13.8966 | 0.3000 | | | |
| 12 | 8.9786 | 5.3922 | | 1.58913 | 61.14 |
| 13 | A S S② | 0.6387 | | | |
| 14 | -49.9212 | 1.0000 | | 1.51633 | 64.14 |
| 15 | 69.5147 | 1.1964 | | | |
| 16 | ∞ | 1.4400 | | 1.54771 | 62.84 |
| 17 | ∞ | 0.1000 | | | |
| 18 | ∞ | 0.6000 | | 1.51633 | 64.14 |
| 19 | ∞ | 2.1000 | | | |
| Image plane | ∞ | | | | |

A S S①

| R | 11.4689 |
|---|---|
| K | 0 |
| A | $-1.4142 \times 10^{-4}$ |
| B | $1.4501 \times 10^{-7}$ |
| C | $1.0445 \times 10^{-8}$ |
| D | $-4.0703 \times 10^{-13}$ |

A S S②

| R | -11.0623 |
|---|---|
| K | 0 |
| A | $2.8728 \times 10^{-3}$ |
| B | $-1.4022 \times 10^{-4}$ |
| C | $3.9838 \times 10^{-6}$ |
| D | $-3.4424 \times 10^{-10}$ |

F F S①

OD: ∞
WE:

| | | | | | |
|---|---|---|---|---|---|
| $C_4$ | $-7.2848 \times 10^{-4}$ | $C_6$ | $-8.1095 \times 10^{-4}$ | $C_8$ | $3.4637 \times 10^{-5}$ |
| $C_{10}$ | $2.3972 \times 10^{-6}$ | $C_{11}$ | $-4.4633 \times 10^{-5}$ | $C_{13}$ | $4.9175 \times 10^{-5}$ |
| $C_{15}$ | $-9.5845 \times 10^{-6}$ | | | | |

ST: ∞ (Plane)

TE:

| | | | | | |
|---|---|---|---|---|---|
| $C_4$ | $1.6713 \times 10^{-3}$ | $C_6$ | $1.0083 \times 10^{-3}$ | $C_8$ | $-1.1132 \times 10^{-4}$ |
| $C_{10}$ | $-1.8948 \times 10^{-5}$ | $C_{11}$ | $8.9426 \times 10^{-5}$ | $C_{13}$ | $3.1405 \times 10^{-5}$ |

-continued

| | |
|---|---|
| $C_{15}$ | $1.8300 \times 10^{-5}$ |

Displacement and tilt(1)

| X | 0.00 | Y | 0.00 | Z | 0.00 |
|---|---|---|---|---|---|
| α | 45.00 | β | 0.00 | γ | 0.00 |

Variable space

| | WE | ST | TE |
|---|---|---|---|
| f | 5.08010 | 7.01435 | 9.04749 |
| $F_{NO}$ | 2.8000 | 3.8000 | 5.0000 |
| d1 | 2.2082 | 3.8194 | 5.4485 |
| d2 | 3.3214 | 1.7214 | 0.1175 |

Example 8

| Surface No. | Radius of curvature | Surface separation | Displacement and tilt | Refractive index | Abbe's No. |
|---|---|---|---|---|---|
| Object plane | ∞ | OD | | | |
| 1 | -16.83 | 1.01 | (1) | 1.7748 | 50.1 |
| 2 | A S S① | 6.51 | (1) | | |
| 3 | F F S① (DM) | 4.00 | (2) | | |
| 4 | 7.66 | 1.37 | | 1.7359 | 31.0 |
| 5 | 6.63 | 0.16 | | | |
| 6 | 11.46 | 1.20 | | 1.7850 | 45.2 |
| 7 | 26.59 | d1 | | | |
| 8 | ∞ (Stop) | 0.10 | | | |
| 9 | A S S② | 2.50 | (3) | 1.5764 | 60.3 |
| 10 | 43.52 | 1.38 | (3) | | |
| 11 | 5.62 | 2.53 | (4) | 1.4900 | 70.0 |
| 12 | -6.86 | 0.87 | (4) | | |
| 13 | -5.31 | 1.00 | (5) | 1.7625 | 28.2 |
| 14 | A S S③ | d2 | (5) | | |
| 15 | 7.77 | 2.75 | | 1.5111 | 67.0 |
| 16 | -6.00 | 0.18 | | | |
| 17 | -5.46 | 1.47 | | 1.7441 | 42.1 |
| 18 | A S S④ | 0.46 | | | |
| 19 | ∞ | 1.44 | | 1.5477 | 62.8 |
| 20 | ∞ | 0.80 | | | |
| 21 | ∞ | 0.60 | | 1.5163 | 64.1 |
| 22 | ∞ | 0.50 | | | |
| Image plane | ∞ | | (6) | | |

A S S①

| R | 8.84 |
|---|---|
| K | 0 |
| A | $-7.3333 \times 10^{-4}$ |
| B | $2.0902 \times 10^{-5}$ |
| C | $-1.4698 \times 10^{-6}$ |
| D | $3.8957 \times 10^{-8}$ |

A S S②

| R | 6.92 |
|---|---|
| K | 0 |
| A | $-3.4834 \times 10^{-4}$ |
| B | $-1.2367 \times 10^{-5}$ |
| C | $-6.8848 \times 10^{-7}$ |
| D | $-7.0789 \times 10^{-8}$ |

A S S③

| R | 5.12 |
|---|---|
| K | 0 |
| A | $1.5211 \times 10^{-3}$ |
| B | $-5.1273 \times 10^{-5}$ |
| C | $1.1665 \times 10^{-5}$ |
| D | $-6.4114 \times 10^{-7}$ |

A S S④

| R | -5.65 |
|---|---|
| K | 0 |
| A | $2.5044 \times 10^{-3}$ |

-continued

|   |   |
|---|---|
| B | $-1.0252 \times 10^{-4}$ |
| C | $4.3124 \times 10^{-6}$ |
| D | $-8.6293 \times 10^{-8}$ |

F F S ①

OD: ∞
WE:

| | | | | | |
|---|---|---|---|---|---|
| $C_4$ | $-7.7351 \times 10^{-4}$ | $C_6$ | $-3.8970 \times 10^{-4}$ | $C_8$ | $-1.7161 \times 10^{-5}$ |
| $C_{10}$ | $-8.1320 \times 10^{-6}$ | $C_{11}$ | $1.2801 \times 10^{-5}$ | $C_{13}$ | $1.3267 \times 10^{-5}$ |
| $C_{15}$ | $2.9429 \times 10^{-6}$ | | | | |

ST: ∞ (Plane)

TE:

| | | | | | |
|---|---|---|---|---|---|
| $C_4$ | $-3.6890 \times 10^{-4}$ | $C_6$ | $-1.8472 \times 10^{-4}$ | $C_8$ | $-1.0527 \times 10^{-5}$ |
| $C_{10}$ | $-5.5679 \times 10^{-6}$ | $C_{11}$ | $-3.3904 \times 10^{-7}$ | $C_{13}$ | $-8.2321 \times 10^{-7}$ |
| $C_{15}$ | $-2.2205 \times 10^{-7}$ | | | | |

OD: 300 mm
WE:

| | | | | | |
|---|---|---|---|---|---|
| $C_4$ | $-1.0612 \times 10^{-3}$ | $C_6$ | $-5.3605 \times 10^{-4}$ | $C_8$ | $-2.1366 \times 10^{-5}$ |
| $C_{10}$ | $-1.0448 \times 10^{-5}$ | $C_{11}$ | $1.5724 \times 10^{-5}$ | $C_{13}$ | $1.5533 \times 10^{-5}$ |
| $C_{15}$ | $3.3239 \times 10^{-6}$ | | | | |

ST:

| | | | | | |
|---|---|---|---|---|---|
| $C_4$ | $-2.8544 \times 10^{-4}$ | $C_6$ | $-1.4050 \times 10^{-4}$ | $C_8$ | $-8.9812 \times 10^{-6}$ |
| $C_{10}$ | $-3.9280 \times 10^{-6}$ | $C_{11}$ | $4.9259 \times 10^{-7}$ | $C_{13}$ | $1.8986 \times 10^{-6}$ |
| $C_{15}$ | $-2.2832 \times 10^{-7}$ | | | | |

TE:

| | | | | | |
|---|---|---|---|---|---|
| $C_4$ | $-6.5807 \times 10^{-4}$ | $C_6$ | $-3.3171 \times 10^{-4}$ | $C_8$ | $-1.6304 \times 10^{-5}$ |
| $C_{10}$ | $-1.0714 \times 10^{-5}$ | $C_{11}$ | $-1.4891 \times 10^{-6}$ | $C_{13}$ | $-8.0202 \times 10^{-7}$ |
| $C_{15}$ | $-7.4651 \times 10^{-7}$ | | | | |

Displacement and tilt(1)

| X | 0.000 | Y | 0.123 | Z | 0.000 |
|---|---|---|---|---|---|
| α | 0.000 | β | 0.000 | γ | 0.000 |

Displacement and tilt(2)

OD: ∞
WE:

| X | 0.000 | Y | 0.005 | Z | 0.005 |
|---|---|---|---|---|---|
| α | 45.000 | β | 0.000 | γ | 0.000 |

ST:

| X | 0.000 | Y | 0.000 | Z | 0.000 |
|---|---|---|---|---|---|
| α | 45.000 | β | 0.000 | γ | 0.000 |

TE:

| X | 0.000 | Y | 0.003 | Z | 0.003 |
|---|---|---|---|---|---|
| α | 45.000 | β | 0.000 | γ | 0.000 |

OD: 300 mm
WE:

| X | 0.000 | Y | 0.007 | Z | 0.007 |
|---|---|---|---|---|---|
| α | 45.000 | β | 0.000 | γ | 0.000 |

ST:

| X | 0.000 | Y | 0.004 | Z | 0.004 |
|---|---|---|---|---|---|
| α | 45.000 | β | 0.000 | γ | 0.000 |

TE:

| X | 0.000 | Y | 0.005 | Z | 0.005 |
|---|---|---|---|---|---|
| α | 45.000 | β | 0.000 | γ | 0.000 |

Displacement and tilt(3)

| X | 0.000 | Y | 0.066 | Z | 0.000 |
|---|---|---|---|---|---|
| α | 0.000 | β | 0.000 | γ | 0.000 |

Displacement and tilt(4)

| X | 0.000 | Y | 0.047 | Z | 0.000 |
|---|---|---|---|---|---|
| α | 0.000 | β | 0.000 | γ | 0.000 |

Displacement and tilt(5)

| X | 0.000 | Y | 0.042 | Z | 0.000 |
|---|---|---|---|---|---|
| α | 0.000 | β | 0.000 | γ | 0.000 |

-continued

Displacement and tilt(6)

| X | 0.000 | Y | 0.030 | Z | 0.000 |
|---|---|---|---|---|---|
| α | -1.744 | β | 0.000 | γ | 0.000 |

Variable space

| | WE | ST | TE |
|---|---|---|---|
| f | 4.2 | 6.3 | 8.4 |
| d1 | 8.05 | 3.73 | 0.10 |
| d2 | 0.62 | 4.95 | 8.58 |

Example 9

| Surface No. | Radius of curvature | Surface separation | Displacement and tilt | Refractive index | Abbe's No. |
|---|---|---|---|---|---|
| Object plane | ∞ | OD | | | |
| 1 | -38.5523 | 2.045 | | 1.744 | 44.78 |
| 2 | A S S ① | 3.1074 | | | |
| 3 | 63.3299 | 3.3731 | | 1.51633 | 64.14 |
| 4 | -55.7768 | 10.5953 | | | |
| 5 | F F S ① (DM) | 4.5963 | (1) | | |
| 6 | 106.8041 | 2.0514 | | 1.92286 | 18.9 |
| 7 | 4240.8114 | d1 | | | |
| 8 | ∞ (Stop) | 0.0787 | | | |
| 9 | A S S ② | 6.2388 | | 1.5725 | 57.74 |
| 10 | -23.4652 | 1.2298 | | | |
| 11 | 8.3423 | 2.3156 | | 1.52249 | 59.84 |
| 12 | -11.2443 | 0.8167 | | | |
| 13 | -10.9717 | 1.0734 | | 1.84666 | 23.78 |
| 14 | 4.447 | d2 | | | |
| 15 | 9.0599 | 3.7612 | | 1.5725 | 57.74 |
| 16 | A S S ③ | 1.5817 | | | |
| 17 | ∞ | 1.44 | | 1.54771 | 62.84 |
| 18 | ∞ | 0.8 | | | |
| 19 | ∞ | 0.6 | | 1.51633 | 64.14 |
| 20 | ∞ | 0.5 | | | |
| Image plane | ∞ | | | | |

A S S ①

| R | 8.6410 |
|---|---|
| K | 0 |
| A | $-4.5614 \times 10^{-4}$ |
| B | $2.9660 \times 10^{-6}$ |
| C | $-1.3571 \times 10^{-7}$ |
| D | $1.5429 \times 10^{-9}$ |

A S S ②

| R | 9.4088 |
|---|---|
| K | 0 |
| A | $-2.6088 \times 10^{-4}$ |
| B | $-5.8088 \times 10^{-6}$ |
| C | $2.4412 \times 10^{-7}$ |
| D | $-2.0243 \times 10^{-8}$ |

A S S ③

| R | -9.0075 |
|---|---|
| K | 0 |
| A | $1.3159 \times 10^{-3}$ |
| B | $-6.5552 \times 10^{-5}$ |
| C | $5.2821 \times 10^{-6}$ |
| D | $-2.0025 \times 10^{-7}$ |

F F S ①

OD: ∞
WE:

| | | | | | |
|---|---|---|---|---|---|
| $C_4$ | $-2.4155 \times 10^{-4}$ | $C_6$ | $-1.1909 \times 10^{-4}$ | $C_8$ | $-3.5587 \times 10^{-6}$ |
| $C_{10}$ | $-1.6571 \times 10^{-6}$ | $C_{11}$ | $9.5081 \times 10^{-6}$ | $C_{13}$ | $8.9905 \times 10^{-6}$ |
| $C_{15}$ | $2.3001 \times 10^{-6}$ | | | | |

ST: ∞ (Plane)

-continued

TE:

| | | | | | |
|---|---|---|---|---|---|
| $C_4$ | $2.7301 \times 10^{-5}$ | $C_6$ | $1.5481 \times 10^{-5}$ | $C_8$ | $3.8957 \times 10^{-8}$ |
| $C_{10}$ | $-6.1292 \times 10^{-8}$ | $C_{11}$ | $-3.0453 \times 10^{-6}$ | $C_{13}$ | $-3.2328 \times 10^{-6}$ |
| $C_{15}$ | $-8.8762 \times 10^{-7}$ | | | | |

OD: 300 mm
WE:

| | | | | | |
|---|---|---|---|---|---|
| $C_4$ | $-4.2833 \times 10^{-4}$ | $C_6$ | $-2.1381 \times 10^{-4}$ | $C_8$ | $-2.8029 \times 10^{-6}$ |
| $C_{10}$ | $-1.8332 \times 10^{-6}$ | $C_{11}$ | $8.4450 \times 10^{-6}$ | $C_{13}$ | $8.0447 \times 10^{-6}$ |
| $C_{15}$ | $1.9921 \times 10^{-6}$ | | | | |

ST:

| | | | | | |
|---|---|---|---|---|---|
| $C_4$ | $-1.7222 \times 10^{-4}$ | $C_6$ | $-9.1215 \times 10^{-5}$ | $C_8$ | $8.3713 \times 10^{-7}$ |
| $C_{10}$ | $-6.6528 \times 10^{-7}$ | $C_{11}$ | $-1.5904 \times 10^{-6}$ | $C_{13}$ | $-1.2389 \times 10^{-6}$ |
| $C_{15}$ | $-2.5879 \times 10^{-7}$ | | | | |

TE:

| | | | | | |
|---|---|---|---|---|---|
| $C_4$ | $-1.5675 \times 10^{-4}$ | $C_6$ | $-7.6576 \times 10^{-5}$ | $C_8$ | $5.9061 \times 10^{-7}$ |
| $C_{10}$ | $-1.6575 \times 10^{-6}$ | $C_{11}$ | $-4.5466 \times 10^{-6}$ | $C_{13}$ | $-4.7765 \times 10^{-6}$ |
| $C_{15}$ | $-1.2345 \times 10^{-6}$ | | | | |

| Displacement and tilt(1) | | | | | |
|---|---|---|---|---|---|
| X | 0.00 | Y | 0.00 | Z | 0.00 |
| α | 45.00 | β | 0.00 | γ | 0.00 |

| Variable space | | | |
|---|---|---|---|
| | WE | ST | TE |
| f | 4.652 | 5.453 | 6.701 |
| $F_{NO}$ | 3.980 | 4.477 | 5.149 |
| 2ω | 57.1° | 49.2° | 40.5° |
| d1 | 6.80213 | 4.23488 | 0.76948 |
| d2 | 0.68903 | 3.25628 | 6.72167 |

Tabulated below are the values of the parameters regarding the aforesaid formulae (599) to (619) in Embodiments 1 to 10.

| Example | O D | Magnification | f | S m | S m/f | M 1 | M 1/f | φ |
|---|---|---|---|---|---|---|---|---|
| 1 | ∞ | — | 3.530 | 1.987 | 0.563 | 7.611 | 2.156 | 45° |
| 2 | ∞ | — | 4.470 | 6.428 | 1.438 | 6.708 | 1.501 | 45° |
| 3 | ∞ | — | 3.530 | 0.000 | 0.000 | 7.611 | 2.156 | 45° |
| 4 | ∞ | — | 5.790 | 6.908 | 1.193 | 5.390 | 0.931 | 37.3° |
| 5 | ∞ | — | 4.980 | 3.306 | 0.664 | 3.980 | 0.799 | 42.9° |
| 6 | ∞ | W E | 4.130 | 10.742 | 2.601 | 15.880 | 3.845 | 45° |
| | | S T | 5.830 | 7.766 | 1.332 | 15.880 | 2.724 | 45° |
| | | T E | 8.070 | 4.032 | 0.500 | 15.880 | 1.968 | 45° |
| 7 | ∞ | W E | 5.080 | 5.749 | 1.132 | 20.486 | 4.033 | 45° |
| | | S T | 7.010 | 5.749 | 0.820 | 20.486 | 2.922 | 45° |
| | | T E | 9.050 | 5.749 | 0.635 | 20.486 | 2.264 | 45° |
| 8 | ∞ | W E | 4.220 | 13.670 | 3.239 | 6.510 | 1.543 | 45° |
| | | S T | 6.010 | 9.340 | 1.554 | 6.510 | 1.083 | 45° |
| | | T E | 7.680 | 6.120 | 0.797 | 6.510 | 0.848 | 45° |
| | 300 mm | W E | 4.220 | 13.670 | 3.239 | 6.510 | 1.543 | 45° |
| | | S T | 6.010 | 9.340 | 1.554 | 6.510 | 1.083 | 45° |
| | | T E | 7.680 | 6.120 | 0.797 | 6.510 | 0.848 | 45° |
| 9 | ∞ | W E | 4.652 | 12.465 | 2.680 | | | 45° |
| | | S T | 5.453 | 9.898 | 1.815 | | | 45° |
| | | T E | 6.701 | 6.433 | 0.960 | | | 45° |
| | 300 mm | W E | 4.652 | | | | | 45° |
| | | S T | 5.453 | | | | | 45° |
| | | T E | 6.701 | | | | | 45° |
| 10 | ∞ | W E | 4.652 | 12.465 | 2.680 | | | 40° |
| | | S T | 5.453 | 9.898 | 1.815 | | | 40° |
| | | T E | 6.701 | 6.433 | 0.960 | | | 40° |
| | 300 mm | W E | 4.652 | | | | | 40° |
| | | S T | 5.453 | | | | | 40° |
| | | T E | 6.701 | | | | | 40° |

| Example | O D | Magnification | C | B | A | ΔM (μm) | h |
|---|---|---|---|---|---|---|---|
| 1 | ∞ | — | +20' | 30' | −20' | 10 | 1.775 |
| 2 | ∞ | — | +25' | 50' | | 12.3 | 1.694 |
| 3 | ∞ | — | 0' | 20' | | | 1.775 |
| 4 | ∞ | — | −8.885° | | | 100 | 1.730 |
| 5 | ∞ | — | −11.05° | | | 50 | 1.700 |
| 6 | ∞ | W E | 23' | 46' | | 10 | 1.500 |
| | | S T | 23' | 0 | | 10 | 1.500 |
| | | T E | 23' | 46' | | 10 | 1.500 |
| 7 | ∞ | W E | | | | | |
| | | S T | | | | | |
| | | T E | | | | | |
| 8 | ∞ | W E | −1.74° | | | 50 | 1.650 |
| | | S T | −1.74° | | | 50 | 1.650 |
| | | T E | −1.74° | | | 50 | 1.650 |
| | 300 mm | W E | −1.74° | | | 50 | 1.650 |
| | | S T | −1.74° | | | 50 | 1.650 |

-continued

| Example | O D | Magnification | f | S m | S m/f | M 1 | M 1/f | φ |
|---------|-----|---------------|-----|-----|-------|-----|-------|-------|
|         |     | T E           | −1.74° |  |  |  | 50 | 1.650 |
| 9       | ∞   | W E           |     |     |       |     |       |       |
|         |     | S T           |     |     |       |     |       |       |
|         |     | T E           |     |     |       |     |       |       |
|         | 300 mm | W E        |     |     |       |     |       |       |
|         |     | S T           |     |     |       |     |       |       |
|         |     | T E           |     |     |       |     |       |       |
| 10      | ∞   | W E           |     |     |       |     |       |       |
|         |     | S T           |     |     |       |     |       |       |
|         |     | T E           |     |     |       |     |       |       |
|         | 300 mm | W E        |     |     |       |     |       |       |
|         |     | S T           |     |     |       |     |       |       |
|         |     | T E           |     |     |       |     |       |       |

| Example | O D | Magnification | $D_f$ (μm) | $B_m$ | $B_M$ | Minimum value of B v | Maximum value of B v |
|---------|-----|---------------|------------|-------|-------|----------------------|----------------------|
| 1 | ∞ | — | 15.4 | 0 | 30' | 0 | 30' |
| 2 | ∞ | — | 19.6 | 0 | 50' | 0 | 50' |
| 3 | ∞ | — | 15.4 | 0 | 20' | 0 | 20' |
| 4 | ∞ | — |      | −3.3° | 3.3° | −3.3° | 3.3° |
| 5 | ∞ | — |      | −1.7 | 1.7° | −1.7° | 1.7° |
| 6 | ∞ | W E | 17.5 | 0 | 46' | 0 | 46' |
|   |   | S T | 20 | 0 | 0 | 0 | 0 |
|   |   | T E | 21.8 | 0 | 46' | 0 | 46' |
| 7 | ∞ | W E |    |    |    |    |    |
|   |   | S T |    |    |    |    |    |
|   |   | T E |    |    |    |    |    |
| 8 | ∞ | W E | 16.1 | −2.17° | −1.48° | −2.17° | −1.48° |
|   |   | S T | 18.4 | −2.17° | −1.48° | −2.17° | −1.48° |
|   |   | T E | 20.1 | −2.17° | −1.48° | −2.17° | −1.48° |
|   | 300 mm | W E | 16.1 | −2.17° | −1.48° | −2.17° | −1.48° |
|   |   | S T | 18.4 | −2.17° | −1.48° | −2.17° | −1.48° |
|   |   | T E | 20.1 | −2.17° | −1.48° | −2.17° | −1.48° |
| 9 | ∞ | W E |    |    |    |    |    |
|   |   | S T |    |    |    |    |    |
|   |   | T E |    |    |    |    |    |
|   | 300 mm | W E |  |  |  |  |  |
|   |   | S T |    |    |    |    |    |
|   |   | T E |    |    |    |    |    |
| 10 | ∞ | W E |    |    |    |    |    |
|   |   | S T |    |    |    |    |    |
|   |   | T E |    |    |    |    |    |
|   | 300 mm | W E |  |  |  |  |  |
|   |   | S T |    |    |    |    |    |
|   |   | T E |    |    |    |    |    |

Commonly to the optical systems of the invention, it is preferable to locate the aperture stop in the rear of the variable mirror. This is because, with the aperture stop located in front of the variable mirror, the distance from the aperture stop to a lens group located in the rear thereof becomes too long and so the height of a chief light ray becomes too high at the lens group in the rear of the aperture stop, rendering it difficult to make correction for off-axis aberrations.

Again commonly to the present invention, only one requirement for the zoom optical system is to satisfy at least one of the conditions set forth hereinbefore in a zooming state.

For the zoom optical system it is preferable that the zooming lens group has positive power, because the lens arrangement is easily designed to be of the retro-focus type where a wide-angle arrangement is easily achievable. It is also preferable for the zooming lens group to have negative power because large zooming is achievable by reduced movement of the zooming lens group.

It is here noted that the variable mirror should preferably be located in front of the lens group contributing primarily to zooming. This is because when the variable mirror has a focusing function, the power of the reflecting surface of the variable mirror varies with object distance changes. If, in this case, the zooming group is in the rear of the variable mirror, focusing can be performed while the power of the reflecting surface of the variable mirror is varied depending on the object distance and independently of the magnification of the zooming lens group. In view of optical design, how to control the reflecting surface of the variable mirror is so simplified that the image pickup optical system can easily be designed. This merit goes true for the case where the variable mirror has or has not a compensator function.

Finally, the definitions of the terms used herein are collectively explained.

By the term "optical apparatus" is intended an apparatus including either an optical system or an optical element. This apparatus is not always required to function by itself, that is, it may form a part of the apparatus assembly.

The optical apparatus, for instance, includes image pickup apparatus, viewing apparatus, display apparatus, illumination apparatus, and signal processors.

Specific embodiments of the image pickup apparatus are film cameras, digital cameras, robots' eyes, lens interchangeable digital single-lens reflex cameras, TV cameras, moving-image recorders, electronic moving-image recorders, camcorders, VTR cameras and electronic endoscopes. Digital cameras, card type digital cameras, TV cameras, VTR cameras, moving-image recording cameras, etc. are all embodiments of the electronic image pickup apparatus.

Specific embodiments of the viewing apparatus are microscopes, telescopes, spectacles, binoculars, loupes, fiber scopes, finders and view finders.

Specific embodiments of the display apparatus are liquid crystal displays, view finders, game machines (the Play Station series manufactured by SONY), video projectors, liquid crystal projectors, head mounted displays (HMDs), PDAs (personal digital assistants) and cellular phones.

Specific embodiments of the illumination apparatus are cameras' flashes, cars' headlights, endoscopes light sources, and microscope light sources.

Specific embodiments of the signal processor are cellar phones, personal computers, game machines, read/write devices for optical discs, and computing units for optical computers.

The image pickup device, for instance, refers to CCDs, pickup tubes, solid-state image pickup devices, and photographic films.

A plane-parallel plate is included in one of prisms, and a diopter change is included in changes in an observer. Subject changes include a change in the distance of an object that is the subject, movement of the object, motion, vibration and shaking of the object, etc.

The extended curved surface, by definition, includes every surface such as a spherical surface; a plane; a rotationally symmetric aspheric surface; a spherical surface, a plane and a rotationally symmetric aspheric surface decentered with respect to an optical axis; an aspheric surface having planes of symmetry; an aspheric surface having only one plane of symmetry; an aspheric surface having no plane of symmetry; a free-form surface; and a surface including an undifferentiable line or point. That is, the extended curved surface includes every surface that has some influences on light whether it is a reflecting surface or a refracting surface.

These surfaces are generally called the extended curved surface.

The optical element having variable optical properties includes a variable-focus lens, a variable-shape mirror, a polarizing prism having a variable surface shape, a prism having a variable apex angle and a variable diffraction optical element having a variable light deflection action, i.e., a variable HOE and a variable DOE.

The variable-focus lens includes a variable lens having a variable amount of aberrations but having an invariable focal length, and so does the variable-shape mirror.

In short, an optical element having variable light defection actions such as reflection, refraction and diffraction of light is referred to as the optical element having variable optical properties.

The information transmission apparatus refers to an apparatus that can enter and transmit some information such as cellular phones; remote controllers for fixed telephone sets, game machines, televisions and radio-cassette players; personal computers; keyboards, mouses and touch panels for personal computers.

TV monitors, personal computer monitors and displays provided with an image pickup apparatus are also included in that term.

The information transmission apparatus is included in the signal processor.

According to the present invention as explained above, there can be provided an optical system that has reduced power consumptions and ensures noiseless operations and fast responses with simplified mechanical structure leading to cost reductions, for instance, a lens system capable of focusing and a variable-focus lens as well as an optical apparatus comprising such an optical system.

What we claim is:

1. An optical system, comprising:
a variable mirror and an aperture stop,
wherein the aperture stop is disposed to satisfy the following condition (601):

$$0 \leq |Sm/f| \leq 10 \tag{601}$$

where Sm is an equivalent length in air between a reflecting surface of the variable mirror and the aperture stop as measured along an optical axis of the optical system, and f is a focal length of the optical system without the variable mirror installed therein.

2. An optical system, comprising:
a variable mirror and an aperture stop, and satisfying the following condition (599):

$$39° \leq \Phi \leq 60° \tag{599}$$

where $\Phi$ is an angle between an optical axis of the optical system on the variable mirror and a normal to a surface of the variable mirror.

3. The optical system according to claim 1 or 2, wherein said optical system comprises a lens having a rotationally symmetric surface.

4. The optical system according to any one of claims 1 or 2, wherein said optical system is a zoom optical system, and it is not always required to meet said conditions (599) and (601) in all available states or it is required to meet said conditions (599) and (601) in at least one available state.

5. The optical system according to claim 1, which comprises an optical element having a free-form surface.

6. The optical system according to claim 1, which comprises one reflection type optical element having a free-form surface.

7. The optical system according to claim 1, wherein said optical system comprises a plurality of free-form surface optical elements, between which said aperture is located.

8. An optical system, comprising:
a variable mirror,
an aperture stop having a constant aperture size;
a diaphragm having a variable aperture size,
wherein the aperture stop is disposed to satisfy the following condition (601):
wherein the diaphragm having a constant aperture size is located at a position different from the position of said aperture stop:

$$0 \leq |Sm/f| \leq 10 \tag{601}$$

where Sm is an equivalent length in air between a reflecting surface of the variable mirror and the aperture stop as measured along an optical axis of the optical system, and f is a focal length of the optical system without the variable mirror installed therein.

9. An optical system, comprising a variable mirror, and satisfying the following condition (599):

$$39° \leq \Phi \leq 55° \tag{599}$$

where $\Phi$ is an angle between an optical axis of the optical system on the variable mirror and a normal to a surface of the variable mirror.

10. The optical system according to claim 9, wherein said optical system comprises a free-form surface optical element.

11. An optical system, comprising a variable mirror and satisfying the following condition (616):

$$0.5 < M_1/f < 5 \qquad (616)$$

where $M_1$ is an equivalent length in air between a reflecting surface of the variable mirror and an entrance-side first surface of the optical system as measured along an optical axis of the optical system, and f is a focal length of the optical system without the variable mirror installed therein.

12. The optical system according to claim 1, wherein said variable mirror has an increased converging action at a near point and a decreased converging action at a far point.

13. The optical system according to claim 1, wherein said variable mirror is a variable-shape mirror having a variable reflecting surface shape, and wherein a transforming portion of a reflecting surface thereof is long in a direction of an entrance surface of an axial light ray, as viewed from a direction vertical to the reflecting surface.

14. An optical system, comprising:

at least one variable mirror; and one element selected from an optical surface, an optical element, an image pickup device, and an image plane, wherein a tilt decentration is intentionally added to the one element with an axis of rotation defined by a straight line vertical to a Z-axis of the optical system, provided that a range represented by the following condition (103) is satisfied:

$$0 \leq \Psi < 15 \qquad (103)$$

where $\Psi$ is an amount of the tilt decentration added in degrees.

15. The optical system according to claim 3, wherein said optical system is a zoom optical system, and it is not always required to meet said conditions (599) and (601) in all available states or it is required to meet said conditions (599) and (601) in at least one available state.

* * * * *